US012608890B2

(12) United States Patent
Boesel et al.

(10) Patent No.: US 12,608,890 B2
(45) Date of Patent: Apr. 21, 2026

(54) OBSTRUCTED OBJECTS IN A THREE-DIMENSIONAL ENVIRONMENT

(71) Applicant: Apple Inc., Cupertino, CA (US)

(72) Inventors: Benjamin H. Boesel, Jackson, WY (US); Shih-Sang Chiu, San Francisco, CA (US); Katherine W. Kolombatovich, New York, NY (US); Garrett L. Weinberg, Capitola, CA (US); Benjamin Hylak, San Francisco, CA (US); Ieyuki Kawashima, Pleasanton, CA (US); Lee S. Broughton, Santa Cruz, CA (US); Giancarlo Yerkes, San Francisco, CA (US); Kristi E. Bauerly, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 18/304,290

(22) Filed: Apr. 20, 2023

(65) Prior Publication Data

US 2023/0343049 A1    Oct. 26, 2023

Related U.S. Application Data

(60) Provisional application No. 63/363,289, filed on Apr. 20, 2022.

(51) Int. Cl.
*G06T 19/00*        (2011.01)
*G06F 3/01*        (2006.01)
(Continued)

(52) U.S. Cl.
CPC ............ *G06T 19/006* (2013.01); *G06F 3/011* (2013.01); *G06F 3/013* (2013.01);
(Continued)

(58) Field of Classification Search
None
See application file for complete search history.

(56) References Cited

U.S. PATENT DOCUMENTS

| 1,173,824 A | 2/1916 | Mckee |
| 5,015,188 A | 5/1991 | Pellosie et al. |

(Continued)

FOREIGN PATENT DOCUMENTS

| AU | 2022348895 A1 | 4/2024 |
| CA | 3033344 A1 | 2/2018 |

(Continued)

OTHER PUBLICATIONS

Extended European Search Report received for European Patent Application No. 24158036.4, mailed on Jul. 18, 2024, 12 pages.
(Continued)

*Primary Examiner* — Jwalant Amin
(74) *Attorney, Agent, or Firm* — Kubota & Basol LLP

(57) ABSTRACT
In some embodiments, a computer system reduces a visual prominence of virtual content relative to a three-dimensional environment. In some embodiments, a computer system displays an indication of a physical object in a three-dimensional environment. In some embodiments, a computer system reduces a visual prominence of the virtual content and enables a physical object, such as a person, to break through the virtual content, such as based on a determination that the physical object satisfies one or more criteria to constitute a salient social interaction.

48 Claims, 31 Drawing Sheets

(51) Int. Cl.
   *G06F 3/04815* (2022.01)
   *G06F 3/0484* (2022.01)
   *G06F 3/16* (2006.01)

(52) U.S. Cl.
   CPC ........ *G06F 3/04815* (2013.01); *G06F 3/0484*
   (2013.01); *G06F 3/167* (2013.01); *G06F*
   *2203/04804* (2013.01)

(56) References Cited

U.S. PATENT DOCUMENTS

| | | | |
|---|---|---|---|
| 5,422,812 A | 6/1995 | Knoll et al. |
| 5,483,261 A | 1/1996 | Yasutake |
| 5,488,204 A | 1/1996 | Mead et al. |
| 5,515,488 A | 5/1996 | Hoppe et al. |
| 5,524,195 A | 6/1996 | Clanton et al. |
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,825,352 A | 10/1998 | Bisset et al. |
| 5,835,079 A | 11/1998 | Shieh |
| 5,877,766 A | 3/1999 | Bates et al. |
| 5,880,411 A | 3/1999 | Gillespie et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,188,391 B1 | 2/2001 | Seely et al. |
| 6,295,069 B1 | 9/2001 | Shirur |
| 6,310,610 B1 | 10/2001 | Beaton et al. |
| 6,323,846 B1 | 11/2001 | Westerman et al. |
| 6,426,745 B1 | 7/2002 | Isaacs et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,690,387 B2 | 2/2004 | Zimmerman et al. |
| 6,714,201 B1 | 3/2004 | Grinstein et al. |
| 6,750,873 B1 | 6/2004 | Bernardini et al. |
| 6,756,997 B1 | 6/2004 | Ward et al. |
| 6,968,511 B1 | 11/2005 | Robertson et al. |
| 7,015,894 B2 | 3/2006 | Morohoshi |
| 7,035,903 B1 | 4/2006 | Baldonado |
| 7,046,927 B2 | 5/2006 | Dalton et al. |
| 7,096,120 B2 | 8/2006 | Hull |
| 7,134,130 B1 | 11/2006 | Thomas |
| 7,137,074 B1 | 11/2006 | Newton et al. |
| 7,184,064 B2 | 2/2007 | Zimmerman et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,614,008 B2 | 11/2009 | Ording |
| 7,633,076 B2 | 12/2009 | Huppi et al. |
| 7,634,718 B2 | 12/2009 | Nakajima |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,706,579 B2 | 4/2010 | Oijer |
| 7,721,226 B2 | 5/2010 | Barabe et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,122,341 B1 | 2/2012 | Dayan et al. |
| 8,239,784 B2 | 8/2012 | Hotelling et al. |
| 8,279,180 B2 | 10/2012 | Hotelling et al. |
| 8,341,541 B2 | 12/2012 | Holecek et al. |
| 8,381,135 B2 | 2/2013 | Hotelling et al. |
| 8,436,872 B2 | 5/2013 | Wright et al. |
| 8,479,122 B2 | 7/2013 | Hotelling et al. |
| 8,593,558 B2 | 11/2013 | Gardiner et al. |
| 8,724,856 B1 | 5/2014 | King |
| 8,730,156 B2 | 5/2014 | Weising et al. |
| 8,767,045 B2 | 7/2014 | Kitazato et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,805,690 B1 | 8/2014 | Lebeau et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,189,611 B2 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,222,787 B2 | 12/2015 | Blumenberg et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,348,458 B2 | 5/2016 | Hotelling et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |

(56) References Cited

U.S. PATENT DOCUMENTS

| | | | |
|---|---|---|---|
| 10,139,985 B2 | 11/2018 | Mildrew et al. |
| 10,163,198 B2 | 12/2018 | Rochford et al. |
| 10,175,483 B2 | 1/2019 | Salter et al. |
| 10,186,086 B2 | 1/2019 | Giraldi et al. |
| 10,192,347 B2 | 1/2019 | Bui et al. |
| 10,203,762 B2 | 2/2019 | Bradski et al. |
| 10,203,764 B2 | 2/2019 | Katz et al. |
| 10,210,664 B1 | 2/2019 | Chaturvedi |
| 10,303,427 B2 | 5/2019 | Shintani et al. |
| 10,307,671 B2 | 6/2019 | Barney et al. |
| 10,318,034 B1 | 6/2019 | Hauenstein et al. |
| 10,331,205 B2 | 6/2019 | Kim et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-Svahn et al. |
| 10,401,958 B2 | 9/2019 | Peana et al. |
| 10,402,081 B1 | 9/2019 | Andersen et al. |
| 10,424,124 B2 | 9/2019 | Takahashi |
| 10,431,216 B1 | 10/2019 | Lemon et al. |
| 10,448,189 B2 | 10/2019 | Link |
| 10,484,641 B2 | 11/2019 | Zhou et al. |
| 10,488,941 B2 | 11/2019 | Lam et al. |
| 10,499,044 B1 | 12/2019 | Giokaris et al. |
| 10,530,731 B1 | 1/2020 | Wu et al. |
| 10,534,439 B2 | 1/2020 | Raffa et al. |
| 10,540,005 B2 | 1/2020 | Yoon et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,565,761 B2 | 2/2020 | Deluca et al. |
| 10,573,067 B1 | 2/2020 | Naik et al. |
| 10,599,570 B1 | 3/2020 | Ding et al. |
| 10,630,803 B2 | 4/2020 | Hwang et al. |
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,678,403 B2 | 6/2020 | Duarte et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,877,645 B2 | 12/2020 | Lee et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,162 B2 | 9/2021 | Bar-Zeev et al. |
| 11,132,840 B2 | 9/2021 | Sarangdhar et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,182,964 B2 | 11/2021 | Palangie et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,266,919 B2 | 3/2022 | Bear et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,348,316 B2 | 5/2022 | Burns et al. |
| 11,379,033 B2 | 7/2022 | O'hern et al. |
| 11,380,323 B2 | 7/2022 | Shin et al. |
| 11,382,611 B1 | 7/2022 | Westling et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 | 11/2022 | Tokuchi et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,682,180 B1 | 6/2023 | Willkie |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,768,546 B1 | 9/2023 | Poulos et al. |
| 11,842,454 B1 | 12/2023 | Lin et al. |
| 11,847,748 B2 | 12/2023 | Liu et al. |
| 11,861,056 B2 | 1/2024 | Burns et al. |
| 11,861,136 B1 | 1/2024 | Faulkner et al. |
| 11,868,582 B2 | 1/2024 | Kim et al. |
| 11,875,013 B2 | 1/2024 | Lemay et al. |
| 11,875,162 B2 | 1/2024 | Garstenauer et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 12,020,387 B2 | 6/2024 | Maharaja |
| 12,023,579 B2 | 7/2024 | Azmandian et al. |
| 12,032,803 B2 | 7/2024 | Pastrana Vicente et al. |
| 12,062,127 B2 | 8/2024 | Park et al. |

(56)  References Cited

U.S. PATENT DOCUMENTS

| | | | |
|---|---|---|---|
| 12,099,653 | B2 | 9/2024 | Chawda et al. |
| 12,099,695 | B1 | 9/2024 | Smith et al. |
| 12,112,011 | B2 | 10/2024 | Smith et al. |
| 12,113,948 | B1 | 10/2024 | Smith et al. |
| 12,118,200 | B1 | 10/2024 | Shutzberg et al. |
| 12,154,236 | B1 | 11/2024 | Herman et al. |
| 12,182,325 | B2 | 12/2024 | Calderone et al. |
| 12,236,546 | B1 | 2/2025 | Lipton |
| 12,254,127 | B2 | 3/2025 | Burns et al. |
| 12,321,515 | B2 | 6/2025 | Calderone et al. |
| 12,394,167 | B1 | 8/2025 | Scully et al. |
| 12,408,804 | B2 | 9/2025 | Schneider et al. |
| 12,456,271 | B1 | 10/2025 | Bernstein et al. |
| 2001/0047250 | A1 | 11/2001 | Schuller et al. |
| 2002/0015024 | A1 | 2/2002 | Westerman et al. |
| 2002/0024675 | A1 | 2/2002 | Foxlin |
| 2002/0030692 | A1 | 3/2002 | Griesert |
| 2002/0044152 | A1 | 4/2002 | Abbott et al. |
| 2002/0065778 | A1 | 5/2002 | Bouet et al. |
| 2003/0038754 | A1 | 2/2003 | Goldstein et al. |
| 2003/0151611 | A1 | 8/2003 | Turpin et al. |
| 2003/0222924 | A1 | 12/2003 | Baron |
| 2004/0059784 | A1 | 3/2004 | Caughey |
| 2004/0104806 | A1 | 6/2004 | Yui et al. |
| 2004/0230912 | A1 | 11/2004 | Clow et al. |
| 2004/0243926 | A1 | 12/2004 | Trenbeath et al. |
| 2005/0044510 | A1 | 2/2005 | Yi |
| 2005/0062738 | A1 | 3/2005 | Handley et al. |
| 2005/0073136 | A1 | 4/2005 | Larsson et al. |
| 2005/0100210 | A1 | 5/2005 | Rice et al. |
| 2005/0138572 | A1 | 6/2005 | Good et al. |
| 2005/0144570 | A1 | 6/2005 | Loverin et al. |
| 2005/0144571 | A1 | 6/2005 | Loverin et al. |
| 2005/0175218 | A1 | 8/2005 | Vertegaal et al. |
| 2005/0190059 | A1 | 9/2005 | Wehrenberg |
| 2005/0198143 | A1 | 9/2005 | Moody et al. |
| 2005/0216866 | A1 | 9/2005 | Rosen et al. |
| 2005/0231532 | A1 | 10/2005 | Suzuki et al. |
| 2005/0248299 | A1 | 11/2005 | Chemel et al. |
| 2006/0017692 | A1 | 1/2006 | Wehrenberg et al. |
| 2006/0028400 | A1 | 2/2006 | Lapstun et al. |
| 2006/0033724 | A1 | 2/2006 | Chaudhri et al. |
| 2006/0034590 | A1 | 2/2006 | Teramoto |
| 2006/0080702 | A1 | 4/2006 | Diez et al. |
| 2006/0156228 | A1 | 7/2006 | Gallo et al. |
| 2006/0197753 | A1 | 9/2006 | Hotelling |
| 2006/0256083 | A1 | 11/2006 | Rosenberg |
| 2006/0283214 | A1 | 12/2006 | Donadon et al. |
| 2007/0172112 | A1 | 7/2007 | Paley et al. |
| 2007/0259716 | A1 | 11/2007 | Mattice et al. |
| 2008/0132249 | A1 | 6/2008 | Hamilton |
| 2008/0181502 | A1 | 7/2008 | Yang |
| 2008/0186255 | A1 | 8/2008 | Cohen et al. |
| 2008/0211771 | A1 | 9/2008 | Richardson |
| 2008/0222710 | A1 | 9/2008 | Blagsvedt et al. |
| 2008/0310707 | A1 | 12/2008 | Kansal et al. |
| 2009/0037844 | A1 | 2/2009 | Kim et al. |
| 2009/0049408 | A1 | 2/2009 | Naaman et al. |
| 2009/0064035 | A1 | 3/2009 | Shibata et al. |
| 2009/0146779 | A1 | 6/2009 | Kumar et al. |
| 2009/0146961 | A1 | 6/2009 | Cheung et al. |
| 2009/0164219 | A1 | 6/2009 | Yeung et al. |
| 2009/0231356 | A1 | 9/2009 | Barnes et al. |
| 2009/0254843 | A1 | 10/2009 | Van et al. |
| 2009/0319181 | A1 | 12/2009 | Khosravy et al. |
| 2009/0326810 | A1 | 12/2009 | Callaghan et al. |
| 2010/0097375 | A1 | 4/2010 | Tadaishi et al. |
| 2010/0115459 | A1 | 5/2010 | Kinnunen et al. |
| 2010/0150526 | A1 | 6/2010 | Rose et al. |
| 2010/0177049 | A1 | 7/2010 | Levy et al. |
| 2010/0185949 | A1 | 7/2010 | Jaeger |
| 2010/0188503 | A1 | 7/2010 | Tsai et al. |
| 2010/0188572 | A1 | 7/2010 | Card |
| 2010/0208033 | A1 | 8/2010 | Edge et al. |
| 2010/0269145 | A1 | 10/2010 | Ingrassia et al. |
| 2010/0293504 | A1 | 11/2010 | Hachiya |
| 2010/0302245 | A1 | 12/2010 | Best |
| 2010/0328432 | A1 | 12/2010 | Tanaka |
| 2010/0332196 | A1 | 12/2010 | Fisker et al. |
| 2011/0018895 | A1 | 1/2011 | Buzyn et al. |
| 2011/0018896 | A1 | 1/2011 | Buzyn et al. |
| 2011/0029185 | A1 | 2/2011 | Aoki et al. |
| 2011/0032365 | A1 | 2/2011 | Yett |
| 2011/0066981 | A1 | 3/2011 | Chmielewski et al. |
| 2011/0098029 | A1 | 4/2011 | Rhoads et al. |
| 2011/0142321 | A1 | 6/2011 | Huffman |
| 2011/0156879 | A1 | 6/2011 | Matsushita et al. |
| 2011/0164163 | A1 | 7/2011 | Bilbrey et al. |
| 2011/0169927 | A1 | 7/2011 | Mages et al. |
| 2011/0175932 | A1 | 7/2011 | Yu et al. |
| 2011/0216060 | A1 | 9/2011 | Weising et al. |
| 2011/0243448 | A1 | 10/2011 | Kawabuchi et al. |
| 2011/0254865 | A1 | 10/2011 | Yee et al. |
| 2011/0289691 | A1 | 12/2011 | Laflèche et al. |
| 2011/0304557 | A1 | 12/2011 | Wilburn et al. |
| 2011/0310001 | A1 | 12/2011 | Madau et al. |
| 2011/0320969 | A1 | 12/2011 | Hwang et al. |
| 2012/0038751 | A1 | 2/2012 | Yuan et al. |
| 2012/0066638 | A1 | 3/2012 | Ohri |
| 2012/0075496 | A1 | 3/2012 | Akifusa et al. |
| 2012/0086624 | A1 | 4/2012 | Thompson et al. |
| 2012/0113223 | A1 | 5/2012 | Hilliges et al. |
| 2012/0124525 | A1 | 5/2012 | Kang |
| 2012/0131631 | A1 | 5/2012 | Bhogal et al. |
| 2012/0151416 | A1 | 6/2012 | Bell et al. |
| 2012/0170089 | A1 | 7/2012 | Kim et al. |
| 2012/0170840 | A1 | 7/2012 | Caruso et al. |
| 2012/0184372 | A1 | 7/2012 | Laarakkers et al. |
| 2012/0194547 | A1 | 8/2012 | Johnson et al. |
| 2012/0218395 | A1 | 8/2012 | Andersen et al. |
| 2012/0223885 | A1 | 9/2012 | Perez |
| 2012/0249416 | A1 | 10/2012 | Maciocci et al. |
| 2012/0249741 | A1 | 10/2012 | Maciocci et al. |
| 2012/0256956 | A1 | 10/2012 | Kasahara |
| 2012/0256967 | A1 | 10/2012 | Baldwin et al. |
| 2012/0257035 | A1 | 10/2012 | Larsen |
| 2012/0272179 | A1 | 10/2012 | Stafford |
| 2012/0290401 | A1 | 11/2012 | Neven |
| 2012/0304087 | A1 | 11/2012 | Walkin et al. |
| 2013/0010062 | A1 | 1/2013 | Redmann |
| 2013/0027860 | A1 | 1/2013 | Masaki et al. |
| 2013/0088516 | A1* | 4/2013 | Ota ..................... G06T 19/006 |
| | | | 345/633 |
| 2013/0093727 | A1 | 4/2013 | Eriksson et al. |
| 2013/0103313 | A1 | 4/2013 | Moore et al. |
| 2013/0127850 | A1 | 5/2013 | Bindon |
| 2013/0147820 | A1 | 6/2013 | Kalai et al. |
| 2013/0148850 | A1 | 6/2013 | Matsuda et al. |
| 2013/0169533 | A1 | 7/2013 | Jahnke |
| 2013/0190044 | A1 | 7/2013 | Kulas |
| 2013/0191160 | A1 | 7/2013 | Oran |
| 2013/0207963 | A1 | 8/2013 | Stirbu et al. |
| 2013/0211843 | A1 | 8/2013 | Clarkson |
| 2013/0212470 | A1 | 8/2013 | Karunamuni et al. |
| 2013/0222227 | A1 | 8/2013 | Johansson et al. |
| 2013/0222410 | A1 | 8/2013 | Kameyama et al. |
| 2013/0229345 | A1 | 9/2013 | Day et al. |
| 2013/0232430 | A1 | 9/2013 | Reitan |
| 2013/0246955 | A1 | 9/2013 | Schwesig et al. |
| 2013/0249922 | A1 | 9/2013 | Hachiya |
| 2013/0263016 | A1 | 10/2013 | Lehtiniemi et al. |
| 2013/0265227 | A1 | 10/2013 | Julian |
| 2013/0271397 | A1 | 10/2013 | Hildreth et al. |
| 2013/0278501 | A1 | 10/2013 | Bulzacki |
| 2013/0286004 | A1 | 10/2013 | Mcculloch et al. |
| 2013/0293456 | A1 | 11/2013 | Son et al. |
| 2013/0293468 | A1 | 11/2013 | Perez et al. |
| 2013/0300648 | A1 | 11/2013 | Kim et al. |
| 2013/0300654 | A1 | 11/2013 | Seki |
| 2013/0307945 | A1 | 11/2013 | Cheng et al. |
| 2013/0321462 | A1 | 12/2013 | Salter et al. |
| 2013/0325326 | A1 | 12/2013 | Blumenberg et al. |
| 2013/0326341 | A1 | 12/2013 | Nonaka |
| 2013/0326364 | A1 | 12/2013 | Latta et al. |

(56) References Cited

U.S. PATENT DOCUMENTS

| | | |
|---|---|---|
| 2013/0328925 A1 | 12/2013 | Latta et al. |
| 2013/0332890 A1 | 12/2013 | Ramic et al. |
| 2013/0335301 A1* | 12/2013 | Wong .................... G06T 19/006 |
| | | 345/8 |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0024324 A1 | 1/2014 | Mumick |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1 | 5/2014 | Song et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0181683 A1 | 6/2014 | Lim et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0268925 A1 | 9/2014 | Lee et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0143251 A1 | 5/2015 | Bailiang et al. |
| 2015/0145887 A1 | 5/2015 | Forutanpour et al. |
| 2015/0149929 A1 | 5/2015 | Shepherd et al. |
| 2015/0149961 A1 | 5/2015 | Karakotsios |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0187093 A1 | 7/2015 | Chu et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1* | 8/2015 | Kruglick ............... G06T 19/006 |
| | | 345/633 |
| 2015/0227285 A1 | 8/2015 | Lee et al. |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0255067 A1 | 9/2015 | White et al. |
| 2015/0262428 A1 | 9/2015 | Tatzgern et al. |
| 2015/0277699 A1 | 10/2015 | Algreatly |
| 2015/0286741 A1 | 10/2015 | Zhu et al. |
| 2015/0287403 A1 | 10/2015 | Holzer Zaslansky et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0041391 A1 | 2/2016 | Van et al. |
| 2016/0050642 A1* | 2/2016 | Brown ................ H04W 68/005 |
| | | 455/418 |
| 2016/0062636 A1 | 3/2016 | Jung et al. |
| 2016/0070448 A1 | 3/2016 | Krol |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0188181 A1 | 6/2016 | Smith |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291922 A1 | 10/2016 | Montgomerie et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |

(56) References Cited

U.S. PATENT DOCUMENTS

| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1 | 12/2016 | Kawasima |
| 2016/0370858 A1 | 12/2016 | LeppÄnen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2016/0379418 A1 | 12/2016 | Osborn et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0052373 A1 | 2/2017 | Memmott et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1* | 7/2017 | Sheaffer ............. G02B 27/0093 |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0357390 A1 | 12/2017 | Alonso Ruiz et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |
| 2018/0095635 A1 | 4/2018 | Valdivia et al. |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1* | 6/2018 | Inagi .................... G06F 3/0482 |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0288206 A1 | 10/2018 | Stimpson et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0004683 A1 | 1/2019 | Pahud et al. |
| 2019/0005055 A1 | 1/2019 | Andrew et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0130733 A1 | 5/2019 | Hodge |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |

(56) References Cited

U.S. PATENT DOCUMENTS

| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1 | 10/2019 | Lee et al. |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1 | 4/2020 | Enriquez et al. |
| 2020/0117213 A1 | 4/2020 | Tian et al. |
| 2020/0126291 A1 | 4/2020 | Nguyen et al. |
| 2020/0126301 A1 | 4/2020 | Kim et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0258481 A1 | 8/2020 | Woo et al. |
| 2020/0267326 A1 | 8/2020 | Yim |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0410960 A1 | 12/2020 | Saito et al. |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1* | 3/2021 | Croxford .............. G06V 10/82 |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1* | 5/2021 | Kimura .................. G06T 17/20 |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0319617 A1 | 10/2021 | Ahn et al. |
| 2021/0326094 A1 | 10/2021 | Buerli et al. |

(56) References Cited

U.S. PATENT DOCUMENTS

| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0339134 A1 | 11/2021 | Knoppert |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0352172 A1 | 11/2021 | Kim et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2021/0409903 A1 | 12/2021 | Shapiro et al. |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0122303 A1 | 4/2022 | Sasikumar et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0252882 A1 | 8/2022 | Berliner et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319134 A1 | 10/2022 | Rodrigues et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1* | 4/2023 | Yang .................... G06V 20/52 |
| | | 345/633 |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0206921 A1 | 6/2023 | Edelsburg et al. |
| 2023/0221833 A1 | 7/2023 | Holder et al. |
| 2023/0236660 A1 | 7/2023 | Kundu |
| 2023/0244857 A1 | 8/2023 | Weiss et al. |

(56) References Cited

U.S. PATENT DOCUMENTS

| | | |
|---|---|---|
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove, Jr. et al. |
| 2023/0315270 A1 | 10/2023 | Hylak et al. |
| 2023/0315385 A1 | 10/2023 | Akmal et al. |
| 2023/0316634 A1 | 10/2023 | Chiu et al. |
| 2023/0316658 A1 | 10/2023 | Smith et al. |
| 2023/0325003 A1 | 10/2023 | Gitter et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0350537 A1 | 11/2023 | Hylak et al. |
| 2023/0350539 A1 | 11/2023 | Owen et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0360264 A1 | 11/2023 | Wu et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0126362 A1 | 4/2024 | Burns et al. |
| 2024/0135612 A1 | 4/2024 | Hold-geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0256032 A1 | 8/2024 | Holder et al. |
| 2024/0265656 A1 | 8/2024 | Victor-faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0302948 A1 | 9/2024 | Hylak et al. |
| 2024/0310971 A1 | 9/2024 | Kawashima et al. |
| 2024/0329797 A1 | 10/2024 | Hylak et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1 | 4/2025 | Deliz Centeno et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |

(56)                    References Cited

U.S. PATENT DOCUMENTS

| 2025/0224811 A1 | 7/2025 | Lindmeier et al. |
| 2025/0232541 A1 | 7/2025 | Chand et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |
| 2025/0291470 A1 | 9/2025 | Hylak et al. |
| 2025/0306727 A1 | 10/2025 | Kawashima et al. |
| 2025/0322612 A1 | 10/2025 | Cerra et al. |
| 2025/0348186 A1 | 11/2025 | Krivoruchko |
| 2025/0350902 A1 | 11/2025 | Keatch et al. |

FOREIGN PATENT DOCUMENTS

| CN | 102298493 A | 12/2011 |
| CN | 104714771 A | 6/2015 |
| CN | 104981681 A | 10/2015 |
| CN | 105264461 A | 1/2016 |
| CN | 105264478 A | 1/2016 |
| CN | 106575149 A | 4/2017 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111641843 A | 9/2020 |
| CN | 111913565 A | 11/2020 |
| CN | 112068757 A | 12/2020 |
| CN | 113168737 A | 7/2021 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H064596 A | 1/1994 |
| JP | H1051711 A | 2/1998 |
| JP | H1078845 A | 3/1998 |
| JP | H11289555 A | 10/1999 |
| JP | 2000163031 A | 6/2000 |
| JP | 2002342033 A | 11/2002 |
| JP | 2004510239 A | 4/2004 |
| JP | 2005215144 A | 8/2005 |
| JP | 2005333524 A | 12/2005 |
| JP | 2006004093 A | 1/2006 |
| JP | 2006107048 A | 4/2006 |
| JP | 2006146803 A | 6/2006 |
| JP | 2006295236 A | 10/2006 |
| JP | 2011203880 A | 10/2011 |
| JP | 2012234550 A | 11/2012 |
| JP | 2013178639 A | 9/2013 |
| JP | 2013196158 A | 9/2013 |
| JP | 2013254358 A | 12/2013 |
| JP | 2013257716 A | 12/2013 |
| JP | 2014021565 A | 2/2014 |
| JP | 2014059840 A | 4/2014 |
| JP | 2014071663 A | 4/2014 |
| JP | 2014099184 A | 5/2014 |
| JP | 2014514652 A | 6/2014 |
| JP | 2014514653 A | 6/2014 |
| JP | 2015056173 A | 3/2015 |
| JP | 2015515040 A | 5/2015 |
| JP | 2015118332 A | 6/2015 |
| JP | 2015222565 A1 | 12/2015 |
| JP | 2016096513 A | 5/2016 |
| JP | 2016194744 A | 11/2016 |
| JP | 2017027206 A | 2/2017 |
| JP | 2017058528 A | 3/2017 |
| JP | 2017126009 A | 7/2017 |
| JP | 2017525002 A | 8/2017 |
| JP | 2017531221 A | 10/2017 |
| JP | 2018005516 A | 1/2018 |
| JP | 2018005517 A | 1/2018 |
| JP | 2018041477 A | 3/2018 |
| JP | 2018514005 A | 5/2018 |
| JP | 2018088118 A | 6/2018 |
| JP | 2018101019 A | 6/2018 |
| JP | 2018106499 A | 7/2018 |
| JP | 6438869 B2 | 12/2018 |
| JP | 2019040333 A | 3/2019 |
| JP | 2019515361 A | 6/2019 |
| JP | 2019169154 A | 10/2019 |
| JP | 2019175449 A | 10/2019 |
| JP | 2019527881 A | 10/2019 |
| JP | 2019532382 A | 11/2019 |
| JP | 2019536131 A | 12/2019 |
| JP | 2020503595 A | 1/2020 |
| JP | 2020086913 A | 6/2020 |
| JP | 2022053334 A | 4/2022 |
| JP | 2022175629 A | 11/2022 |
| JP | 2023052278 A | 4/2023 |
| KR | 20110017236 A | 2/2011 |
| KR | 10-2011-0128487 A | 11/2011 |
| KR | 20140097654 A | 8/2014 |
| KR | 20160012139 A | 2/2016 |
| KR | 20170027240 A | 3/2017 |
| KR | 20180102171 A | 9/2018 |
| KR | 20190100957 A | 8/2019 |
| KR | 20200010296 A | 1/2020 |
| KR | 20200035103 A | 4/2020 |
| KR | 20200110788 A | 9/2020 |
| KR | 10-2020-0140378 A | 12/2020 |
| KR | 20200135496 A | 12/2020 |
| KR | 20210083016 A | 7/2021 |
| KR | 20210123530 A | 10/2021 |
| WO | 2010026519 A1 | 3/2010 |
| WO | 2011008638 A1 | 1/2011 |
| WO | 2012145180 A1 | 10/2012 |
| WO | 2013169849 A2 | 11/2013 |
| WO | 2013/184447 A2 | 12/2013 |
| WO | 2014105276 A1 | 7/2014 |
| WO | 2014/190106 A1 | 11/2014 |
| WO | 2014203301 A1 | 12/2014 |
| WO | 2015130150 A1 | 9/2015 |
| WO | 2015192117 A1 | 12/2015 |
| WO | 2015195216 A1 | 12/2015 |
| WO | 2016/014877 A1 | 1/2016 |
| WO | 2016118344 A1 | 7/2016 |

(56) References Cited

FOREIGN PATENT DOCUMENTS

| WO | 2016/126522 A1 | 8/2016 |
| WO | 2017024142 A1 | 2/2017 |
| WO | 2017088487 A1 | 6/2017 |
| WO | 2018/005557 A1 | 1/2018 |
| WO | 2018046957 A2 | 3/2018 |
| WO | 2018/090060 A1 | 5/2018 |
| WO | 2018106299 A1 | 6/2018 |
| WO | 2018116556 A1 | 6/2018 |
| WO | 2018/125428 A1 | 7/2018 |
| WO | 2018175735 A1 | 9/2018 |
| WO | 2018/213801 A1 | 11/2018 |
| WO | 2019067902 A1 | 4/2019 |
| WO | 2019074771 A1 | 4/2019 |
| WO | 2019142560 A1 | 7/2019 |
| WO | 2019/152286 A2 | 8/2019 |
| WO | 2019172678 A1 | 9/2019 |
| WO | 2019213111 A1 | 11/2019 |
| WO | 2019217163 A1 | 11/2019 |
| WO | 2020066682 A1 | 4/2020 |
| WO | 2020105349 A1 | 5/2020 |
| WO | 2020121483 A1 | 6/2020 |
| WO | 2020179027 A1 | 9/2020 |
| WO | 2020247256 A1 | 12/2020 |
| WO | 2021/061349 A1 | 4/2021 |
| WO | 2021061351 A1 | 4/2021 |
| WO | 2021133053 A1 | 7/2021 |
| WO | 2021173839 A1 | 9/2021 |
| WO | 2021/203856 A1 | 10/2021 |
| WO | 2021202783 A1 | 10/2021 |
| WO | 2022/055821 A1 | 3/2022 |
| WO | 2022/067343 A2 | 3/2022 |
| WO | 2022046340 A1 | 3/2022 |
| WO | 2022055822 A1 | 3/2022 |
| WO | 2022066399 A1 | 3/2022 |
| WO | 2022066535 A2 | 3/2022 |
| WO | 2022067075 A1 | 3/2022 |
| WO | 2022072187 A2 | 4/2022 |
| WO | 2022146936 A1 | 7/2022 |
| WO | 2022146938 A1 | 7/2022 |
| WO | 2022147146 A1 | 7/2022 |
| WO | 2022164881 A1 | 8/2022 |
| WO | 2022/204664 A1 | 9/2022 |
| WO | 2022192040 A1 | 9/2022 |
| WO | 2022/208797 A1 | 10/2022 |
| WO | 2022225795 A1 | 10/2022 |
| WO | 2023043646 A1 | 3/2023 |
| WO | 2023096940 A2 | 6/2023 |
| WO | 2023141535 A1 | 7/2023 |
| WO | 2024/064036 A1 | 3/2024 |
| WO | 2024/064373 A1 | 3/2024 |

OTHER PUBLICATIONS

Extended European Search Report received for European Patent Application No. 24171800.6, mailed on Sep. 5, 2024, 15 pages.

Extended European Search Report received for European Patent Application No. 24171804.8, mailed on Sep. 5, 2024, 13 pages.

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.

International Search Report received for PCT Patent Application No. PCT/US2022/082379, mailed on May 30, 2023, 7 pages.

International Search Report received for PCT Patent Application No. PCT/US2023/019309, mailed on Sep. 1, 2023, 6 pages.

International Search Report received for PCT Patent Application No. PCT/US2023/074957, mailed on Jan. 30, 2024, 7 pages.

International Search Report received for PCT Patent Application No. PCT/US2023/074968, mailed on Feb. 26, 2024, 7 pages.

International Search Report received for PCT Patent Application No. PCT/US2024/030661, mailed on Nov. 4, 2024, 5 pages.

Non-Final Office Action received for U.S. Appl. No. 18/429,301, mailed on Jun. 12, 2024, 28 pages.

Notice of Allowance received for U.S. Appl. No. 18/429,294, mailed on Jun. 21, 2024, 10 pages.

Notice of Allowance received for U.S. Appl. No. 18/429,294, mailed on Oct. 31, 2024, 10 pages.

Notice of Allowance received for U.S. Appl. No. 18/429,301, mailed on Nov. 22, 2024, 8 pages.

Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.

Apple, Use Continuity to Connect Your Mac, iPhone, iPad, and Apple Watch, Apple Support, Available online at <https://support.apple.com/en-us/HT204681>, [Retrieved from Internet on Dec. 23, 2022], 4 pages.

Didehkhorshid, et al., Text Input in Virtual Reality Using a Tracked Drawing Tablet, HCII 2020, LNCS 12428, 2020, pp. 314-329.

Edmiston, et al., Touch-Enabled Input Devices for Controlling Virtual Environments, 12th IFAC Symposium on Analysis, Design and Evaluation of Human-Machine Systems, Las Vegas, NV, USA, Aug. 11-15, 2013, pp. 349-356.

Huang, et al., Proxy-Based Security Audit System for Remote Desktop Access, Computer Communications and Networks, ICCCN 2009. Proceedings of 18th International Conference On, IEEE, Piscataway, NJ, USA, Aug. 3, 2009, 5 pages.

Metalnwood, Using a Tablet for Touch Control, with VR Headset on. (Demo Vid), Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Sun, et al., MagicHand: Interact with IoT Devices in Augmented Reality Environment, 2019 IEEE Conference on Virtual Reality and 3D User Interfaces, Osaka, Japan, Mar. 23-27, 2019, [retrieved on Dec. 4, 2020], 6 pages.

Wood, Tyriel, The Hololens 2 Tour!—Discovering a World of Holograms, YouTube [online]. YouTube, Mar. 23, 2021 [retrieved on Dec. 7, 2023], Retrieved from the Internet: <URL: https://www.youtube.com/watch?v=rMks7sMzPxl>, 2 pages.

Writtenhouse, Sandy, How to Use Live View on Google Maps, Available online at <https://www.lifewire.com/use-live-view-google-maps-5323691>, [Retrieved from Internet on Jun. 27, 2024], Jul. 5, 2022, 6 pages.

Adding Environments, Available online at: https://manual.keyshot.com/manual/environments/adding-environments/, [retrieved on Jun. 9, 2023], 2 pages.

AquaSnap Window Manager: dock, snap, tile, organize [online], Nurgo Software, Available online at: <https://www.nurgo-software.com/products/aquasnap>, [retrieved on Jun. 27, 2023], 5 pages.

Area Light, Available online at: https://manual.keyshot.com/manual/materials/material-types/light-sources/area-light/, [retrieved on Jun. 9, 2023], 24 pages.

Artec Leo, Artec 3D [online], 2018 [retrieved on Apr. 25, 2024]. Retrieved from the Internet: <URL: https://artec3d.com/portable-3d-scanners/artec-leo>, 39 pages.

Artec Leo Full 3D Scanning Demo w/ Sample Data, Digitize Designs, LLC, Available online at: < https://www.youtube.com/watch?v=ecBKo_h3Pug>, [retrieved on Sep. 1, 2022], Feb. 22, 2019, 3 pages.

Curious Blocks Alternatives 12, progsoft [online]. Profsoft, Available Online at: <URL: https://progsoft.net/en/software/curious-blocks>, [retrieved on Apr. 25, 2024], 2024, 7 pages.

Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.

Feature Highlights, Available online at: https://manual.keyshot.com/manual/whats-new/feature-highlights/, [retrieved on Jun. 9, 2023], 28 pages.

Home | Virtual Desktop [online], Virtual Desktop, Available online at: <https://www.vrdesktop.net>, [retrieved on Jun. 29, 2023], 4 pages.

Kitasenju Design, X [online], X Corp., Available Online at: <URL: https://twitter.com/kitasenjudesign/status/1282665402812608513>, [retrieved on Apr. 25, 2024], 2024, 1 page.

(56)     References Cited

OTHER PUBLICATIONS

Letter Restarting Period for Response received for U.S. Appl. No. 15/644,639, mailed on Sep. 28, 2018, 8 pages.
Light Manager, Available online at: https://manual.keyshot.com/manual/lighting/lighting-manager/, [retrieved on Jun. 9, 2023], 3 pages.
Magica Voxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light | Precision 0.05mm), Revpoint [online]. Revpoint 3D, <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Reality Scan, Unreal Engine [online], [retrieved on Jun. 14, 2024]. Retrieved from the Internet: <URL: https://www.unrealengine.com/en-us/realityscan>, 11 pages.
RealityScan Available Now | Capture the World and Create Your Own, YouTube [online]. YouTube, Dec. 1, 2022 [retrieved on Jun. 14, 2024]. Retrieved from the Internet: <URL: https://www.youtube.com/watch?v=fXLOMOWWBJQ>, 2 pages.
ShareVOX, Phoria [online]. Phoria Pty Ltd, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
VoxEdit Beta Tutorial—Introduction and How to Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.
Berard Francois, "A Study on Two-Dimensional Scrolling with Head Motion", CLIPS—Imag Technical Report. France, Ref: < TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software And Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
Cas and Chary Xr, "Oculus Go & Your Phone as 2nd Controller!!—An Inexpensive Way to Play PC VR Games", posted on Mar. 8, 2019, https://www.youtube.com/watch?v=i_iRVa0kemw, 2019, 4 pages.
Chatterjee et al., "Gaze+Gesture: Expressive, Precise and Targeted Free-Space Interactions", ICMI '15, Nov. 9-13, 2015, 8 pages.
Choe et al., "Augmented-Reality-Based 3D Emotional Messenger for Dynamic User Communication with Smart Devices", Electronics, vol. 9, No. 1127, Jul. 10, 2020, 15 pages.
Dhakal et al., "SLAM-Share: Visual Simultaneous Localization and Mapping for Real-time Multi-user Augmented Reality", CoNEXT '22, Dec. 6-9, 2022, Roma, Italy, 14 pages.
Fatima et al., "Eye Movement Based Human Computer Interaction", 3rd International Conference on Recent Advances in Information Technology (RAIT), Mar. 3, 2016, pp. 489-494.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Kim et al., "Virtual Object Sizes for Efficient and Convenient Mid-air Manipulation", The Visual Computer, vol. 38, No. 9, Jul. 1, 2022, pp. 3463-3474.
Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lee et al., "A Multi-Touch Three Dimensional Touch-Sensitive Tablet", CHI'85 Proceedings, Apr. 1985, pp. 21-25.
Lin et al., "Towards Naturally Grabbing and Moving Objects in VR", IS&T International Symposium on Electronic Imaging and the Engineering Reality of Virtual Reality, 2016, 6 pages.
Lin et al., "Ubii: Physical World Interaction Through Augmented Reality", Publisher: IEEE, vol. 16, No. 3, DOI: 10.1109/TMC.2016.2567378, May 13, 2016, pp. 872-885.

(56) References Cited

OTHER PUBLICATIONS

Locher et al., "Mobile Phone and Cloud—a Dream Team for 3D Reconstruction", 2016 IEEE Winter Conference on Applications of Computer Vision (WACV), 2016, pp. 1-8.

Lor Cas, "Reality Capture: Exporting Mesh", Youtube, https://www.youtube.com/watch?v=PdvTRa2B_s0, Dec. 10, 2020, 2 pages.

Macmostvideo, "A Beginner's Guide to Selecting Items on Your Mac (#1566)", Bibliographic Information, Jan. 4, 2018, Retrieved from <URL:https://www.youtube.com/watch?v=a6MDAuh7MOQ &ab_channel=macmostvideo/>, [retrieved on Feb. 19, 2025], Most relevant passage of the video is 00:10 to 00:30, 2 pages.

Mcgill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.

Mendes et al., "Mid-Air Interactions Above Stereoscopic Interactive Tables", IEEE Symposium on 3D User Interfaces (3DUI), Mar. 29-30, 2014, pp. 3-10.

Nunez Angulo et al., "Manual for the Design of Didactic Units in Augmented Reality Using the Cospaces EDU Application", 2020, 75 pages.

Pfeuffer et al., "Gaze + Pinch Interaction in Virtual Reality", In Proceedings of SUI '17, Brighton, United Kingdom, Oct. 16-17, 2017, pp. 99-108.

Pfeuffer et al., "Gaze and Touch Interaction on Tablets", UIST '16, Tokyo, Japan, ACM, Oct. 16-19, 2016, pp. 301-311.

Process a 3D Scan With Projection in Reality Capture (RC), Wayback Machine, https://web.archive.org/web/20200116135047/ http:/www.pi3dscan.com/index.php/instructions/item/process-a-3d-scan-with-projection-in-reality-capture-rc, Jan. 16, 2020, 1 page.

Qi et al., "PointNet++: Deep Hierarchical Feature Learning on Point Sets in a Metric Space", Stanford University, Jun. 7, 2017, 14 pages.

Ran et al., "Multi-User Augmented Reality with Communication Efficient and Spatially Consistent Virtual Objects", CoNEXT '20, Dec. 1-4, 2020, Barcelona, Spain, 13 pages.

Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

Rubine Dean, "Combining Gestures and Direct Manipulation", CHI'92, May 3-7, 1992, pp. 659-660.

Rubine Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Schenk et al., "SPOCK: A Smooth Pursuit Oculomotor Control Kit", CHI'16 Extended Abstracts, San Jose, CA, USA, ACM, May 7-12, 2016, pp. 2681-2687.

Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021. 91668, Mar. 8, 2021, 119 pages.

Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

Strand Robin, "Surface Skeletons in Grids With Non-cubic Voxels", 2004 IEEE Xplore, Available Online at: <DOI: 10.1109/ICPR.2004. 1334195>, Sep. 2004, 5 pages.

Tolle et al., "Design of Head Movement Controller System (HEMOCS) for Control Mobile Application through Head Pose Movement Detection", Retrieved from :<https://www.google.com/url?sa=t &source=web&rct=j&opi=89978449&url=https://online-journals. org/index.php/i-jim/article/download/5552/4029/19224&ved= 2ahUKEwj-w86vga-HAxUJJDQIHYMNDNw4HhAWegQILhAB &usg=AOvVaw3HR1t7v8Rx7osc1lp0UfOh>, DOI: <httpdx.doi.org/ 10.3991/ijim.v10i3.5552>, Retrieved on Dec. 26, 2024, 2016, 5 pages.

Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Simple Modal Window With Background Blur Effect, Available online at: <http://web.archive.org/web/20160313233427/https:// www.cssscript.com/simple-modal-window-with-background-blur-effect/>, Mar. 13, 2016, 5 pages.

Yamada Yoshihiro, "How to Generate a Modal Window with ModalPopup Control", Available online at: <http://web.archive.org/ web/20210920015801/https://atmarkit.itmedia.co.jp/fdotnet/dotnettips/ 580aspajaxmodalpopup/aspajaxmodalpopup.html > [Search Date Aug. 22, 2023], Sep. 20, 2021, 8 pages (1 page of English Abstract and 7 pages of Official Copy).

Yue et al., "Optimal Region Selection for Stereoscopic Video Subtitle Insertion", IEEE Transactions on Circuits and Systems for Video Technology, vol. 28, No. 11, Nov. 2018, 13 pages.

"VR Design Best Practices", LeapMotion, 2015, 31 pages.

Bermejo et al. "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.

Dudley et al. "Fast and Precise Touch-Based Text Entry for Head-Mounted Augmented Reality with Variable Occlusion", ACM Transactions on Computer-Human Interaction (TOCHI), vol. 25, No. 5, Article 30, Dec. 13, 2018, 40 pages.

Kim et al. "Pseudo-haptic Button for Improving User Experience of Mid-air Interaction in VR", International Journal of Human-Computer Studies. Dec. 1, 2022; 168:102907, Available online Aug. 2022 (Year: 2022), 11 pages.

Lee et al. "UbiPoint: Towards Non-intrusive Mid-Air Interaction for Hardware Constrained Smart Glasses", In Proceedings of the 11th ACM Multimedia Systems Conference, May 27, 2020, pp. 190-201.

Speicher et al. "Pseudo-haptic Controls for Mid-air Finger-based Menu Interaction", CHI'19 Extended Abstracts, May 4-9, 2019, Conference on Human Factors in Computing Systems, 2019, pp. 1-6.

Notice of Allowance received for U.S. Appl. No. 18/427,434, mailed on Sep. 17, 2025, 10 pages.

Notice of Allowance received for U.S. Patent Application No. 18/057, 172, mailed on Jul. 15, 2025, 12 pages.

Notice of Allowance received for U.S. Appl. No. 18/174,403, mailed on Aug. 21, 2025, 13 pages.

Notice of Allowance received for U.S. Patent Application No. 18/894, 997, mailed on Aug. 12, 2025, 13 pages.

Notice of Allowance received for U.S. Appl. No. 18/322,469, mailed on Jul. 7, 2025, 14 pages.

Notice of Allowance received for U.S. Appl. No. 18/322,469, mailed on Mar. 19, 2025, 14 pages.

Non-Final Office Action received for U.S. Appl. No. 18/587,815, mailed on Sep. 25, 2025, 16 pages.

Non-Final Office Action received for U.S. Appl. No. 18/473,242, mailed on Sep. 5, 2025, 17 pages.

Non-Final Office Action received for U.S. Appl. No. 18/916,583, mailed on Oct. 2, 2025, 18 pages.

Corrected Notice of Allowability received for U.S. Appl. No. 18/157,040, mailed on Oct. 30, 2025, 2 pages.

Corrected Notice of Allowability received for U.S. Appl. No. 18/157,040, mailed on Sep. 25, 2025, 2 pages.

Supplemental Notice of Allowability received for U.S. Appl. No. 18/473,261, mailed on Sep. 30, 2025, 2 pages.

Final Office Action received for U.S. Appl. No. 18/518,340, mailed on Oct. 31, 2025, 20 pages.

Non-Final Office Action received for U.S. Appl. No. 18/515,191, mailed on Oct. 21, 2025, 20 pages.

Final Office Action received for U.S. Appl. No. 18/317,890, mailed on Sep. 3, 2025, 22 pages.

(56)　　　　　References Cited

OTHER PUBLICATIONS

Non-Final Office Action received for U.S. Appl. No. 18/057,172, mailed on Mar. 14, 2025, 22 pages.
Non-Final Office Action received for U.S. Appl. No. 17/933,020, mailed on Oct. 1, 2025, 28 pages.
Non-Final Office Action received for U.S. Appl. No. 17/934,104, mailed on Nov. 14, 2025, 30 pages.
Final Office Action received for U.S. Appl. No. 18/298,994, mailed on Sep. 12, 2025, 32 pages.
Non-Final Office Action received for U.S. Appl. No. 18/587,739, mailed on Sep. 16, 2025, 34 pages.
Final Office Action received for U.S. Appl. No. 18/473,260, mailed on Oct. 22, 2025, 38 pages.
Non-Final Office Action received for U.S. Appl. No. 18/473,239, mailed on Sep. 10, 2025, 38 pages.
Non-Final Office Action received for U.S. Appl. No. 18/473,256, mailed on Nov. 4, 2025., 38 pages.
International Search Report received for PCT Patent Application No. PCT/US2025/011189, mailed on Apr. 23, 2025, 4 pages.
Search Report received for Chinese Patent Application No. 202210728190.3, mailed on Aug. 29, 2025, 5 pages (2 pages of English Translation and 3 pages of Official Copy Only).
Corrected Notice of Allowability received for U.S. Appl. No. 18/919,095, mailed on Nov. 12, 2025, 5 pages.
Notice of Allowance received for U.S. Appl. No. 18/988,115, mailed on Oct. 7, 2025, 5 pages.
International Search Report received for PCT Patent Application No. PCT/US2025/032533, mailed on Oct. 30, 2025, 6 pages.
International Search Report received for PCT Patent Application No. PCT/US2025/032549, mailed on Oct. 23, 2025, 7 pages.
Notice of Allowance received for U.S. Appl. No. 18/471,729, mailed on Oct. 10, 2025, 7 pages.
Restriction Requirement received for U.S. Appl. No. 18/473,259, mailed on Oct. 30, 2025, 7 pages.

International Search Report received for PCT Patent Application No. PCT/US2025/029736, mailed on Nov. 6, 2025, 8 pages.
Notice of Allowance received for U.S. Appl. No. 18/473,182, mailed on Oct. 21, 2025, 8 pages.
Notice of Allowance received for U.S. Appl. No. 18/473,179, mailed on Oct. 6, 2025, 8 pages.
Notice of Allowance received for U.S. Appl. No. 18/473,262, mailed on Oct. 7, 2025, 8 pages.
Notice of Allowance received for U.S. Appl. No. 18/645,292, mailed on Nov. 4, 2025, 8 pages.
Notice of Allowance received for U.S. Appl. No. 18/882,622, mailed on Aug. 27, 2025, 8 pages.
Notice of Allowance received for U.S. Appl. No. 18/919,095, mailed on Oct. 23, 2025, 8 pages.
International Search Report received for PCT Patent Application No. PCT/US2025/029209, mailed on Nov. 5, 2025, 9 pages.
Notice of Allowance received for U.S. Appl. No. 18/153,943, mailed on Oct. 7, 2025, 9 pages.
Notice of Allowance received for U.S. Appl. No. 18/473,261, mailed on Sep. 23, 2025, 9 pages.
Non-Final Office Action received for U.S. Appl. No. 18/322,469, mailed on Nov. 15, 2024, 34 pages.
Ghosh, et al., "NotifiVIR: Exploring Interruptions and Notifications in Virtual Reality", IEEE transactions on visualization and computer graphics, vol. 24, No. 4, Apr. 2018, pp. 1447-1456.
Medeiros, et al., "Promoting Reality Awareness in Virtual Reality through Proxemics", IEEE Virtual Reality and 3D User Interfaces (VR), Mar. 27-Apr. 1, 2021, 11 pages.
Pfeuffer, et al., "Gaze+touch vs. Touch: What's the Trade-off When Using Gaze to Extend Touch to Remote Displays?", Advances In Databases And Information Systems, Aug. 30, 2015, pp. 349-367.
Zhuang, et al., "Distributed Architecture for 3D Graphics Rendering in Collaborative System", Computer and Modernization, Issue 4, 2017, 5 pages (1 page of English Abstract and 4 pages of Official Copy).

* cited by examiner

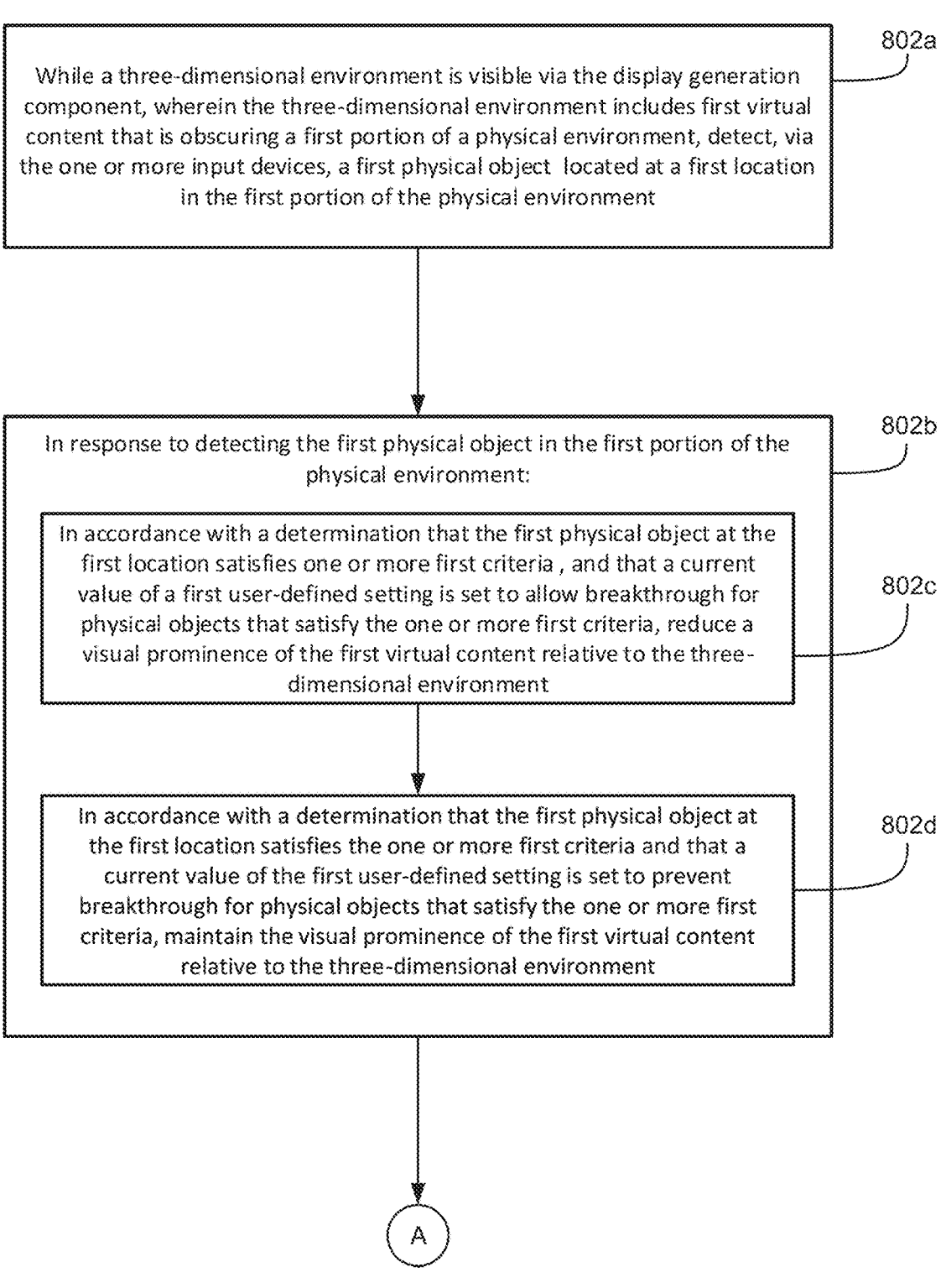

While a three-dimensional environment is visible via the display generation component, wherein the three-dimensional environment includes first virtual content that is obscuring a first portion of a physical environment, detect, via the one or more input devices, a first physical object located at a first location in the first portion of the physical environment                    802a In response to detecting the first physical object in the first portion of the physical environment:                    802b In accordance with a determination that the first physical object at the first location satisfies one or more first criteria , and that a current value of a first user-defined setting is set to allow breakthrough for physical objects that satisfy the one or more first criteria, reduce a visual prominence of the first virtual content relative to the three-dimensional environment                    802c In accordance with a determination that the first physical object at the first location satisfies the one or more first criteria and that a current value of the first user-defined setting is set to prevent breakthrough for physical objects that satisfy the one or more first criteria, maintain the visual prominence of the first virtual content relative to the three-dimensional environment                    802d

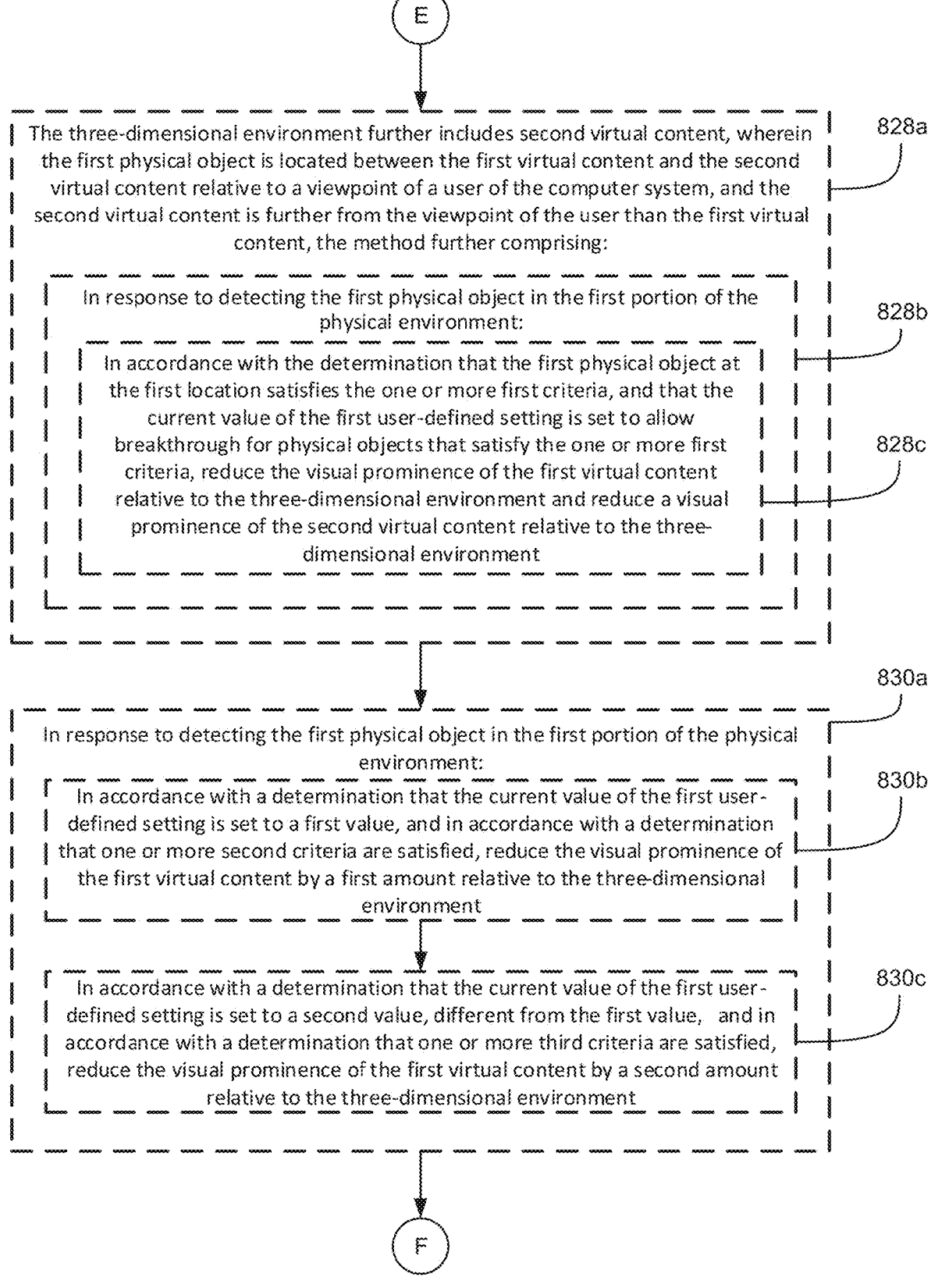

E

The three-dimensional environment further includes second virtual content, wherein the first physical object is located between the first virtual content and the second virtual content relative to a viewpoint of a user of the computer system, and the second virtual content is further from the viewpoint of the user than the first virtual content, the method further comprising:

828a

In response to detecting the first physical object in the first portion of the physical environment:

828b

In accordance with the determination that the first physical object at the first location satisfies the one or more first criteria, and that the current value of the first user-defined setting is set to allow breakthrough for physical objects that satisfy the one or more first criteria, reduce the visual prominence of the first virtual content relative to the three-dimensional environment and reduce a visual prominence of the second virtual content relative to the three-dimensional environment 828c In response to detecting the first physical object in the first portion of the physical environment:

830a

In accordance with a determination that the current value of the first user-defined setting is set to a first value, and in accordance with a determination that one or more second criteria are satisfied, reduce the visual prominence of the first virtual content by a first amount relative to the three-dimensional environment 830b In accordance with a determination that the current value of the first user-defined setting is set to a second value, different from the first value, and in accordance with a determination that one or more third criteria are satisfied, reduce the visual prominence of the first virtual content by a second amount relative to the three-dimensional environment 830c

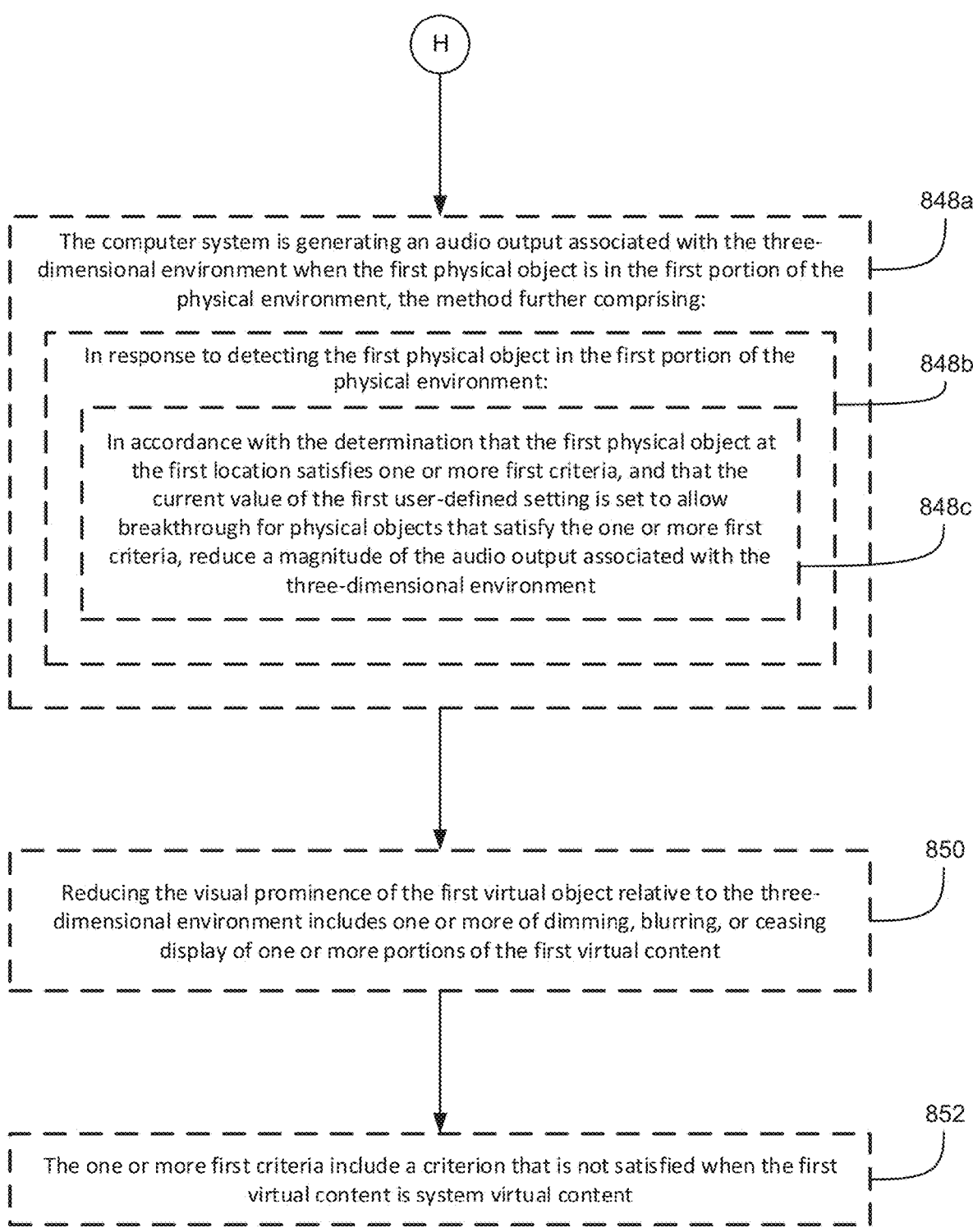

H

The computer system is generating an audio output associated with the three-dimensional environment when the first physical object is in the first portion of the physical environment, the method further comprising:

848a

In response to detecting the first physical object in the first portion of the physical environment:

848b

In accordance with the determination that the first physical object at the first location satisfies one or more first criteria, and that the current value of the first user-defined setting is set to allow breakthrough for physical objects that satisfy the one or more first criteria, reduce a magnitude of the audio output associated with the three-dimensional environment 848c Reducing the visual prominence of the first virtual object relative to the three-dimensional environment includes one or more of dimming, blurring, or ceasing display of one or more portions of the first virtual content

850

The one or more first criteria include a criterion that is not satisfied when the first virtual content is system virtual content

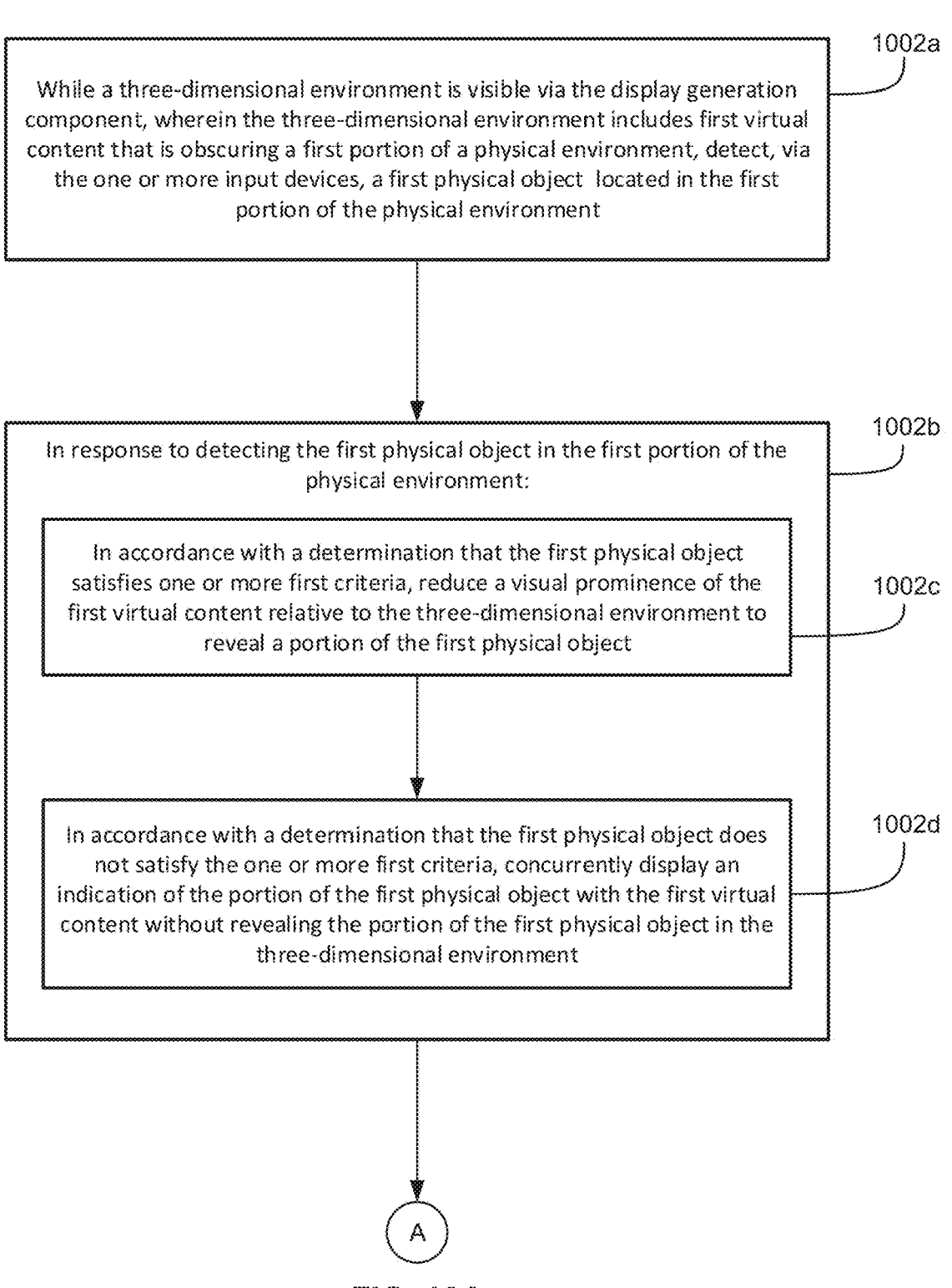

While a three-dimensional environment is visible via the display generation component, wherein the three-dimensional environment includes first virtual content that is obscuring a first portion of a physical environment, detect, via the one or more input devices, a first physical object located in the first portion of the physical environment 1002a In response to detecting the first physical object in the first portion of the physical environment:

1002b

In accordance with a determination that the first physical object satisfies one or more first criteria, reduce a visual prominence of the first virtual content relative to the three-dimensional environment to reveal a portion of the first physical object 1002c In accordance with a determination that the first physical object does not satisfy the one or more first criteria, concurrently display an indication of the portion of the first physical object with the first virtual content without revealing the portion of the first physical object in the three-dimensional environment 1002d

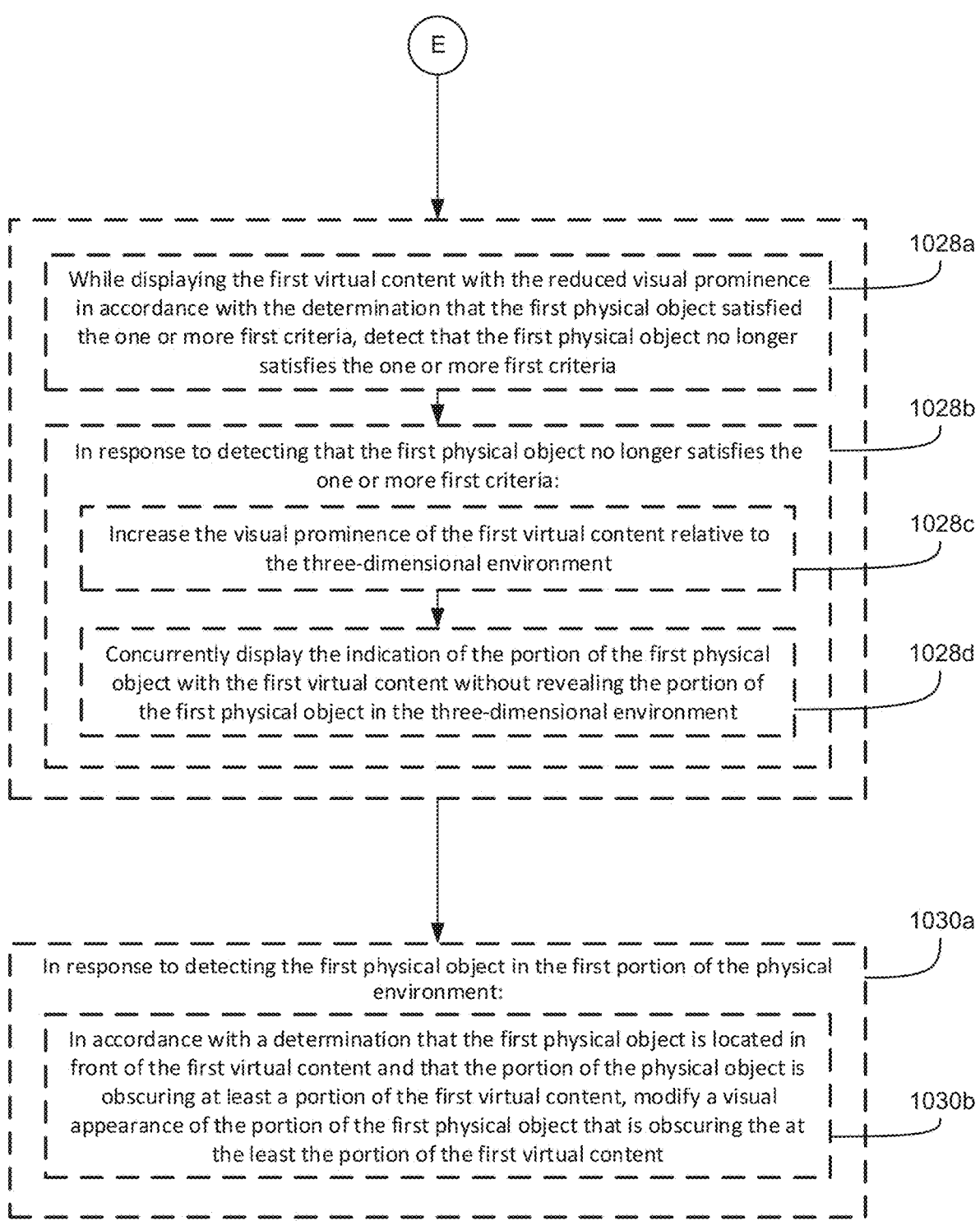

E

While displaying the first virtual content with the reduced visual prominence in accordance with the determination that the first physical object satisfied the one or more first criteria, detect that the first physical object no longer satisfies the one or more first criteria 1028a In response to detecting that the first physical object no longer satisfies the one or more first criteria:

1028b

Increase the visual prominence of the first virtual content relative to the three-dimensional environment 1028c Concurrently display the indication of the portion of the first physical object with the first virtual content without revealing the portion of the first physical object in the three-dimensional environment 1028d In response to detecting the first physical object in the first portion of the physical environment:

1030a

In accordance with a determination that the first physical object is located in front of the first virtual content and that the portion of the physical object is obscuring at least a portion of the first virtual content, modify a visual appearance of the portion of the first physical object that is obscuring the at least the portion of the first virtual content 1030b

FIG. 10F

OBSTRUCTED OBJECTS IN A THREE-DIMENSIONAL ENVIRONMENT

CROSS-REFERENCE TO RELATED APPLICATIONS

This application claims the benefit of U.S. Provisional Application No. 63/363,289, filed Apr. 20, 2022, the content of which is incorporated herein by reference in its entirety for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system reduces a visual prominence of virtual content relative to a three-dimensional environment in accordance with some embodiments. In some embodiments, a computer system displays an indication of a physical object in a three-dimensional environment in accordance with some embodiments.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1 is a block diagram illustrating an operating environment of a computer system for providing XR experiences in accordance with some embodiments.

FIGS. 8A-8I is a flowchart illustrating an exemplary method of reducing a visual prominence of virtual content relative to a three-dimensional environment in accordance with some embodiments.

FIGS. 10A-10F is a flowchart illustrating a method of displaying an indication of a physical object in a three-dimensional environment in accordance with some embodiments.

DESCRIPTION OF EMBODIMENTS

Figure 2:
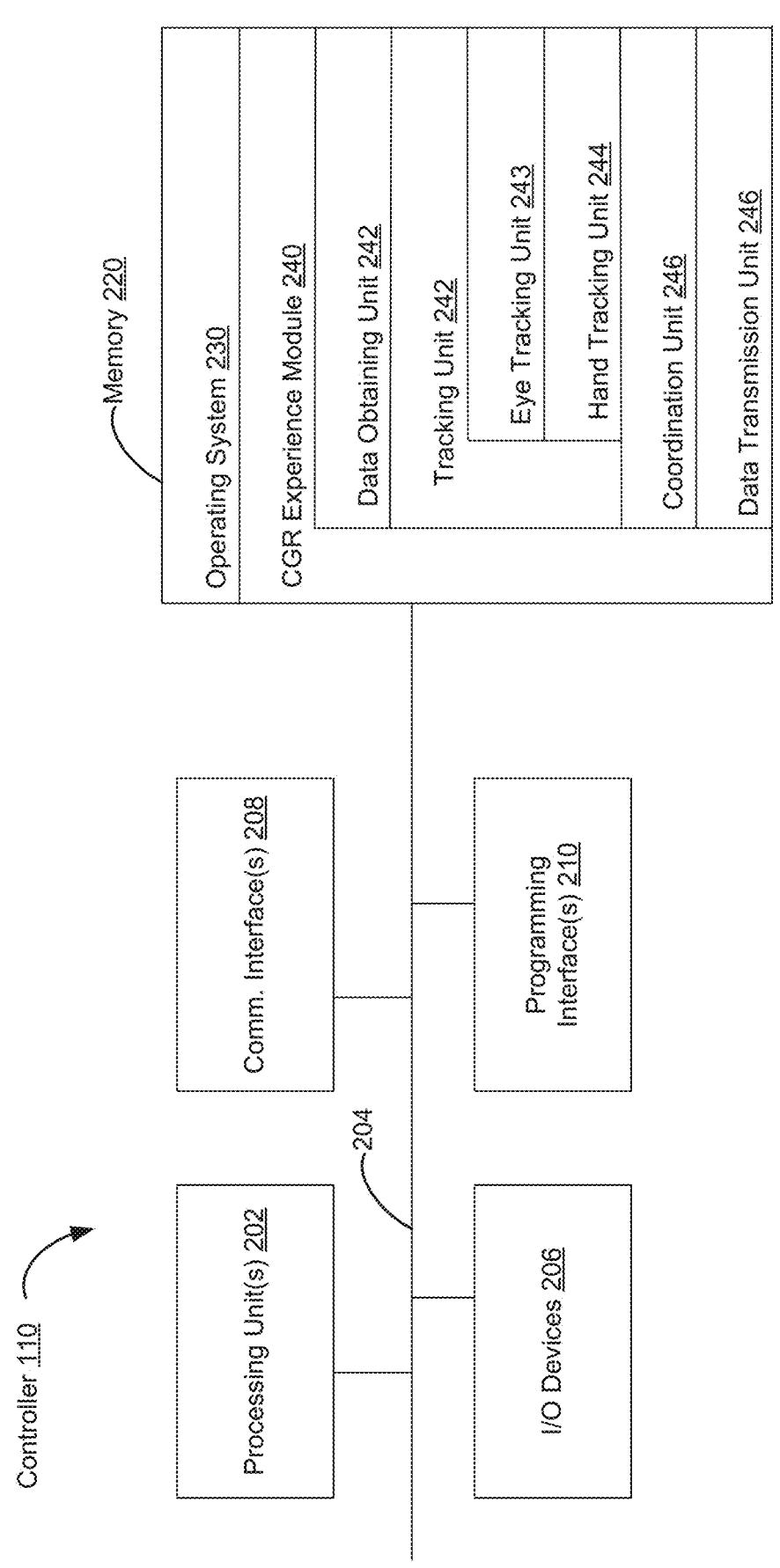
FIG. 2 is a block diagram illustrating a controller of a computer system that is configured to manage and coordinate a XR experience for the user in accordance with some embodiments.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a three-dimensional environment including first virtual content is visible via a display generation component and obscures one or more portions of a physical environment. In some embodiments, a first physical object is detected within the physical environment and in accordance with a determination that the first physical object satisfies one or more criteria to constitute a salient social interaction, a computer system reduces a visual prominence of the first virtual content and enables the first physical object to breakthrough the first virtual content. However, if a user-defined setting is set to prevent breakthrough for physical objects that satisfy the one or more criteria, the computer system optionally maintains the visual prominence of the first virtual content.

In some embodiments, a three-dimensional environment including first virtual content is visible via a display generation component and obscures one or more portions of a physical environment. In some embodiments, a first physical object is detected within the physical environment and in accordance with a determination that the first physical object satisfies one or more criteria to constitute a salient social interaction, a computer system reduces a visual prominence of the first virtual content and enables the first physical object to breakthrough the first virtual content. However, if the first physical object does not satisfy the one or more criteria, an indication representative of the first physical object is optionally concurrently displayed with the first virtual content.

Figure 1:
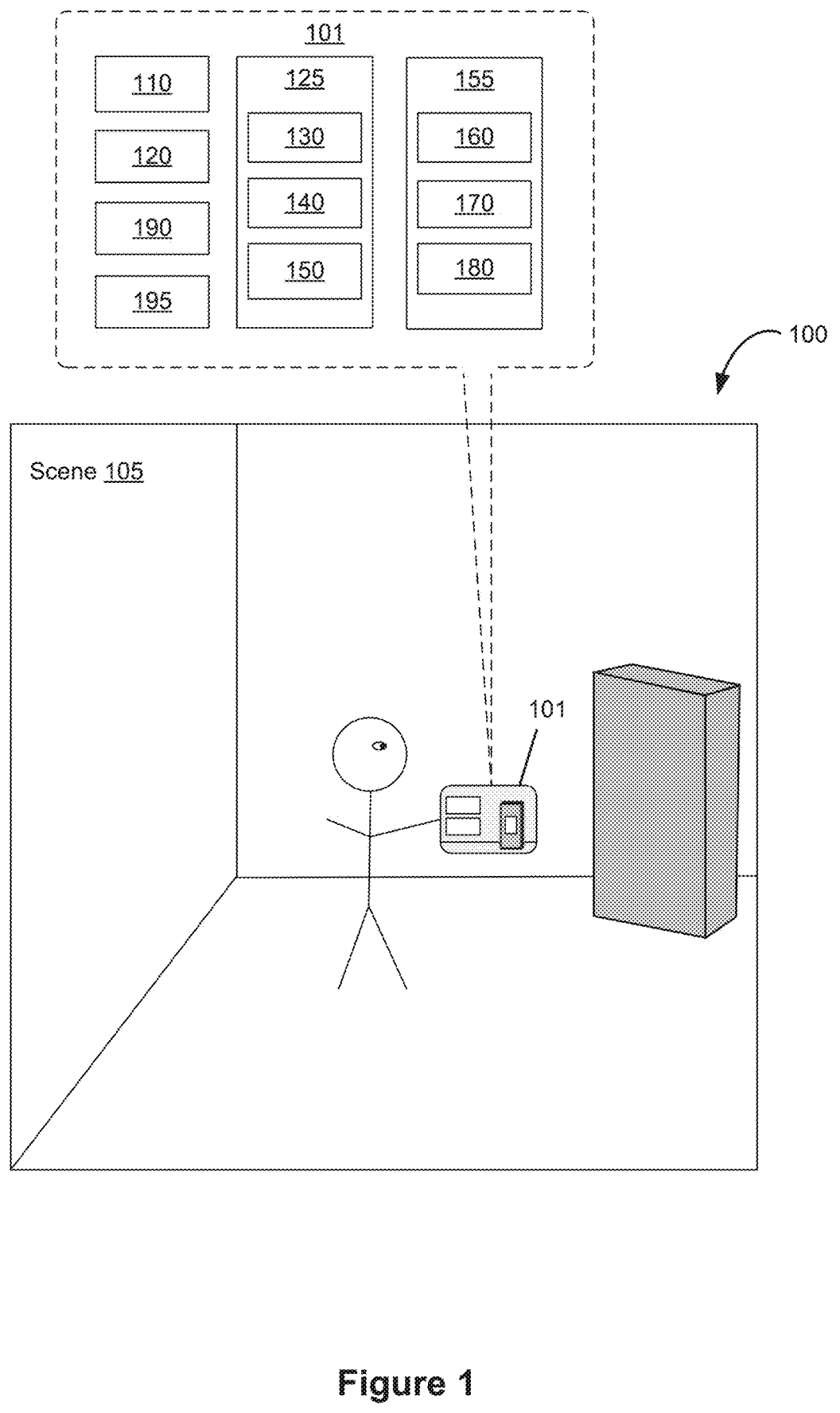

FIGS. 1-6 provide a description of example computer systems for providing XR experiences to users (such as described below with respect to methods 800 and/or 1000). FIGS. 7A-7E illustrate examples of a computer system reducing a visual prominence of virtual content relative to a three-dimensional environment in accordance with some embodiments. FIGS. 8A-8I is a flow diagram of methods of examples of a computer system reducing a visual prominence of virtual content relative to a three-dimensional environment in accordance with some embodiments. The user interfaces in FIGS. 7A-7E are used to illustrate the processes in FIGS. 8A-8I. FIGS. 9A-9E illustrate examples of a computer system displaying an indication of a physical object in a three-dimensional environment in accordance with some embodiments. FIGS. 10A-10F is a flow diagram of methods of a computer system displaying an indication of a physical object in a three-dimensional environment in accordance with some embodiments. The user interfaces in FIGS. 9A-9E are used to illustrate the processes in FIGS. 10A-10F.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment.

In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

Viewpoint-locked virtual object: A virtual object is viewpoint-locked when a computer system displays the virtual object at the same location and/or position in the viewport of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewport of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
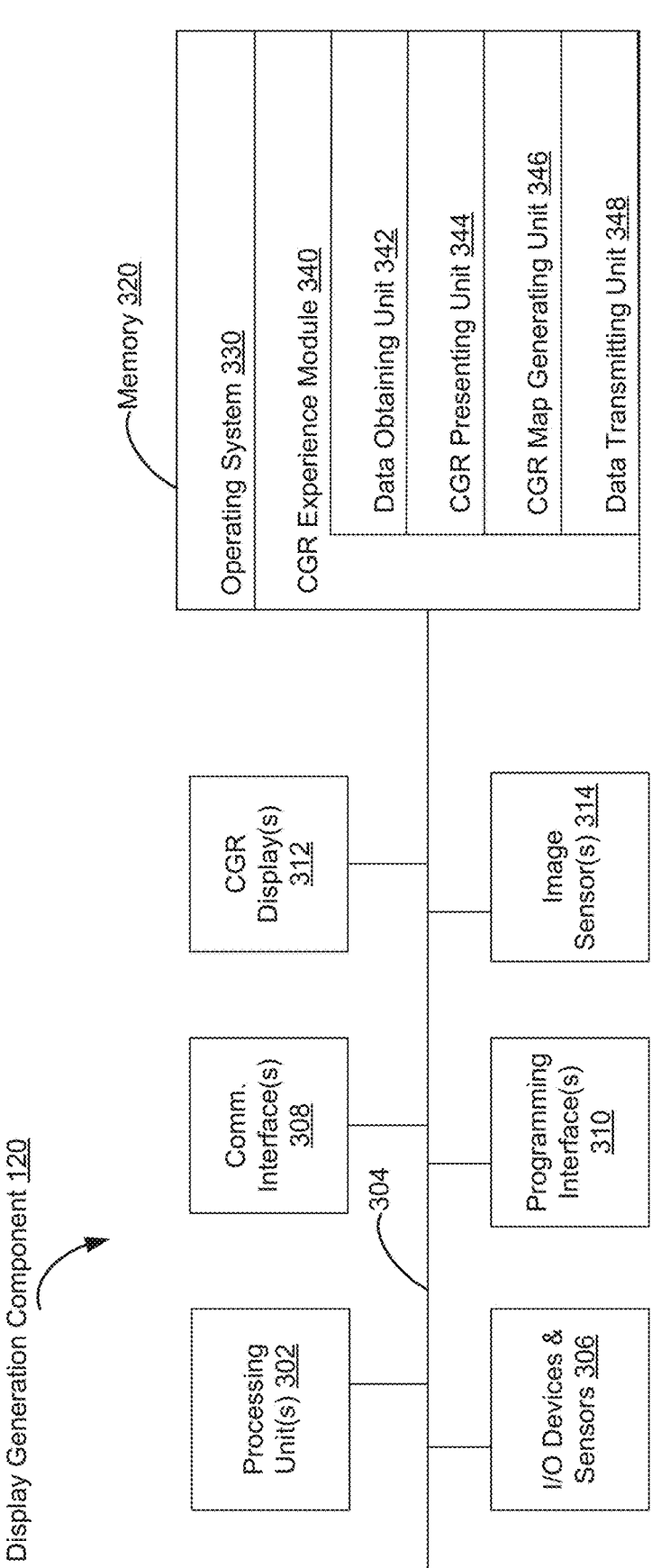
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
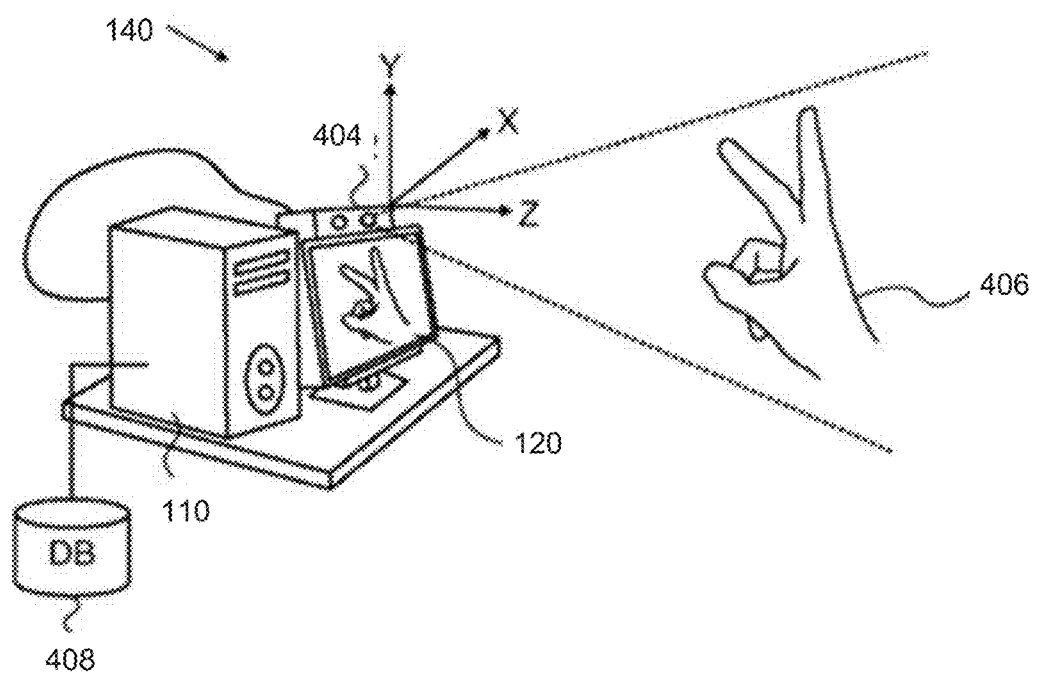
FIG. 4 is a block diagram illustrating a hand tracking unit of a computer system that is configured to capture gesture inputs of the user in accordance with some embodiments.
Figure 4:
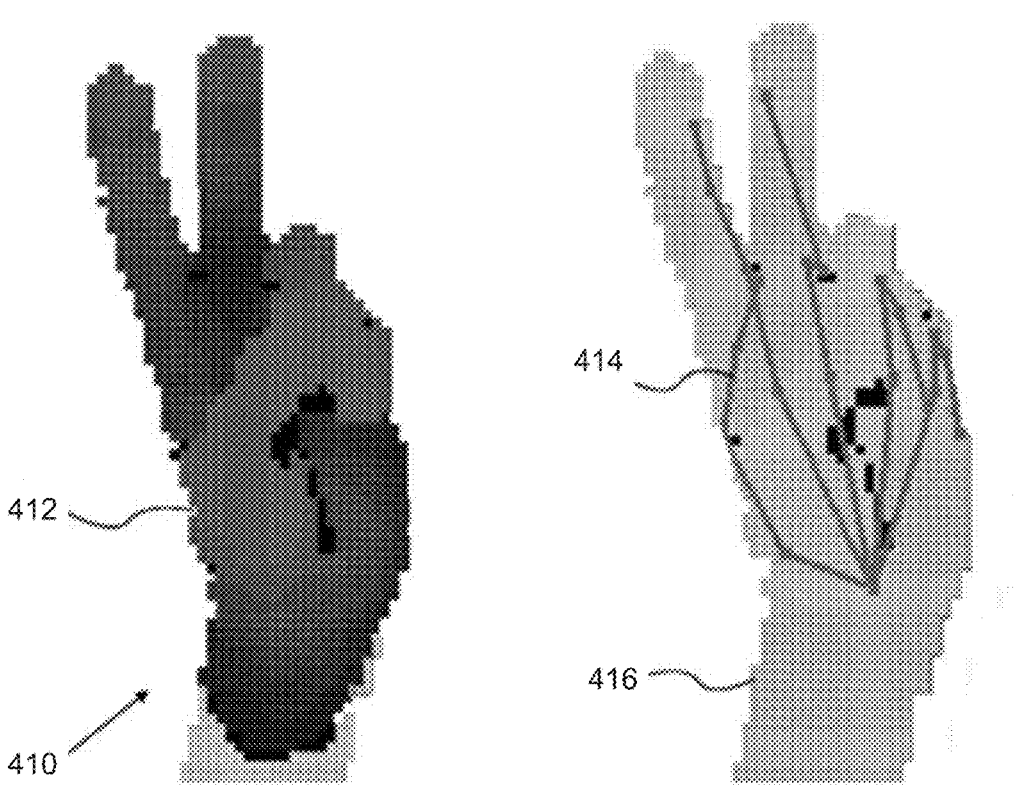

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving the hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
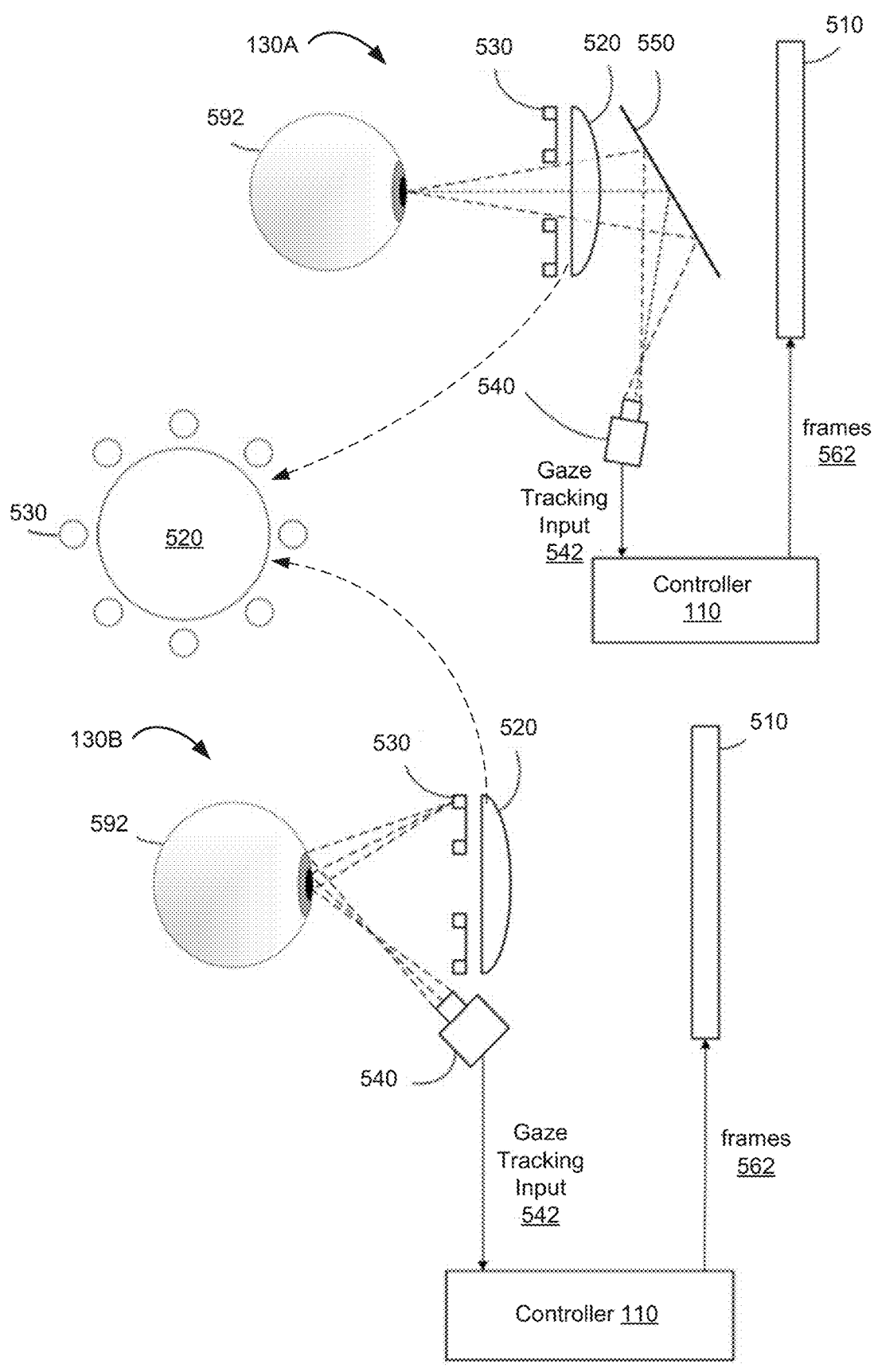
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen.

The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vengeance to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
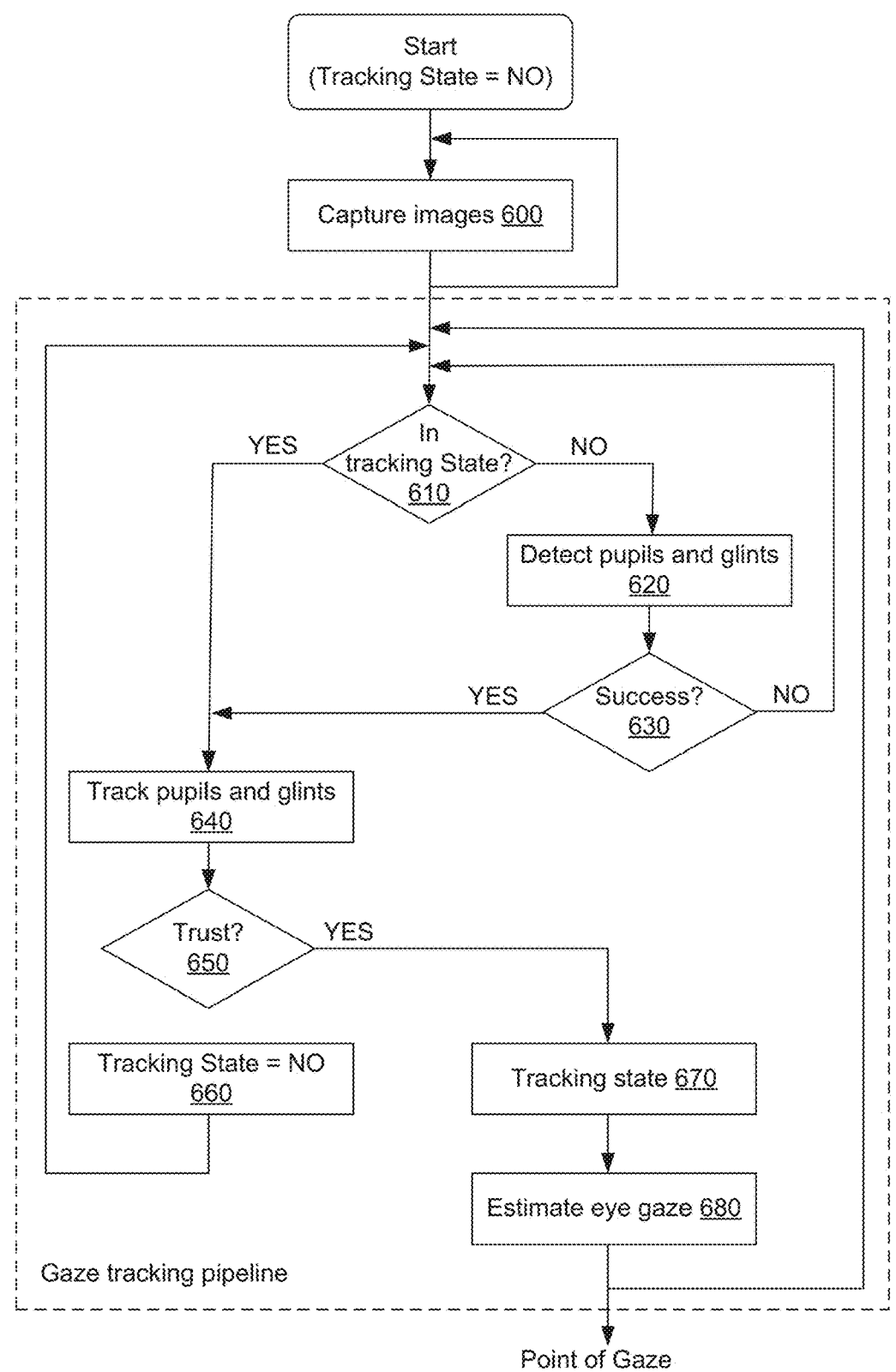
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UP") and associated processes that may be implemented on a computer system, such as portable multifunction device or a head-mounted device, with a display generation component, one or more input devices, and (optionally) one or cameras.

FIGS. 7A-7E illustrate examples of a computer system reducing a visual prominence of virtual content relative to a three-dimensional environment in accordance with some embodiments.

Figure 7A:
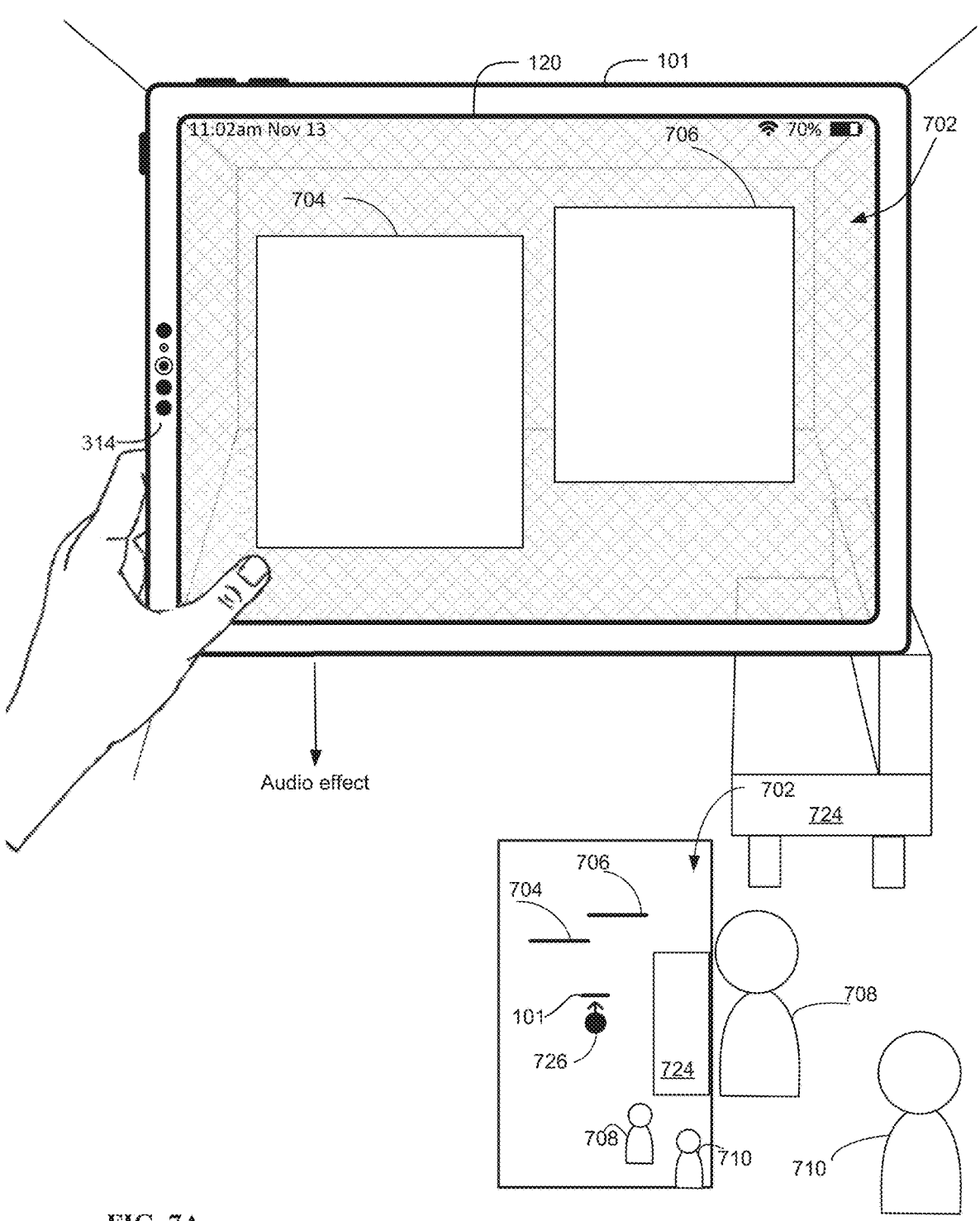
FIGS. 7A-7E illustrate examples of a computer system reducing a visual prominence of virtual content relative to a three-dimensional environment in accordance with some embodiments.

FIG. 7A illustrates a three-dimensional environment 702 visible via a display generation component (e.g., display generation component 120 of FIG. 1) of a computer system 101, three-dimensional environment 702 visible from a viewpoint 726 of a user illustrated in the overhead view (e.g., facing the back wall of the physical environment in which computer system 101 is located). As described above with reference to FIGS. 1-6, computer system 101 optionally includes a display generation component (e.g., a touch screen, a HMD or other wearable computing device, a display, a projector, etc.) and a plurality of image sensors (e.g., image sensors 314 of FIG. 3). Image sensors optionally include one or more of a visible light camera, an infrared camera, a depth sensor, or any other sensor computer system 101 would be able to use to capture one or more images of a user or a part of the user (e.g., one or more hands of the user) while the user interacts with computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 and/or the physical environment is visible in the three-dimensional environment 702 via the display generation component 120. For example, three-dimensional environment 702 visible via display generation component 120 includes representations of the physical floor and back and side walls of the room in which computer system 101 is located. For example, and as shown in FIG. 7A, the physical environment around computer system 101 includes sofa 724 (shown in the overhead view), which is visible via display generation component 120 from viewpoint 726 of the user in FIG. 7A.

In FIG. 7A, three-dimensional environment 702 includes user interface 704 and user interface 706. In FIG. 7A, user interface 704 and user interface 706 are two-dimensional objects. It is understood that the examples of the disclosure optionally apply equally to three-dimensional objects. User interfaces 704 and 706 are optionally one or more of user interfaces of applications (e.g., messaging user interfaces, and/or content browsing user interfaces), three-dimensional objects (e.g., virtual clocks, virtual balls, and/or virtual cars) or any other element displayed by computer system 101 that is not included in the physical environment of computer system 101. In FIGS. 7A-7E, user interface 704 is a content playback user interface (e.g., a user interface in which computer system 101 displays video and/or via which presents audio content), and user interface 706 is a system user interface (e.g., a user interface that includes one or more controls that are selectable to control one or more functionalities of the computer system 101 and/or a system virtual environment that is displayed within three-dimensional environment 702). One or more details of user interface 704 and user interface 706 are provided with reference to method 800.

In FIG. 7A, computer system 101 is also presenting three-dimensional environment 702 with a visual environmental effect, such as a dimming, desaturation, or otherwise reduced visual prominence of one or more portions of the physical environment visible via the display generation component 120. In some embodiments, computer system 101 additionally or alternatively presents an audio environmental effect that at least partially obscures one or more portions of physical and/or virtual audio that would otherwise be audible from the physical environment.

In some embodiments, computer system 101 presents three-dimensional environment 702 in a manner which occludes or otherwise reduces the visibility of one or more portions of the physical environment around computer system 101. For example, user interface 704 in FIG. 7A is occluding and/or obscuring a portion of the back wall and floor in the physical environment, and user interface 706 in FIG. 7A is occluding and/or obscuring a portion of the back wall and floor in the physical environment. As another example, in FIG. 7A, the audio and/or visual environmental effects presented by computer system 101 are also occluding and/or obscuring a portion of sofa 724 and/or audio components of the physical environment.

In some embodiments, and as discussed in greater detail hereinafter, computer system 101 reduces the visual prominence of one or more virtual portions of three-dimensional environment 702 based on one or more characteristics of objects in the physical environment to allow those physical objects to become more visible in three-dimensional environment 702. In some embodiments, computer system 101 performs the above for non-system user interfaces (e.g., user interface 704), but not for system user interfaces (e.g., user interface 706), as will be discussed in more detail below.

In FIG. 7A, person 708 and person 710 (two people other than the user of computer system 101) are present within physical environment around computer system 101. As shown in FIG. 7A, person 708 and person 710 are located outside of the field of view of the three-dimensional environment 702 visible via display generation component 120 and are not visible in three-dimensional environment 702.

Figure 7B:
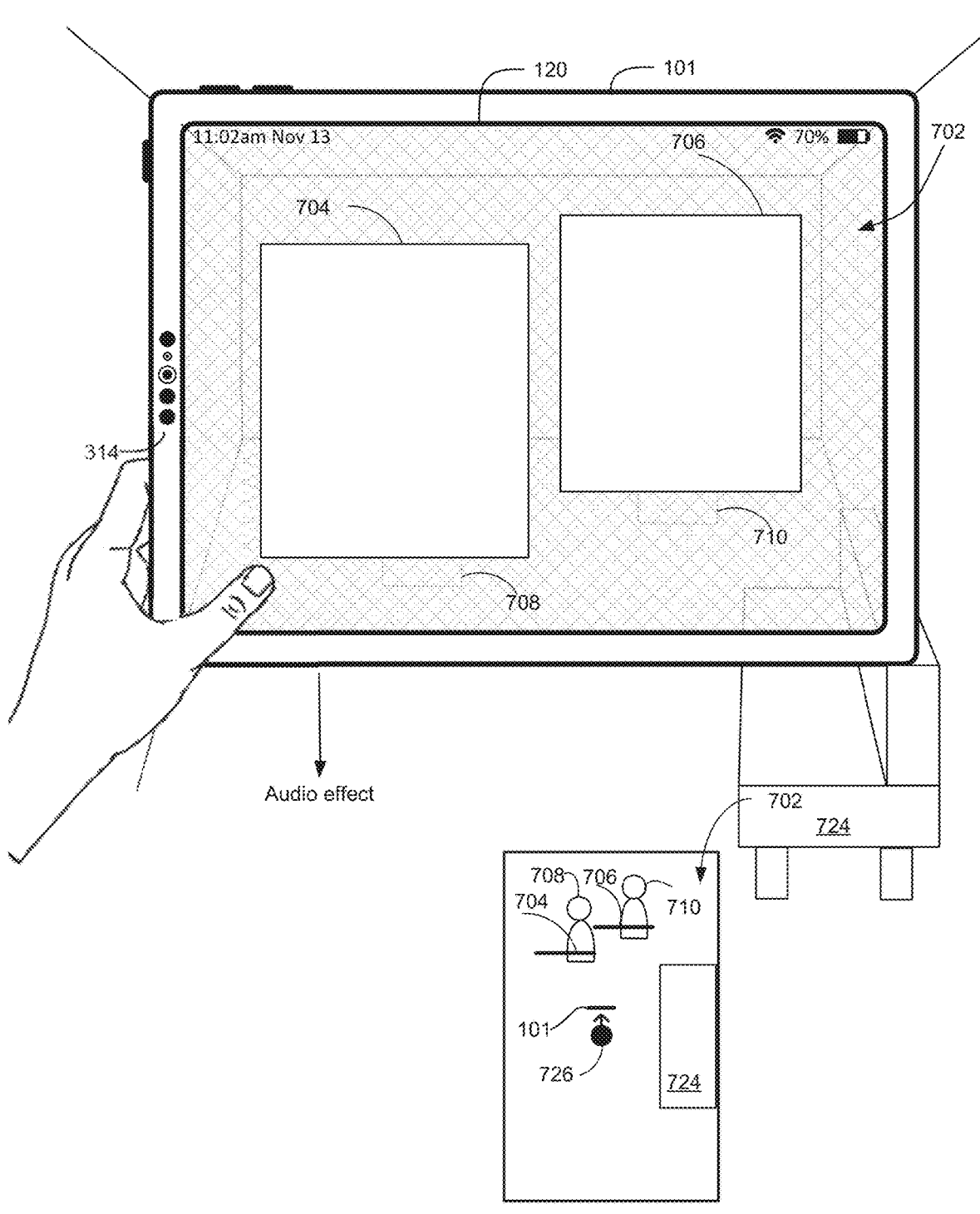

From FIG. 7A to 7B, person 708 and person 710 have moved within physical environment around computer system 101 and are now partially positioned behind user interfaces 704 and 706, respectively. As shown in FIG. 7B, user interface 704 at least partially obscures person 708 and user interface 706 at least partially obscures person 710 within three-dimensional environment 702. This obscuring is optionally due to person 708 and person 710 not exhibiting one or more characteristics that correspond to computer system 101 designating person 708 and person 710 as engaging in a salient social interaction with the user of computer system 101, as will be described in more detail later. Additionally, and because person 708 and person 710 are not designated as engaging in a salient social interaction, and as shown in FIG. 7B, audio and/or audio effects of person 708 and person 710 (e.g., audio corresponding to speech from person 708 or person 710) are occluded. Furthermore, it should be noted that because person 708 and person 710 have been determined to not be exhibiting characteristics of a salient social interaction, the audio and/or visual environmental effects of user interface 704 and 706 are the same in FIG. 7B as in FIG. 7A. As shown in FIG. 7B, the portion of person 708 that is not obscured by user interface 704 (e.g., the feet of person 708) and the portion of person 710 that is not obscured by user interface 706 (e.g., the feet of person 710) are visible in three-dimensional environment 702 with the visual environmental effects (e.g., dimming) applied thereto.

Figure 7C:
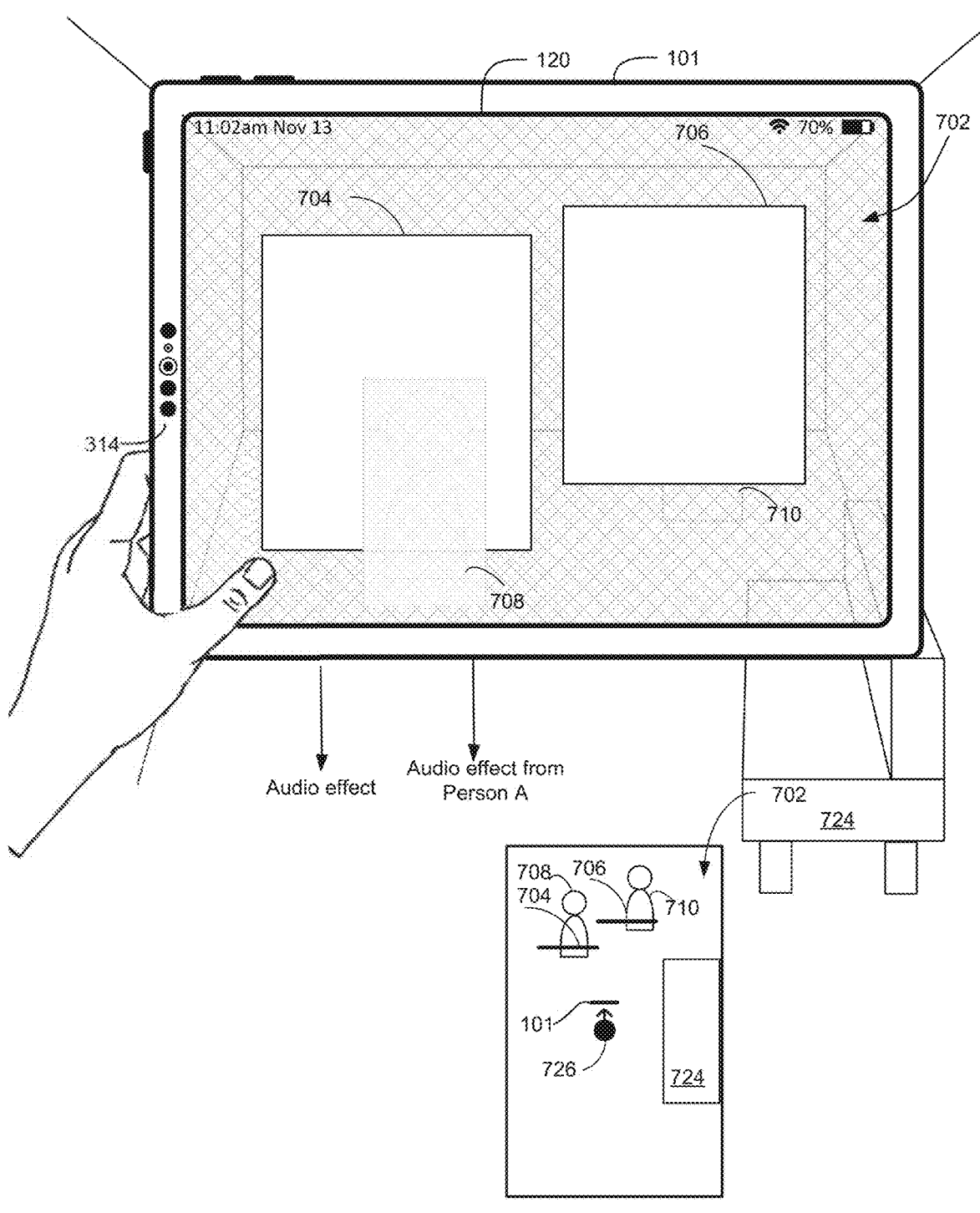

From FIG. 7B to 7C, person 708 and person 710 exhibit one or more characteristics that correspond to computer system 101 designating person 708 and/or person 710 as engaging in a salient social interaction with the user of computer system 101. Details about the various criteria used by computer system 101 for designating such salient social interactions are provided with reference to method 800. For example, in FIG. 7C, person 708 and person 710 have turned to and/or are talking to the user of computer system 101. As a result, person 708 is eligible to break through user interface 704, as shown in FIG. 7C. However, person 710 is not eligible to break through user interface 706, because user interface 706 is a system user interface. As such, and as shown in FIG. 7C and discussed in greater detail hereinafter, person 708 breaks through user interface 704 and person 710 does not break through user interface 706.

For instance, and as shown in FIG. 7C, the action of person 708 turning and talking to the user of computer system 101 is recognized by computer system 101 as a salient social interaction, and computer system 101 takes action(s) that increase the visibility of and/or audio effect from person 708. For instance, and as shown in FIG. 7C, computer system 101 reduces (e.g., by 5%, 10%, 15%, or 25%) the visual prominence of the portion of three-dimensional environment 702 that includes and/or surrounds person 708 to allow person 708 to be (e.g., 5%, 10%, 15%, or 25%) more visible in three-dimensional environment 702. The reduction of visual prominence optionally includes reducing the magnitude or amount of the environmental effect and/or the opacity of user interface 704, reducing a brightness or saturation of the environmental effect and/or user interface 704 and/or reducing the number or density of particles in a particle effect. In some embodiments, the environmental effect is optionally reduced in an area and/or volume that includes and/or surrounds the person 708. For instance, in some embodiments, the environmental effect is reduced in the area and/or volume between person 708 and viewpoint 726 (e.g., the projection of person 708 towards viewpoint 726). In this way, the user's view of person 708 (e.g., including portions of three-dimensional environment 702 between viewpoint 726 and person 708) is less occluded than before breakthrough.

Furthermore, and as shown in FIG. 7C, computer system 101 breaks through user interface 704 such that person 708 is visible through user interface 704. It should be noted that while the physical environment is optionally shown through the breakthrough of user interface 704, person 708 occludes the physical environment directly behind person 708. Furthermore, and as shown in FIG. 7C, the portions of user interface 704 that are not broken through remain with their prior visual prominence such that the user can still view the portions of user interface 704. Furthermore, and as shown in FIG. 7C, the portion of person 708 that is not obscured by user interface 704 (e.g., the feet of person 708) are more visible in three-dimensional environment since the visual prominence in the area surrounding person 708 are reduced Furthermore, and as shown in FIG. 7C, the portion of person 710 that is not obscured by user interface 706 (e.g., the feet of person 710) are visible in three-dimensional environment 702 with the visual environment effects (e.g., dimming) applied thereto. Additionally, and as shown in FIG. 7C, areas and/or volumes outside of the projection of person 708 (e.g., three-dimensional environment 702 including non-breakthrough portions of user interface 704) do not have their visual prominence reduced. Furthermore, and as shown in FIG. 7C, computer system 101 reduces the audio effect of three-dimensional environment 702 to allow for the hearing and/or generation of the audio from person 708. For instance, the audio effect from person 708 is optionally person 708 talking to the user of computer system 101 and/or playing audio from a device (e.g., mobile phone, tablet, and/or stereo).

As shown in FIG. 7C, the action of person 710 turning and talking to the user of computer system 101 is recognized by computer system 101 as a salient social interaction. However, computer system 101 does not take action(s) to increase the visibility of and/or audio effect from person 710 because user interface 706 is a system user interface. As such, computer system 101 maintains the visual prominence of the portion of three-dimensional environment 702 (e.g., including user interface 706) surrounding person 710 and/or corresponding to the projection of person 710 towards viewpoint 726. For instance, in some embodiments, the environmental effect is maintained in the area and/or volume between person 710 and viewpoint 726. Furthermore, and as shown in FIG. 7C, the environmental effect is maintained in the area and/or volume surrounding person 710. Additionally, the audio effect for user interface 706 and/or the environmental effect is maintained, and the audio effect for person 710 does not breakthrough.

Figure 7D:
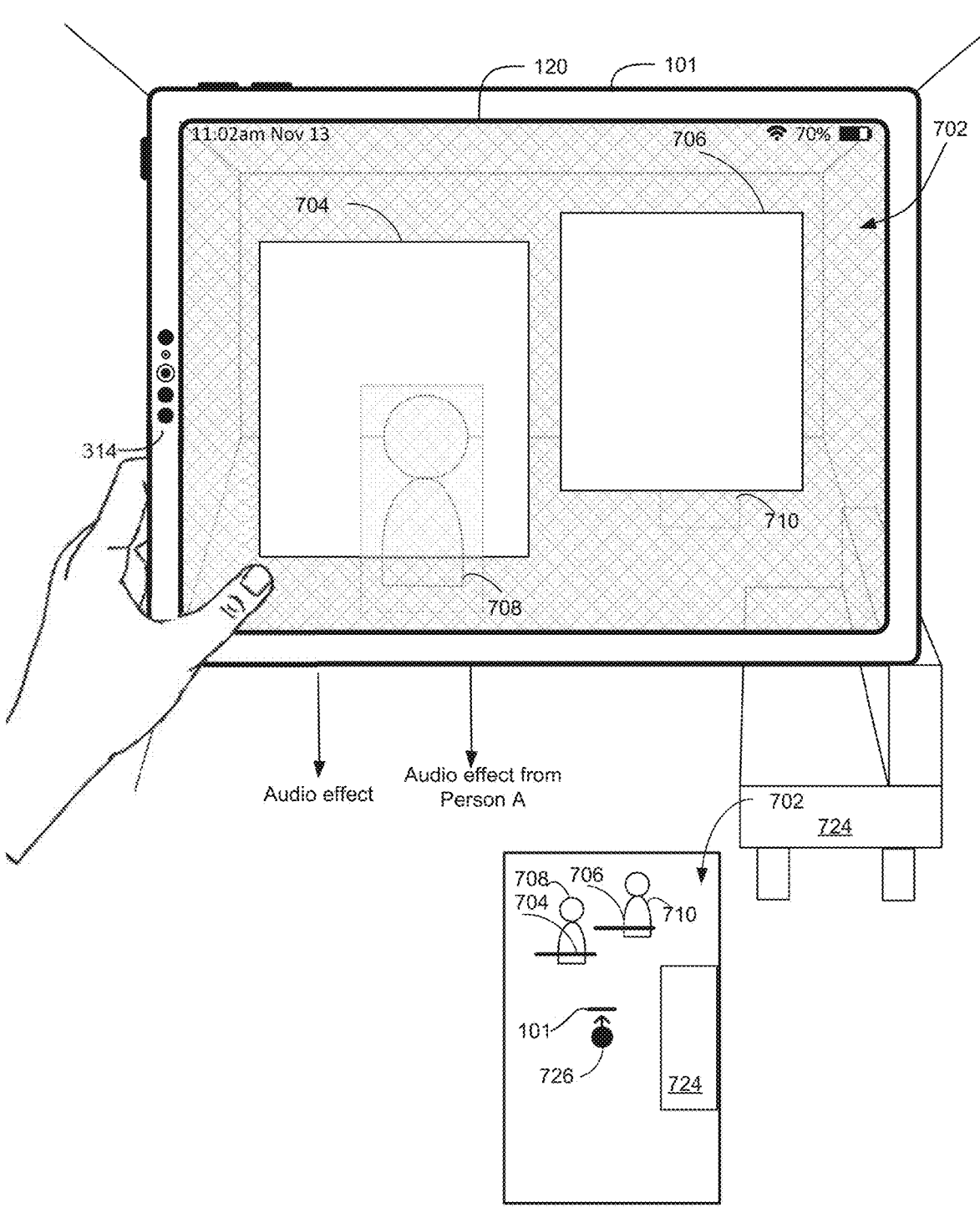

In some embodiments, the user of computer system 101 is able to provide a variable input (e.g., in the form of a slider input) for controlling when and/or how much breakthrough occurs. For instance, the variable input optionally controls the amount of interaction by person 708 and/or 710 that needs to occur to classify as a salient social interaction. Additionally or alternatively, the variable input optionally controls the amount of audio and/or visual breakthrough of the three-dimensional environment 702 that occurs once a salient social interaction is determined. Details about the various criteria used by computer system 101 for designating such salient social interactions are provided with reference to method 800. In FIG. 7C, the user of computer system 101 has optionally set the above-described slider to a particular amount of breakthrough and/or a particular threshold for breakthrough. For instance, from FIG. 7C to FIG. 7D, the user of computer system 101 has optionally set the above-described slider to a higher amount of breakthrough and/or lower threshold for breakthrough. As a result, and as shown in FIG. 7D, since the action of person 708 turning and talking to the user of computer system 101 is recognized by computer system 101 as a salient social interaction, computer system 101 takes action(s) that increase the visibility of and/or audio effect from person 708 according to the amount of breakthrough set in the above-referenced slider. For instance, and as shown in FIG. 7C, computer system 101 reduces (e.g., by 25%, 50%, 75%, or 90%) the visual prominence of the portion of three-dimensional environment 702 that includes and/or surrounds person 708 to allow person 708 to be (e.g., 25%, 50%, 75%, or 90%) more visible in three-dimensional environment 702. The reduction of visual prominence optionally includes reducing the magnitude or amount of the environmental effect and/or the opacity of user interface 704, reducing a brightness or saturation of the environmental effect and/or user interface 704 and/or reducing the number or density of particles in a particle effect. In some embodiments, the environmental effect is optionally reduced (e.g., by 25%, 50%, 75%, or 90%) in an area and/or volume that includes and/or surrounds the person 708. For instance, in some embodiments, the environmental effect is reduced (e.g., by 25%, 50%, 75%, or 90%) in the area and/or volume between person 708 and viewpoint 726 (e.g., the projection of person towards viewpoint 726). In this way, the user's view of person 708 (e.g., including portions of three-dimensional environment 702 between viewpoint 726 and person 708) is less occluded than before breakthrough.

Furthermore, and as shown in FIG. 7D, computer system 101 breaks through user interface 704 such that person 708 is visible through user interface 704. It should be noted that while the physical environment is optionally shown through the break-through of user interface 704, person 708 occludes the physical environment directly behind person 708. Furthermore, and as shown in FIG. 7D, the portions of user interface 704 that are not broken through remain with their prior visual prominence such that the user can still view the portions of user interface 704. Furthermore, and as shown in FIG. 7D, the portion of person 708 that is not obscured by user interface 704 (e.g., the feet of person 708) are more visible in three-dimensional environment 702 since the visual prominence of user interface 704 and/or the environment effect in the area surrounding person 708 is reduced (e.g., by 25%, 50%, 75%, or 90%). Furthermore, and as shown in FIG. 7D, the portion of person 710 that is not obscured by user interface 706 (e.g., the feet of person 710) is visible in three-dimensional environment 702 with the visual environment effects (e.g., dimming) applied thereto. Additionally, and as shown in FIG. 7D, areas and/or volumes outside of the projection of person 708 (e.g., three-dimensional environment 702 including non-breakthrough portions of user interface 704) do not have their visual prominence reduced. Furthermore, and as shown in FIG. 7D, computer system 101 further reduces the audio effect of three-dimensional environment 702 to allow for the additional (e.g., 25%, 50%, 75%, or 90%) hearing and/or generation of the audio from person 708. For instance, the audio effect from person 708 is optionally person 708 talking to the user of computer system 101 and/or playing audio from a device (e.g., mobile phone, tablet, and/or stereo).

As shown in FIG. 7D, the action of person 710 turning and talking to the user of computer system 101 is still recognized by computer system 101 as a salient social interaction. However, the computer system 101 still does not take action(s) to increase the visibility of and/or audio effect from person 710 because user interface 706 is a system user interface. As such, computer system 101 maintains the visual prominence of the portion of three-dimensional environment 702 surrounding person 710. For instance, in some embodiments, the environmental effect is maintained in the area and/or volume between the person 710 and viewpoint 726. Furthermore, and as shown in FIG. 7D, the environmental effect is maintained in the area and/or volume surrounding person 710. Additionally, the audio effect for user interface 706 and/or the environmental effect is maintained, and the audio for person 710 does not breakthrough.

Figure 7E:
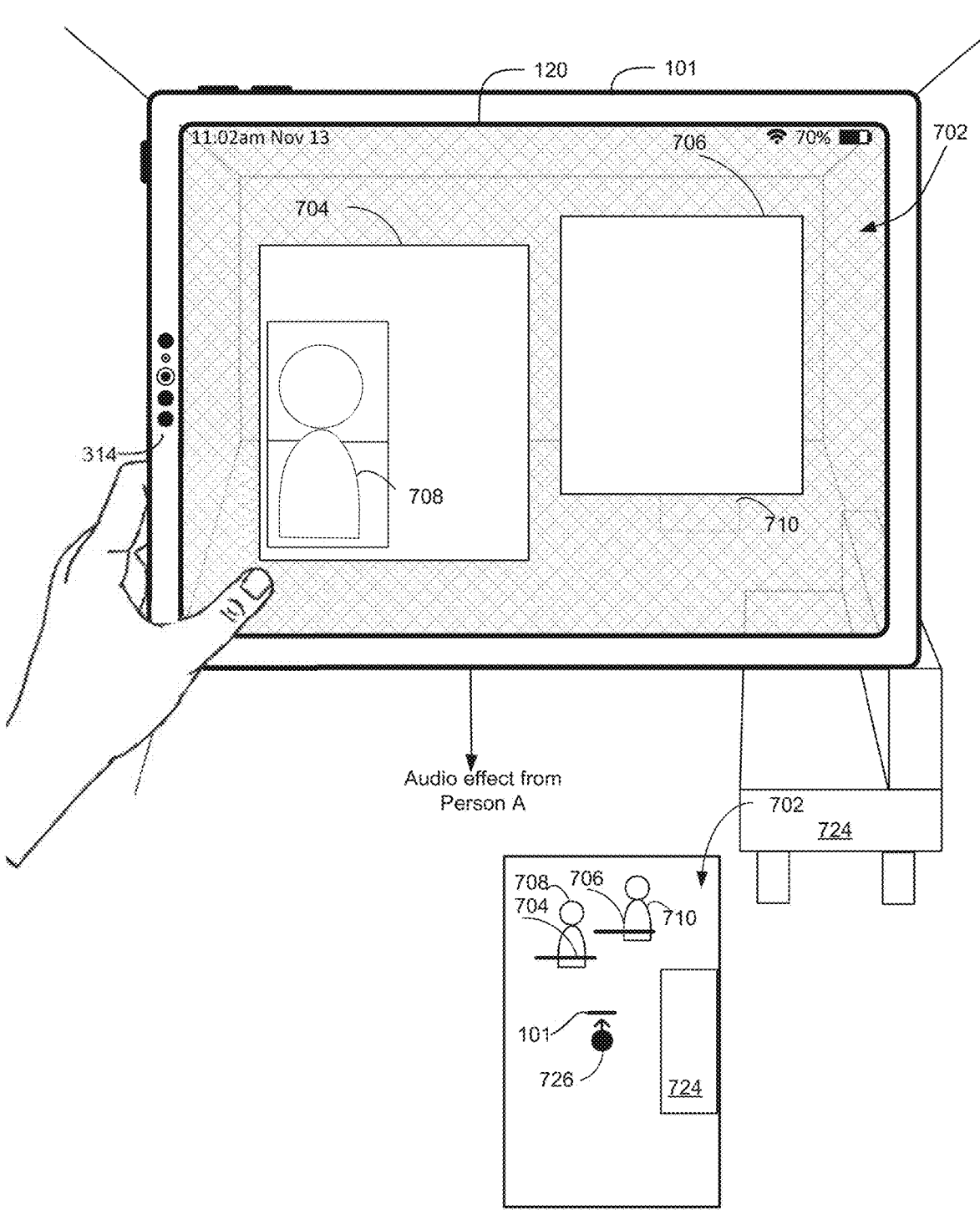
Figure 8B:
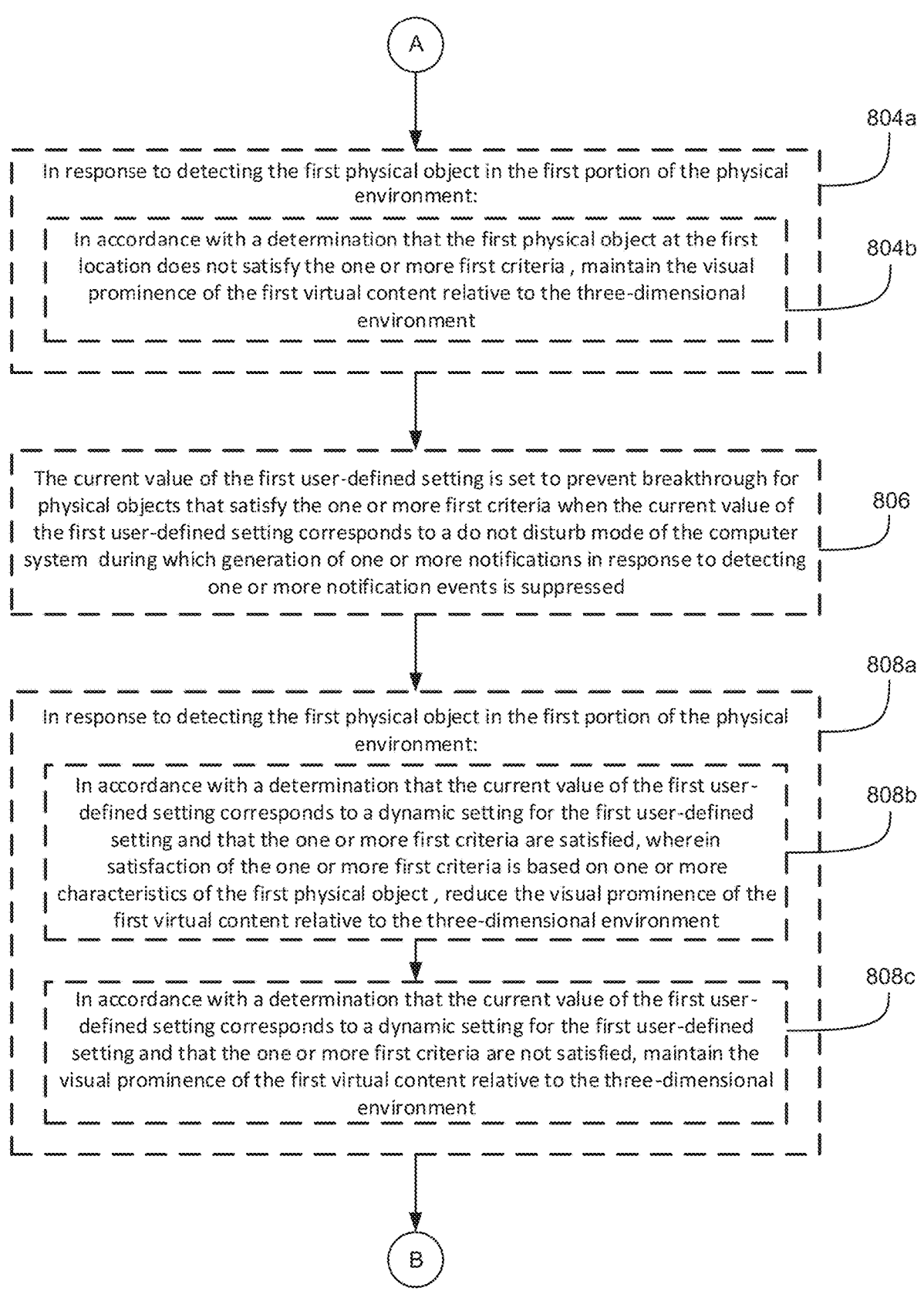
Figure 8C:
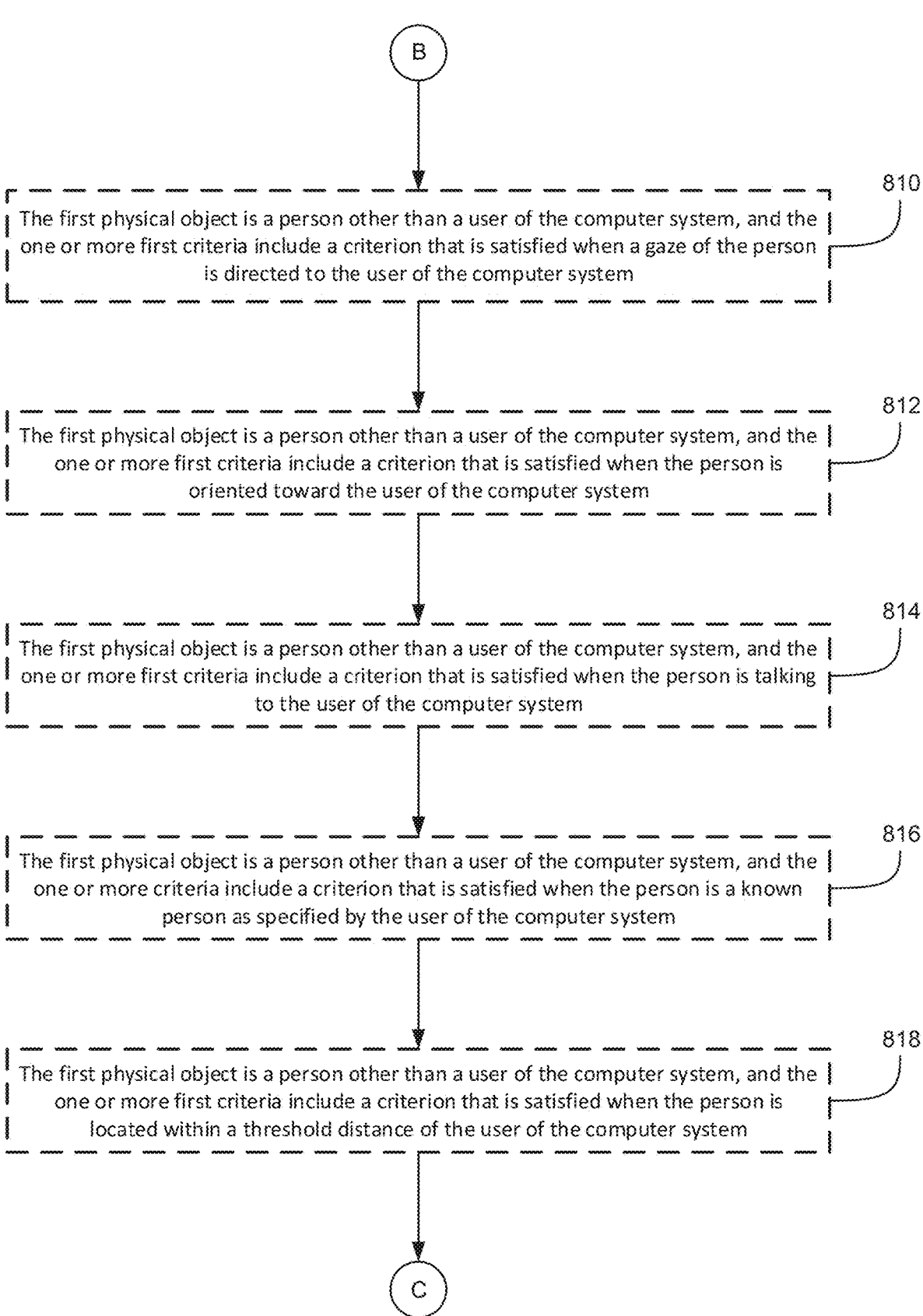
Figure 8D:
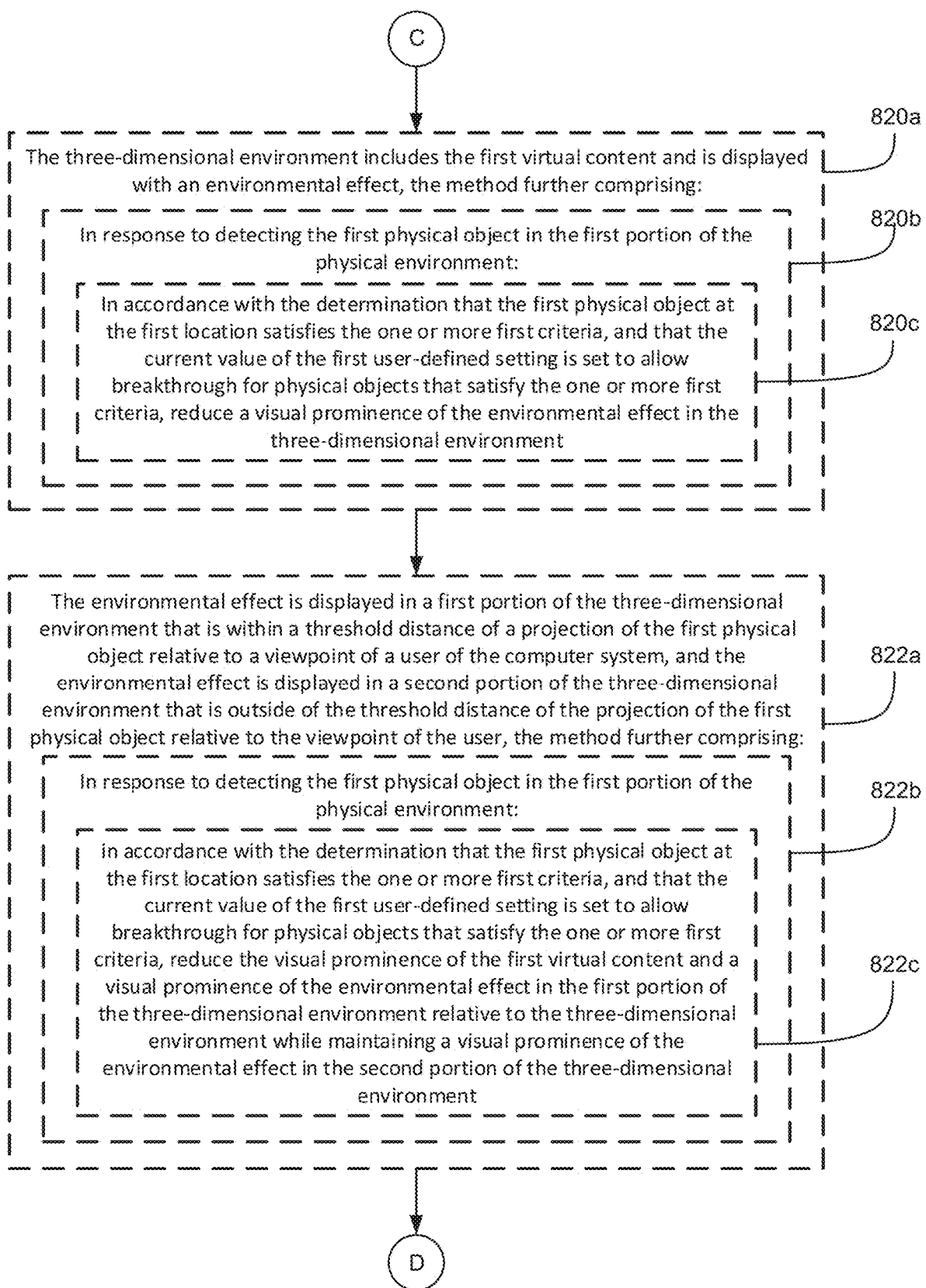
Figure 8E:
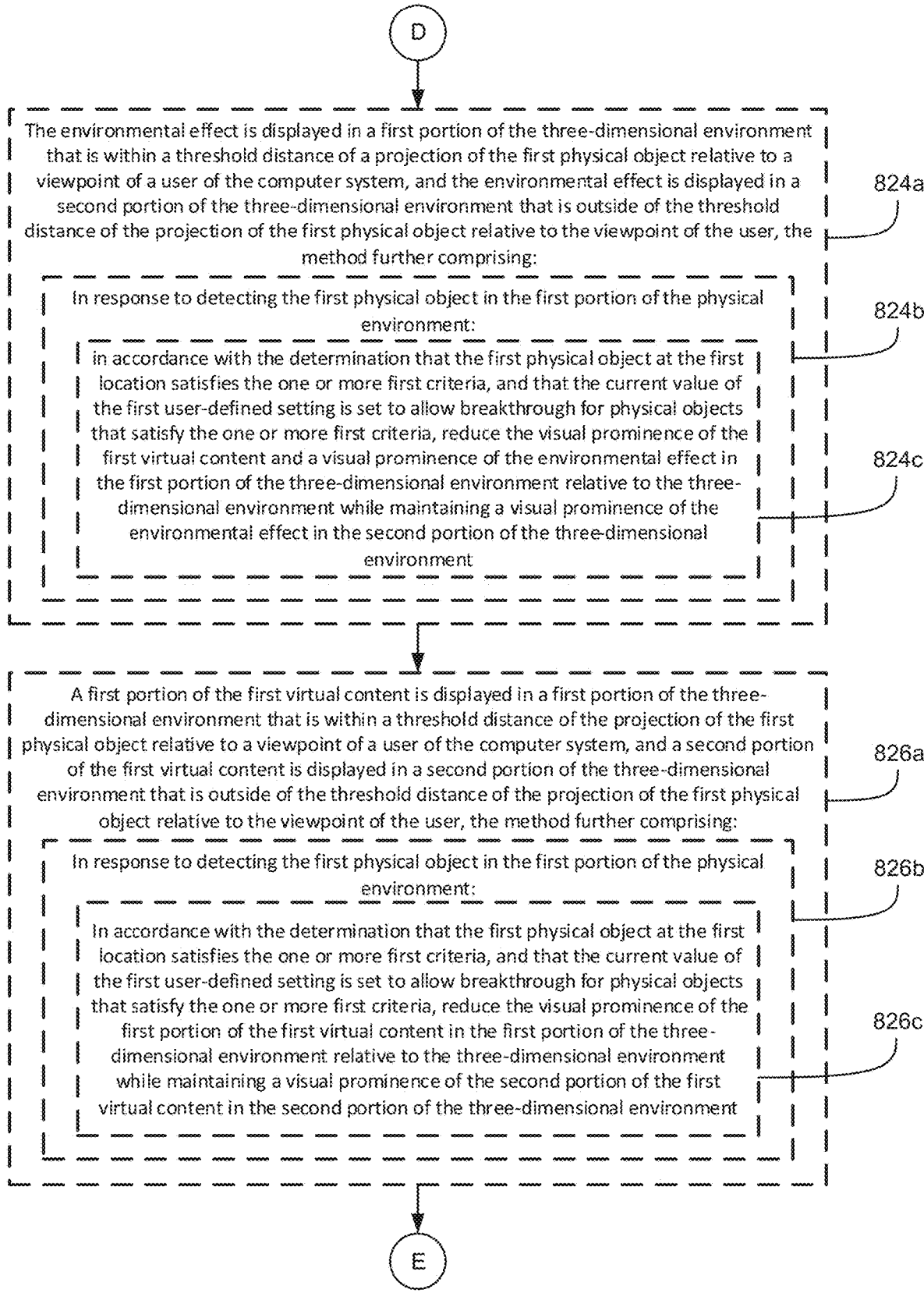
Figure 8G:
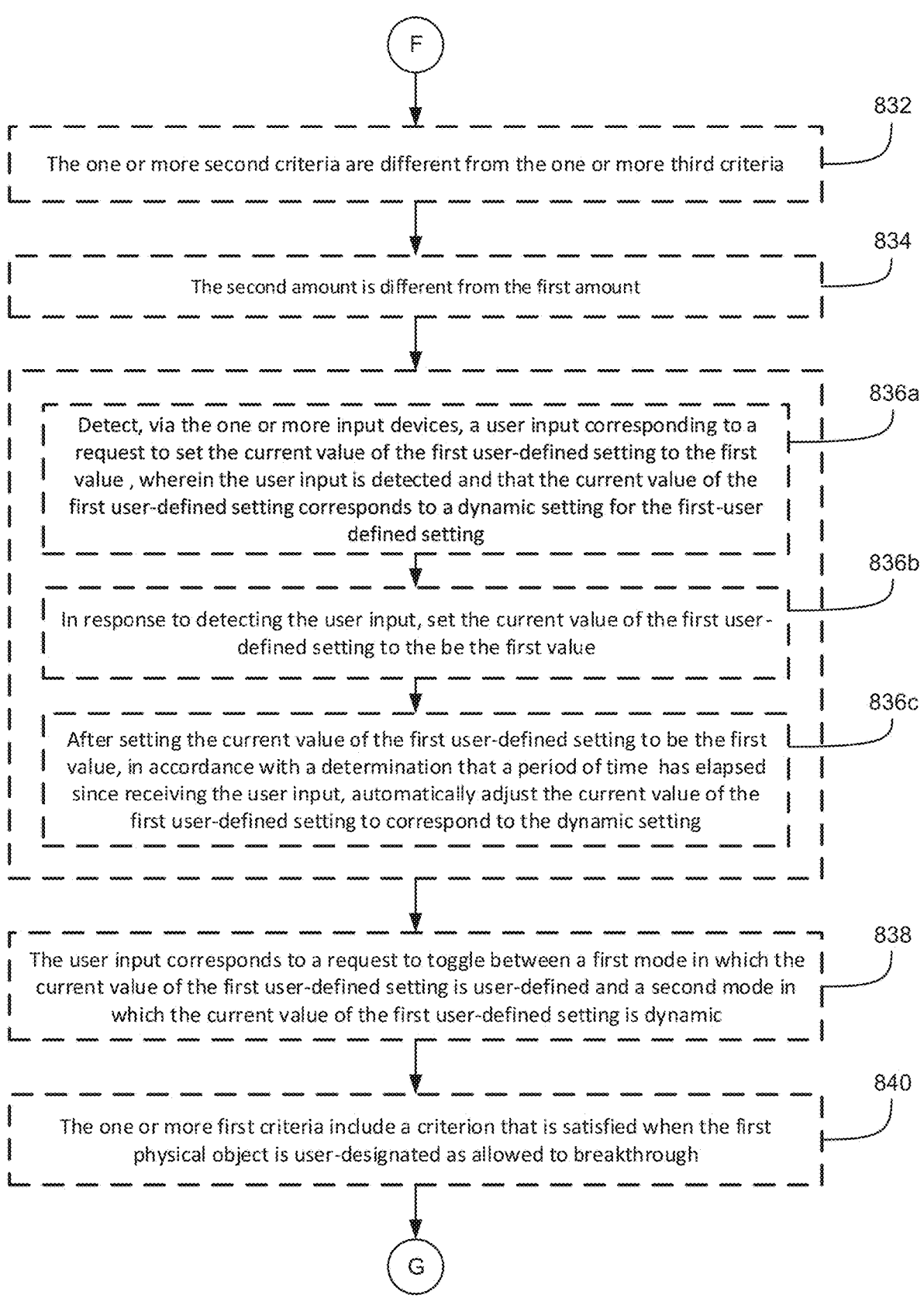
Figure 8H:
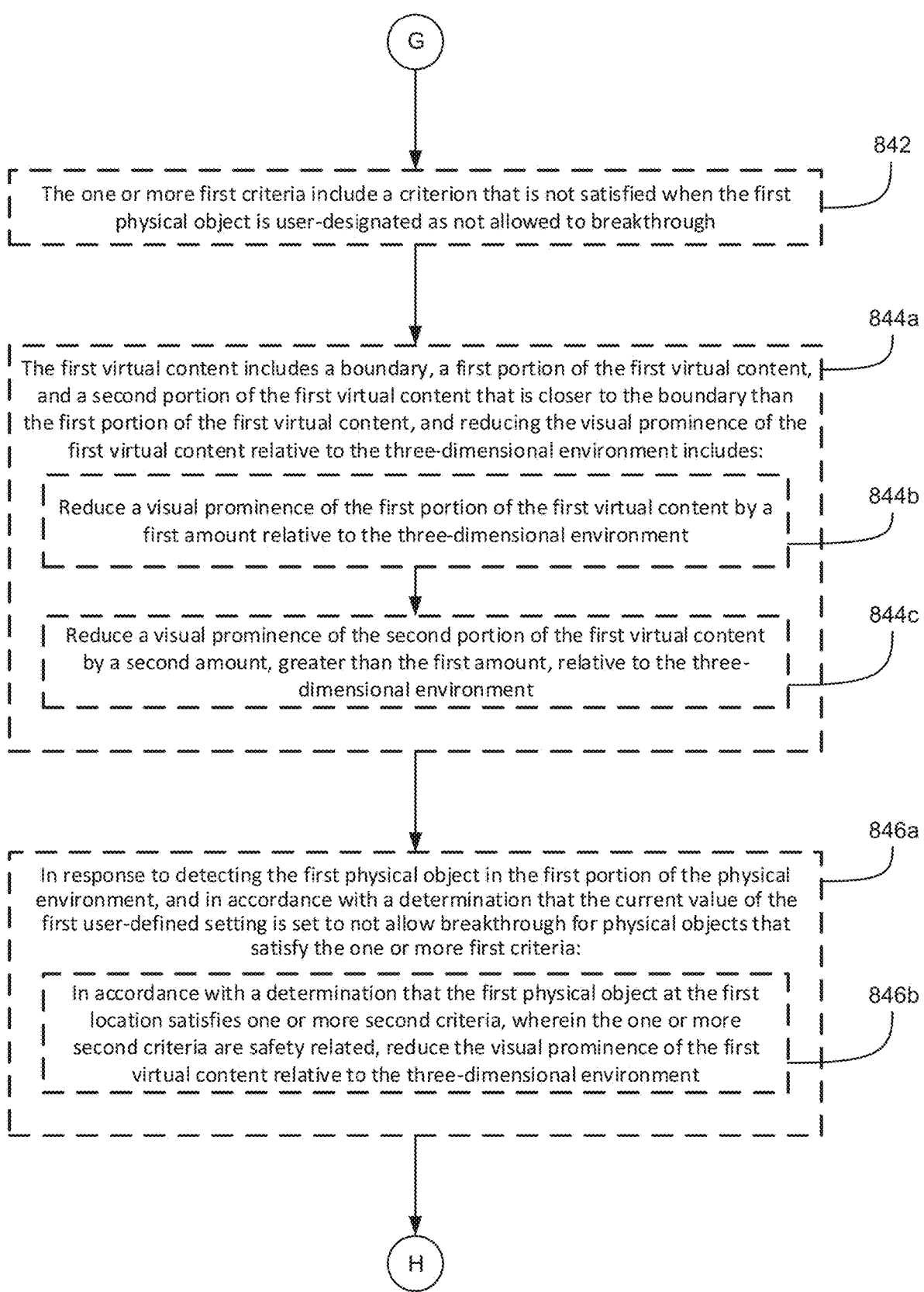

In some embodiments, the amount of breakthrough is optionally dependent on the location of the object with respect to the content (e.g., user interface) that is being broken through. For instance, from FIG. 7D to FIG. 7E, person 708 has moved closer to the edge of user interface 704. In some embodiments, computer system 101 optionally fully breaks through objects whose actions are recognized as a salient social interaction and are located towards the edge of the content (e.g., user interface 704), such as within a threshold distance (e.g., 0.1, 0.5, 1, 3, 5, 10 or 20 meters) of the edge of the content. In some embodiments, and as shown in FIG. 7E, computer system 101 increases the visibility of physical objects to be more visible in three-dimensional environment 702 as the physical objects get closer to the edge of user interfaces (e.g., user interface 704). For instance, and as shown in FIG. 7E, computer system 101 reduces (e.g., by 25%, 50%, 75%, or 100%) the visual prominence of the portion of three-dimensional environment 702 that includes and/or surrounds person 708 to allow person 708 to be (e.g., 25%, 50%, 75%, or 100%) visible in three-dimensional environment 702. The reduction of visual prominence optionally includes removing the environmental effect and/or opacity of user interface 704, removing a brightness or saturation of the environmental effect and/or user interface 704 and/or removing the number or density of particles in a particle effect. In some embodiments, the environmental effect is optionally removed in an area and/or volume that includes and/or surrounds the person 708. For instance, in some embodiments, the environmental effect is removed in the area and/or volume between person 708 and viewpoint 726 (e.g., the projection of person towards viewpoint 726). In this way the user's view of person 708 (e.g., including portions of three-dimensional environment 702 between viewpoint 726 and person 708) is less occluded than before breakthrough.

Furthermore, and as shown in FIG. 7E, computer system 101 breaks through user interface 704 such that person 708 is fully visible through user interface 704. It should be noted that while the physical environment is optionally shown through the break-through of user interface 704, person 708 occludes the physical environment directly behind person 708. Furthermore, and as shown in FIG. 7E, the portions of user interface 704 that are not broken through remain with their prior visual prominence such that the user can still view the portions of user interface 704. Furthermore, and as shown in FIG. 7E, computer system 101 further reduces (e.g., by 50%, 75%, 90%, or 100%) the audio effect of three-dimensional environment 702 to allow for the hearing of the audio from person 708.

FIGS. 8A-8I is a flowchart illustrating an exemplary method 800 of reducing a visual prominence of virtual content relative to a three-dimensional environment in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., controller 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices (e.g., 314). For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor), etc. In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, a three-dimensional environment is visible via the display generation component (e.g., the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment, etc.)), such as the three-dimensional environment 702 in FIG. 7A via display generation component 120. In some embodiments, the three-dimensional environment includes first virtual content (e.g., for example, the first virtual content is a user interface of an application on the computer system, such as a content (e.g., movie, television show and/or music) playback application, and the user interface is displaying or otherwise presenting the content; in some embodiments, the first virtual content is a two-dimensional or three-dimensional model of an object such as a tent, a building, or a car) that is obscuring a first portion of a physical environment, such as user interface 704 and/or user interface 706 in FIG. 7A.

In some embodiments, a first physical object (e.g., a person other than the user, an animal such as a pet, or any other physical object that is capable of movement) is detected, via the one or more input devices, located at a first location in the first portion of the physical environment (802a), for instance, person 708 and/or person 710 in the physical environment in FIG. 7A. In some embodiments, the three-dimensional environment includes virtual content (e.g., content that is not in the physical environment) displayed by the computer system and one or more portions of the physical environment of the display generation component. In some embodiments, the one or more portions of the physical environment are displayed in the three-dimensional environment via the display generation component (e.g., virtual or video passthrough). In some embodiments, the one or more portions of the physical environment are views of the one or more portions of the physical environment of the computer system visible through a transparent portion of the display generation component (e.g., true or real passthrough). In some embodiments, the first virtual content is displayed in a manner that occludes or otherwise reduces the visibility of the first portion of the physical environment. For example, the first virtual content is optionally closer than, and between, the first portion of the physical environment to the viewpoint of the user from which the three-dimensional environment is visible via the display generation component. In some embodiments, while the first virtual content is obscuring the first portion of the physical environment, the computer system detects the first physical object in the first portion of the physical environment, and the first virtual content also obscures, occludes, or otherwise reduces the visibility of the first physical object. In some embodiments, before detecting the first physical object in the first portion of the physical environment, the first physical object was not in the first portion of the physical environment (e.g., was in a second portion of the physical environment, and subsequently moved to the first portion of the physical environment). In some embodiments, visibility of the first physical object was not obscured by virtual content when the first physical object was in the second portion of the physical environment. In some embodiments, the visibility of the first physical object was obscured by virtual content (e.g., the first virtual content) when the first physical object was in the second portion of the physical environment.

In some embodiments, in response to detecting the first physical object in the first portion of the physical environment (e.g., person 708 within physical environment of FIG. 7C) (802b), in accordance with a determination that the first physical object (e.g., 708) at the first location satisfies one or more first criteria, (e.g., the satisfaction of one or more first criteria corresponds to a salient social interaction, and the one or more criteria are discussed in greater detail hereinafter such as with reference to steps 810 through 818), and that a current value of a first user-defined setting is set to allow breakthrough for physical objects that satisfy the one or more first criteria, (e.g., the user is able to adjust at least one setting that controls whether and/or how much the computer system adjusts the display of the first virtual content based on the presence of an object whose visibility is being obscured by the first virtual content, as will be described in more detail below), a visual prominence of the first virtual content is reduced relative to the three-dimensional environment (e.g., 702) (802c), for instance, the reduction of visual prominence of user interface 704 relative to three-dimensional environment 702 as shown in FIG. 7C (e.g., including increasing a visibility of the first portion of the physical environment through the first virtual content). In some embodiments, the computer system ceases display of the first virtual content completely, thereby causing the first physical object to be fully visible via the display generation component through the first virtual content. In some embodiments, the computer system reduces or changes the opacity, brightness, color saturation, and/or other visual characteristic of the first virtual content to reduce the visual prominence of the first virtual content relative to the three-dimensional environment less than completely, and increase the visibility of the first physical object through the first virtual content (e.g., increase from 0% visible to 20%, 40%, 60% or 80% visible, or increase from 5% visible to 20%, 40%, 60% or 80% visible). In some embodiments, the amount by which the computer system reduces the visual prominence of the first virtual content is different depending on the current value of the first user-defined setting. In some embodiments, the visibility of the first physical object and/or the display of the first virtual content before the computer system reduces the visual prominence of the first virtual content relative to the three-dimensional environment is controlled in accordance with one or more of the steps of method 1000. In some embodiments, one or more portions of the first virtual content are reduced in visual prominence while the visual prominence of one or more other portions of the first virtual content is maintained, as will be described in more detail later. In some embodiments, the visual prominence of the entirety of the first virtual content is reduced.

In some embodiments, in accordance with a determination that the first physical object (e.g., 708) at the first location satisfies the one or more first criteria and that a current value of the first user-defined setting is set to prevent breakthrough for physical objects that satisfy the one or more first criteria, the visual prominence of the first virtual content is maintained relative to the three-dimensional environment (e.g., 702) (802*d*) (e.g., without increasing a visibility of the first portion of the physical environment through the first virtual content). For instance, if the user of computer system 101 sets the current value of the first user-defined setting to prevent breakthrough for physical objects that satisfy the one or more first criteria, and person 708 satisfies the one or more first criteria, the visual prominence of the first virtual content is maintained relative to three-dimensional environment 702 (e.g., as opposed to breaking through as shown in FIG. 7C). In some embodiments, the visibility (or lack thereof) of the first physical object in the three-dimensional environment is not changed when the computer system maintains the visual prominence of the first virtual content relative to the three-dimensional environment. In some embodiments, the user is able to set a control or setting to prevent breakthrough of a physical object. Thus, even if the physical object satisfies the one or more first criteria, the computer system maintains the visual prominence of the first virtual content relative to the three-dimensional environment. Selectively reducing the visual prominence of virtual content allows a user to interact with the physical environment when needed while otherwise maintaining display of the virtual content and reducing distraction for the user, which reduces input errors and makes interactions with the computer system more efficient, reducing power usage and improving battery life for battery powered devices.

In some embodiments, in response to detecting the first physical object (e.g., 708) in the first portion of the physical environment (804*a*), in accordance with a determination that the first physical object (e.g., 708) at the first location does not satisfy the one or more first criteria (e.g., the characteristics of the first physical object or the actions of the first physical object do not amount to a salient social interaction. A salient social interaction optionally refers to an interaction of the first physical object with the user of the computer system that the user would typically want to hear/see. For instance, if the first physical object is the user's spouse who is asking the user what the user wants for dinner, this is optionally an interaction the user would want to see and/or hear, and such characteristics and/or actions of the first physical object optionally satisfy the one or more first criteria. Alternatively, if the first physical object is the user's dog who is walking around the physical environment and playing with a toy, this is optionally an interaction the user would not want to see and/or hear, and such characteristics and/or actions of the first physical object optionally do not satisfy the one or more first criteria. For instance, in some embodiments, the one or more first criteria include a criterion that is not satisfied when the user's spouse is simply walking around the physical environment. Additionally, in some embodiments, the one or more first criteria include a criterion that is not satisfied when the user's spouse is talking to another person (other than the user of the computer system) or animal in the physical environment. Conversely, in some embodiments, the one or more first criteria include a criterion that is satisfied when the user's spouse turns to and talks directly to the user.), the visual prominence of the first virtual content (e.g., 704) is maintained relative to the three-dimensional environment (e.g., 702) (804*b*). For instance, as shown in FIG. 7B, person 708 does not satisfy the one or more first criteria and the visual prominence of user interface 704 is maintained relative to three-dimensional environment 702. In some embodiments, and when the first physical object fails to satisfy the one or more first criteria, the visibility (or lack thereof) of the first physical object in the three-dimensional environments is not changed when the computer system maintains the visual prominence of the first virtual content relative to the three-dimensional environment. Maintaining the visual prominence of the first virtual content when the one or more first criteria are not satisfied by the first physical object avoids interruption in display of the first virtual content for physical objects that do not warrant breakthrough, which reduces the need for additional inputs to return to display of the virtual content, reducing power usage and improving battery life for battery powered devices.

In some embodiments, the current value of the first user-defined setting is set to prevent breakthrough for physical objects that satisfy the one or more first criteria when the current value of the first user-defined setting corresponds to a do not disturb mode of the computer system (e.g., 101). In some embodiments, the user of the computer system is able to set a control or setting to do not disturb mode to prevent breakthrough of a physical object. In do not disturb mode, even if a physical object satisfies the one or more first criteria, the computer system maintains the visual prominence of the first virtual content relative to the three-dimensional environment. In some embodiments, during the do not disturb mode, generation of one or more notifications in response to detecting one or more notification events is suppressed (806). In some embodiments, breaking through of physical objects through virtual content is also suppressed during the do not disturb mode. For instance, if the user of computer system 101 sets the current value of the first user-defined setting to do not disturb mode and person 710 satisfies the one or more first criteria, person 710 will not breakthrough, such as in FIG. 7C. In some embodiments, do not disturb mode also suppresses notifications of received messages, notifications, received calls or other events that would other cause the computer system to present a notification, whether audio, visual, and/or haptic. Controlling breakthrough in conjunction with a do not disturb mode allows the user the option to avoid interruption while viewing the first virtual content and reduces the number of inputs needed to prevent breakthrough, which reduces power usage and improves battery life for battery powered devices.

In some embodiments, in response to detecting the first physical object (e.g., 708) in the first portion of the physical environment (808*a*), in accordance with a determination that the current value of the first user-defined setting corresponds to a dynamic setting for the first user-defined setting and that the one or more first criteria are satisfied, and satisfaction of the one or more first criteria is based on one or more characteristics of the first physical object (e.g., 708) (e.g., in the case that the first physical object is a person or an animal, the one or more first criteria are optionally satisfied based on whether and/or how the first physical object is interacting with the user of the computer system, such as in a way that amounts to a salient social interaction, discussed in more detail hereinafter such as with reference to steps 810 to 818), the visual prominence of the first virtual content (e.g., 704) is reduced relative to the three-dimensional environment (e.g., 702) (808*b*), such as shown in FIG. 7C (e.g., allowing the first physical object to break through the first virtual content). In some embodiments, the first user-defined setting is set to a dynamic setting. In such a setting, determination of whether breakthrough occurs for physical objects is optionally based on determined properties of the physical objects, as will be described in more detail below.

In some embodiments, in accordance with a determination that the current value of the first user-defined setting corresponds to a dynamic setting for the first user-defined setting and that the one or more first criteria are not satisfied (e.g., because one or more of the characteristics of the first physical object, as described below, do not satisfy the one or more first criteria), the visual prominence of the first virtual content (e.g., 704) is maintained relative to the three-dimensional environment (e.g., 702) (808*c*) (e.g., not allowing the first physical object to break through the first virtual content). For instance, if the user of computer system 101 sets the first user defined setting to a dynamic setting and the one or more criteria are not satisfied, the visual prominence of user interface 704 is maintained relative to three-dimensional environment 702, such as shown in FIG. 7B. Using dynamic settings for controlling breakthrough allows the computer system to appropriately determine whether objects breakthrough while avoiding excessive or insufficient breakthrough, which reduces power usage and improves battery life for battery powered devices.

In some embodiments, the first physical object is a person other than a user of the computer system (e.g., 101) (e.g., the user's spouse, partner, child, friend, or simply another person in the environment), and the one or more first criteria include a criterion that is satisfied when a gaze of the person is directed to the user of the computer system (e.g., 101) (810). For instance, if person 708 gazes at the user of computer system 101, the criterion is satisfied. In some embodiments, if the person gazes or looks directly towards the user of the computer system, this action satisfies the criterion and corresponds to a salient social interaction. In some embodiments, this gaze must be detected for a predetermined period of time (e.g., 0.3, 0.5, 1, 3, 5, 10, 20 or 60 seconds) before satisfying the criterion. This period of time is optionally set by the user or determined by the computer system. In some embodiments, the criterion is not satisfied if the gaze of the person is not directed to the user of the computer system. Allowing breakthrough based on a person's gaze directed to the user of the computer system reduces the number of inputs needed for the user to interact with the person, which reduces input errors and makes interactions with the computer system more efficient, reducing power usage and improving battery life for battery powered devices.

In some embodiments, the first physical object is a person other than a user of the computer system (e.g., 101), and the one or more first criteria include a criterion that is satisfied when the person is oriented toward the user of the computer system (e.g., 101) (812) (or when the person has changed an orientation of a portion of their body so that it is oriented toward the user of the computer system). For instance, if person 708 is oriented toward the user of computer system 101, the criterion is satisfied. In some embodiments, if the person turns to the user of the computer system, this action satisfies the criterion and corresponds to a salient social interaction. In some embodiments, this turning to the user is a partial or full turn towards the user of the computer system (e.g., a turn to the user such that the head, torso, shoulders and/or other portions of the person are within a threshold range of angles (e.g., within 1, 3, 5, 15, 30, 45, 60, 90 or 180 degrees) of being oriented directly towards the user). In some embodiments, this turning to the user is required to persist for a set period of time (e.g., 0.3, 0.5, 1, 3, 5, 10, 20, or 60 seconds) before satisfying the criterion. This period of time is optionally set by the user or determined by the computer system. In some embodiments, the criterion is not satisfied if the person is walking past the user and/or does not turn towards the user. Allowing breakthrough based on a person's orientation relative to the user of the computer system reduces the number of inputs needed for the user to interact with the person, which reduces input errors and makes interactions with the computer system more efficient, reducing power usage and improving battery life for battery powered devices.

In some embodiments, the first physical object is a person other than a user of the computer system (e.g., 101), and the one or more first criteria include a criterion that is satisfied when the person is talking to the user of the computer system (e.g., 101) (814). For instance, if person 708 talks to the user of computer system 101, the criterion is satisfied. In some embodiments, if the person talks (directly) to the user, this action satisfies the criterion and corresponds to a salient social interaction. In some embodiments, if the person is talking to another person in the room but not (directly) talking to the user of the computer system, this would not satisfy the criterion and not correspond to a salient social interaction. However, if the person is talking to another person in the room first, which optionally does not satisfy the criterion, and then begins talking (directly) to the user of the computer system, the criterion would optionally become satisfied. In some embodiments, if the person is not talking to the user, the criterion is not satisfied. In some embodiments, the computer system detects that the person is talking to the user of the computer system based on whether the person is oriented towards the user, whether the mouth of the person is open and/or moving, and/or whether a microphone of the computer system detects spoken words from the person. Allowing breakthrough based on a person talking to the user of the computer system reduces the number of inputs needed for the user to interact with the person, which reduces input errors and makes interactions with the computer system more efficient, reducing power usage and improving battery life for battery powered devices.

In some embodiments, the first physical object is a person other than a user of the computer system (e.g., 101), and the one or more criteria include a criterion that is satisfied when the person is a known person as specified by the user of the computer system (e.g., 101) (816). For instance, if person 708 is a known person as specified by the user of computer system 101, the criterion is satisfied. In some embodiments, if the person is identified as being known by the user, this identification satisfies the criterion and corresponds to a salient social interaction. For instance, the computer system optionally identifies the person as being the user's partner or child. This identification is optionally performed by the computer system in various ways. For instance, this identification is optionally performed based on facial recognition by the computer system or the like. In some embodiments, the persons that are known to the user are set by the user (e.g., the user enrolls the persons in the facial recognition system of the computer system) or determined by the system. In some embodiments, the criterion is not satisfied if the person is not a known person to the user and/or computer system. Allowing breakthrough based on identification of the person by the computer system reduces the number of inputs needed for the user to interact with the person, which reduces input errors and makes interactions with the computer system more efficient, reducing power usage and improving battery life for battery powered devices.

In some embodiments, the first physical object is a person other than a user of the computer system (e.g., 101), and the one or more first criteria include a criterion that is satisfied when the person is located within a threshold distance of the user of the computer system (e.g., 101) (818). For instance, if person 708 is located within the threshold distance of the user of computer system 101, the criterion is satisfied. In some embodiments, if the person is within a threshold distance (e.g., 0.05, 0.1, 0.25, 0.5, 0.8, 1, 2, 5, 10 or 20 meters) of the user, this satisfies the criterion and corresponds to a salient social interaction. In some embodiments, this threshold is optionally achieved over time as the person walks around. For instance, if the person enters the room and is not within the threshold distance of the user, the criterion would not be satisfied until the person walks closer to the user falls within the threshold distance of the user. Additionally, if a person walks close to the user and falls within the threshold distance, which would optionally satisfy the criterion, and subsequently walks away from the user and falls out of the threshold distance, the criterion would optionally subsequently become not satisfied. Allowing breakthrough based on distance of the person from the user of the computer system reduces the number of inputs needed for the user to interact with the person and also avoids collision between the user and the person, which reduces input errors and makes interactions with the computer system more efficient, reducing power usage and improving battery life for battery powered devices.

In some embodiments, the three-dimensional environment (e.g., 702) includes the first virtual content (e.g., 704) and is displayed with an environmental effect (820*a*), such as the environmental effect shown in FIGS. 7A and 7E (e.g., a dimming or brightening effect of the three-dimensional environment, a virtual lighting effect on or more portions of the three-dimensional environment and/or virtual particle effects in one or more portions of the three-dimensional environment). In some embodiments, in response to detecting the first physical object (e.g., 708) in the first portion of the physical environment (820*b*), in accordance with the determination that the first physical object (e.g., 708) at the first location satisfies the one or more first criteria, and that the current value of the first user-defined setting is set to allow breakthrough for physical objects that satisfy the one or more first criteria, a visual prominence of the environmental effect is reduced in the three-dimensional environment (e.g., 702) (820*c*). For instance, if person 708 satisfies the one or more first criteria, and the current value of the first user-defined setting is set to allow breakthrough for physical objects that satisfy the one or more first criteria, a visual prominence of the environmental effect in three-dimensional environment 702 is reduced, as shown in FIG. 7C. In some embodiments, and when the first physical object satisfies the one or more first criteria, the visibility of the environmental effect in the three-dimensional environment is reduced as part of the breakthrough of the physical object through the first virtual content and/or the three-dimensional environment. In some embodiments, reducing the visual prominence of the environmental effect includes reducing the magnitude or amount of the environmental effect, reducing a brightness or saturation of the environmental effect and/or reducing the number or density of particles in a particle effect. Reducing the visual prominence of the environmental effect in the three-dimensional environment facilitates the visibility of the physical object in breakthrough, which reduces the need for additional inputs to display the visibility of the physical object, reducing power usage and improving battery life for battery powered devices.

In some embodiments, the environmental effect is displayed in a first portion of the three-dimensional environment (e.g., 702) that is within a threshold distance (e.g., 0.05, 0.1, 1, 3, 5, or 10 meters) of a projection of the first physical object (e.g., 708) relative to a viewpoint of a user (e.g., 726) of the computer system (e.g., 101), and the environmental effect is displayed in a second portion of the three-dimensional environment (e.g., 702) that is outside of the threshold distance of the projection of the first physical object (e.g., 708) relative to the viewpoint of the user (e.g., 726) (822*a*), such as the environmental effect shown in FIG. 7B. In some embodiments, the environmental effect is displayed in multiple (or all) portions of the three-dimensional environment before the first physical object is detected in the first portion of the physical environment. For instance, when the user of the computer system is viewing the three-dimensional environment from the viewpoint, both the area surrounding the first physical object and the areas outside of the first physical object have the environmental effect applied. In some embodiments, the projection of the first physical object relative to the viewpoint of the user corresponds to one or more portions of the three-dimensional environment that exist between the first physical object and the viewpoint of the user (e.g., a logical extrusion of the first physical object along the line of sight of the user from the viewpoint to the first physical object), and the threshold distance is measured as perpendicular to such a line of sight/viewpoint and extends out from the outer boundary of such projection. In some embodiments, in response to detecting the first physical object (e.g., 708) in the first portion of the physical environment (822*b*), in accordance with the determination that the first physical object (e.g., 708) at the first location satisfies the one or more first criteria, and that the current value of the first user-defined setting is set to allow breakthrough for physical objects that satisfy the one or more first criteria, the visual prominence of the first virtual content is reduced and a visual prominence of the environmental effect in the first portion of the three-dimensional environment is reduced relative to the three-dimensional environment (e.g., 702) while a visual prominence of the environmental effect in the second portion of the three-dimensional environment is maintained (822*c*). For instance, if person 708 satisfies the one or more first criteria, the visual prominence of the environmental effect within the threshold distance of the projection of person 708 is reduced while the visual prominence of the environmental effect outside of the threshold distance of the projection of person 708 is maintained, such as shown in FIG. 7C. In some embodiments, and in response to the first physical object satisfying the one or more first criteria, the visual prominence of the environmental effect within the threshold distance of the projection of the first physical object is reduced while the visual prominence of the environmental effect outside of the threshold distance of the projection of the first physical object is maintained. In this way, the area surrounding the projection of the first physical object is broken through while display of other areas of the three-dimensional environment is not interrupted. Breaking through only the area surrounding the projection of the first physical object allows the user to interact with the physical object while still maintaining the display of the environmental effect outside of the projection of the first physical object, which reduces the need for additional inputs to display virtual content, reducing power usage and improving battery life for battery powered devices.

In some embodiments, a first portion of the first virtual content is displayed in a first portion of the three-dimensional environment that is within a threshold distance of the projection of the first physical object (e.g., 708) relative to a viewpoint of a user (e.g., 726) of the computer system, and a second portion of the first virtual content is displayed in a second portion of the three-dimensional environment that is outside of the threshold distance of the projection of the first physical object (e.g., 708) relative to the viewpoint of the user (e.g., 726) (824a) (e.g., such as described above). In some embodiments, in response to detecting the first physical object (e.g., 708) in the first portion of the physical environment (824b), in accordance with the determination that the first physical object (e.g., 708) at the first location satisfies the one or more first criteria, and that the current value of the first user-defined setting is set to allow breakthrough for physical objects that satisfy the one or more first criteria, the visual prominence of the first portion of the first virtual content in the first portion of the three-dimensional environment is reduced relative to the three-dimensional environment (e.g., 702) while a visual prominence of the second portion of the first virtual content in the second portion of the three-dimensional environment is maintained (824c). For instance, if person 708 satisfies the one or more first criteria, the visual prominence of user interface 704 within the threshold distance of the projection of person 708 is reduced while the visual prominence of user interface 704 outside the threshold distance of the projection of person 708 is maintained, such as shown in FIG. 7C. In some embodiments, and in response to the first physical object satisfying the one or more first criteria, the visual prominence of the first virtual content within the threshold distance of the projection of the first physical object is reduced while the visual prominence of the first virtual content outside of the threshold distance of the projection of the first physical object is maintained. In this way, the area of the first virtual content surrounding the projection of the first physical object is broken through while display of other areas of the first virtual content is not interrupted. Breaking through only the area of the first virtual content surrounding the projection of the first physical object allows the user to interact with the physical object while still maintaining the display of the first virtual content outside of the projection of the first physical object, which reduces the need for additional inputs to display the first virtual content, reducing power usage and improving battery life for battery powered devices.

In some embodiments, the three-dimensional environment (e.g., 702) further includes second virtual content, wherein the first physical object (e.g., 708) is located between the first virtual content (e.g., 704) and the second virtual content relative to a viewpoint of a user e.g., (726) of the computer system (e.g., 101), and the second virtual content is further from the viewpoint of the user (e.g., 726) than the first virtual content. (826a) In some embodiments, from the viewpoint of the user, the second virtual content is displayed behind the person, which is displayed behind the first virtual content. In some embodiments, in response to detecting the first physical object (e.g., 708) in the first portion of the physical environment (826b), in accordance with the determination that the first physical object (e.g., 708) at the first location satisfies the one or more first criteria, and that the current value of the first user-defined setting is set to allow breakthrough for physical objects that satisfy the one or more first criteria, the visual prominence of the first virtual content relative to the three-dimensional environment (e.g., 702) is reduced while maintaining a visual prominence of the second virtual content relative to the three-dimensional environment (e.g., 702) (826c). For instance, if person 708 is standing in between second virtual content and user interface 704, and person 708 satisfies the one or more first criteria, person 708 breaks through user interface 704, such as shown in FIG. 7C, while the second virtual content is maintained. In some embodiments, the first physical object is a person that optionally is standing between two portions of virtual content. In such a case, and in response to a determination that the person satisfies the one or more first criteria, the person breaks through the virtual content closest to the user of the computer system while the virtual content that is further away is maintained. In some embodiments, the second virtual content is system content, such as a virtual environment as described below. Maintaining the visual prominence of the second virtual content allows the user to interact with the first physical object without interrupting interaction with the second virtual content, which reduces the need for additional inputs to display the second virtual content, reducing power usage and improving battery life for battery powered devices.

In some embodiments, the three-dimensional environment (e.g., 702) further includes second virtual content, wherein the first physical object (e.g., 708) is located between the first virtual content (e.g., 704) and the second virtual content relative to a viewpoint of a user (e.g., 726) of the computer system, and the second virtual content is further from the viewpoint of the user (e.g., 726) than the first virtual content (e.g., 704) (828a). In some embodiments, from the viewpoint of the user, the second virtual content is displayed behind the person, which is displayed behind the first virtual content. In some embodiments, in response to detecting the first physical object (e.g., 708) in the first portion of the physical environment (828b), in accordance with the determination that the first physical object (e.g., 708) at the first location satisfies the one or more first criteria, and that the current value of the first user-defined setting is set to allow breakthrough for physical objects that satisfy the one or more first criteria, the visual prominence of the first virtual content is reduced relative to the three-dimensional environment (e.g., 702) and a visual prominence of the second virtual content is reduced relative to the three-dimensional environment (e.g., 702) (828c). For instance, if person 708 is standing in a line of sight of the user of computer system 101 and in between user interface 704 and second virtual content, and person 708 satisfies the one or more criteria, person 708 breaks through user interface 704, such as shown in FIG. 7C, and the visual prominence of the second virtual content is also reduced. In some embodiments, the first physical object is optionally a person standing in a line of sight of the user of the computer system, in between two portions of virtual content. If the person satisfies the breakthrough criteria, both portions of the virtual content are reduced in visual prominence. Reducing the visual prominence of both the first and second virtual content reduces distraction when interacting with the first physical object, which reduces the need for additional inputs to interact with the first physical object, reducing power usage and improving battery life for battery powered devices.

In some embodiments, in response to detecting the first physical object (e.g., 708) in the first portion of the physical environment (830a), in accordance with a determination that the current value of the first user-defined setting is set to a first value, (In some embodiments, the first user-defined setting is adjustable via a slider that is optionally displayed in a control user interface of the computer system. For instance, this slider is optionally adjustable up and down by the user to adjust one or more characteristics of break-through, as will be described in more detail below) and in accordance with a determination that one or more second criteria are satisfied (e.g., the one or more second criteria are optionally criteria controlling whether the first physical object breaks through the first virtual content, as described herein. In some embodiments, the one or more second criteria are the same as or different from the one or more first criteria), the visual prominence of the first virtual content (e.g., 704) is reduced by a first amount relative to the three-dimensional environment (e.g., 702) (830b), for instance, the visual prominence of user interface 704 is reduced by a first amount relative to three-dimensional environment 702 shown in FIG. 7C. In some embodiments, the first amount is based on the first value that is set by the user. In some embodiments, if the one or more second criteria are not satisfied, the visual prominence of the first virtual content is maintained. These and other details will be discussed in greater detail hereinafter such as with reference to steps 832 to 838.

In some embodiments, in accordance with a determination that the current value of the first user-defined setting is set to a second value, different from the first value, (For instance, the user has adjusted the first user-defined setting up or down to a second value via the slider. In some embodiments, the second value being higher than the first value corresponds to more easily triggered breakthrough and/or more breakthrough than the first value) and in accordance with a determination that one or more third criteria are satisfied, (In some embodiments, the one or more third criteria are optionally criteria controlling whether the first physical object breaks through the first virtual content, as described herein, and are optionally the same as or different from the one or more second criteria, as will be described in greater detail below.) the visual prominence of the first virtual content is reduced by a second amount (e.g., option-ally the same or different from the first amount) relative to the three-dimensional environment (e.g., 702), for instance, the visual prominence of user interface 704 is reduced by a second amount relative to three-dimensional environment 702 shown in FIG. 7D (830c). In some embodiments, the second amount is based on the second value that is set by the user. In some embodiments, if the one or more third criteria are not satisfied, the visual prominence of the first virtual content is maintained. Allowing the user to adjust the breakthrough threshold provides the user with control over the breakthrough properties, which reduces the need for additional inputs to achieve the desired breakthrough prop-erties, reducing power usage and improving battery life for battery powered devices.

In some embodiments, the one or more second criteria are different from the one or more third criteria (832). In some embodiments, the one or more second criteria and the one or more third criteria correspond to settings for determining whether breakthrough occurs based on the first value and second value, respectively. For instance, in some embodi-ments, if the user adjusts the slider to a low value (e.g., the first value is a low amount that is less than 50% of the value range of the slider), the one or more second criteria will correspond to a relatively high (or relatively difficult-to-satisfy) setting for breakthrough. In an example, the duration of time needed to satisfy a breakthrough criterion for a gaze of a person will optionally be relatively high (e.g., the length of gaze required by the second criteria is a high setting that is more than 50% of the value range of the gaze length setting). In some embodiments, if the user adjusts the slider to a high value (e.g., the second value is a high amount that is higher than 50% of the value range of the slider), the one or more third criteria will correspond to a relatively low (or relatively easily satisfied) setting for breakthrough. As an example, the duration of time needed to satisfy the break-through criterion for a gaze of a person will optionally be relatively low (e.g., the length of gaze required by the second criteria is a low setting that is less than 50% of the value range of the gaze length setting). Thus, in some embodiments, the slider control adjusts how easily objects breakthrough the virtual content, where lower slider values make breakthrough more difficult, and higher slider values make breakthrough less difficult. Allowing the user to adjust the setting for whether a breakthrough occurs provides the user with control over breakthrough conditions and better aligns user expectations of breakthrough with the operations of the computer system, which reduces the need for addi-tional inputs to achieve the desired breakthrough conditions, reducing power usage and improving battery life for battery powered devices.

In some embodiments, the second amount is different from the first amount (834), such as shown in FIGS. 7C and 7D. In some embodiments, the first amount and the second amount correspond to the amount of breakthrough that occurs (if it does occur) for a given set of triggering conditions for breakthrough (e.g., the one or more second criteria being satisfied, or the one or more third criteria being satisfied). For instance, if the first amount is greater than the second amount, then a larger area of the first virtual content is optionally broken through as compared to the second amount. In some embodiments, if the first amount is greater than the second amount, then the area of the first virtual content that is broken through has a higher transparency as compared to the second amount. Additionally or alterna-tively, if the first amount is greater than the second amount, then the opacity, brightness, or color saturation is optionally reduced (or more generally changed, as appropriate) by a higher amount as compared to the second amount. One or more additional or alternative visual characteristics of the first virtual content are optionally changed (e.g., increased or decreased, as appropriate) by a greater amount so as to cause the first virtual content to be less obstructive of the physical environment behind the first virtual content for the first amount of breakthrough as compared with the second amount of breakthrough. Allowing the user to adjust the amount of breakthrough that occurs enables the user to have control over how much the visual prominence of the virtual content is reduced when breakthrough occurs and better aligns user expectations of breakthrough with the operations of the computer system, which reduces the need for additional inputs to achieve the desired breakthrough, reducing power usage and improving battery life for battery powered devices.

In some embodiments, a user input corresponding to a request to set the current value of the first user-defined setting to the first value is detected via the one or more input devices, such as an input to set the user-defined setting to the first value resulting in the response of computer system 101 in FIG. 7C (e.g., the user input includes adjusting a break-through slider, as described herein, to a position correspond-ing to the first value or the second value). In some embodi-ments, the user input is detected while the current value of the first user-defined setting corresponds to a dynamic setting for the first-user defined setting (836a). As described above, in some embodiments, the first user-defined setting is set to a dynamic setting such that determination of whether breakthrough occurs for physical objects is optionally based on determined properties of the physical objects. In some embodiments, in response to detecting the user input, the current value of the first user-defined setting is set to the be the first value (836b), and after setting the current value of the first user-defined setting to be the first value (or the second value), in accordance with a determination that a period of time (e.g., 0.1, 0.3, 1, 3, 5, 20, 45, 60, 120 or 240 minutes) has elapsed since receiving the user input, the current value of the first user-defined setting is automatically adjusted to correspond to the dynamic setting (836c), such as reverting to a user-defined setting that results in the response of computer system in FIG. 7D. In some embodi-ments, and when a user overrides a dynamic mode for the first user-defined setting, this user-set setting is applied only for a period of time. This period of time is optionally set by the user or determined by the computer system. In some embodiments, when the user-set setting is returned to dynamic mode, the computer system will adjust break-through accordingly. For instance, if the dynamic setting calls for a smaller amount of breakthrough, the breakthrough will be reduced as compared with the user-defined value for the first user-defined setting. Alternatively, if the dynamic setting calls for a larger amount of breakthrough, the break-through will be increased as compared with the user-defined value for the first user-defined setting. Furthermore, the dynamic setting may call for the same amount of break-through as the user-defined value. In this case, the break-through will optionally remain the same. Automatically reverting breakthrough settings to the dynamic mode after a period of time ensures that potentially unreasonable or unsafe breakthrough settings do not remain in effect at the computer system, which reduces the need for additional inputs to revert back the breakthrough settings, reducing power usage and improving battery life for battery powered devices.

In some embodiments, the user input corresponds to a request to toggle between a first mode in which the current value of the first user-defined setting is user-defined and a second mode in which the current value of the first user-defined setting is dynamic (838). In some embodiments, the user of the computer system is capable of toggling the breakthrough settings between the dynamic mode and a sliding scale mode (e.g., user defined mode). For instance, the user of the computer system is optionally able to set the user-defined setting to a set amount at a first time, and subsequently decide they want the computer system to operate in the dynamic mode. In such a scenario, the user is optionally able to toggle the user-defined setting back to the dynamic mode. Subsequent user input optionally continues to toggle between the dynamic mode and the user-defined mode. This toggling is optionally accomplished by a slider, a button, or the like. Enabling the user to toggle between a breakthrough slider mode and dynamic mode allows the user to easily adjust to new circumstances in the physical envi-ronment of the user, which reduces the need for additional inputs to adjust to the new circumstances, reducing power usage and improving battery life for battery powered devices.

In some embodiments, the one or more first criteria include a criterion that is satisfied when the first physical object (e.g., 708) is user-designated as allowed to break-through (840), such as if person 708 in FIG. 7C were designated as allowed to breakthrough, resulting in the response of computer system 101 shown in FIG. 7C for person 708. In some embodiments, if the first physical object is a particular object, that object satisfies the criterion. For instance, the user of the computer system is optionally able to select or designate particular physical objects (e.g., people or animal/pets) that are enabled to break through. The determination of the particular person or animal is optionally based on object and/or facial recognition (e.g., using manu-ally specified rules and/or machine learning models for recognizing objects and/or faces). In some embodiments, if a person entering the room is not a designated person or animal, the breakthrough criteria will not be satisfied, even if the person (or physical object) would otherwise satisfy the condition(s) requires for breakthrough. Allowing break-through based on designated or selected objects reduces the occurrence of unwanted breakthrough, which reduces the need for additional inputs to enable breakthrough for the designated or selected objects, reducing power usage and improving battery life for battery powered devices.

In some embodiments, the one or more first criteria include a criterion that is not satisfied when the first physical object (e.g., 708) is user-designated as not allowed to breakthrough (842), such as if person 708 in FIG. 7B were designated as not allowed to breakthrough, resulting in the response of computer system 101 shown in FIG. 7B for person 708. In some embodiments, if the first physical object is a particular object, that object does not satisfy the crite-rion. For instance, the user of the computer system is optionally able to select or designate particular physical objects (e.g., people or animal/pets) that are not enabled to break through. The determination of the particular person or animal is optionally based on object and/or facial recogni-tion. In some embodiments, if a person entering the room is not a designated person or animal, the breakthrough criteria may be satisfied. Preventing breakthrough based on desig-nated or selected objects allows a user to maintain display of the virtual content and reduce distraction for the user, which reduces the need for additional inputs to return to display of the virtual content, reducing power usage and improving battery life for battery powered devices.

In some embodiments, the first virtual content includes a boundary (e.g., the first virtual content is displayed in a rectangular or other region of the three-dimensional envi-ronment having one or more boundaries, such as top, bottom, left and/or right boundaries), a first portion of the first virtual content, and a second portion of the first virtual content that is closer to the boundary than the first portion of the first virtual content, such as the outer boundary of user interface 704 in FIGS. 7A-7E and the portions of user interface 704 that are closer to and further from such boundary. In some embodiments, the visual prominence of the first virtual content is reduced relative to the three-dimensional environment (e.g., 702) (844*a*). In some embodiments, the first virtual content has different portions whose visual prominence are reduced at varying levels in the event of a breakthrough, as will be described in more detail below. The second portion of the first virtual content is optionally closer to the boundary than the first portion of the virtual content—for example, if the boundary is the right boundary of the first virtual content, the second portion of the first virtual content is the part of the virtual content that is adjacent to the right boundary, and the first portion of the first virtual content is leftward of the second portion, such as the center portion of the first virtual content. In some embodiments, the reducing includes reducing a visual prominence of the first portion of the first virtual content by a first amount relative to the three-dimensional environment (e.g., 702) (844*b*), such as the reduction of the visual prominence of the portion of user interface 704 shown in FIG. 7D. In some embodiments, the visual prominence of the first portion of the first virtual content is reduced by a first amount, such as 0%, 10%, 20%, 40%, 50%, 70%, or 90%.

In some embodiments, the reducing includes reducing a visual prominence of the second portion of the first virtual content by a second amount, greater than the first amount, relative to the three-dimensional environment (e.g., 702) (844*c*), such as the reduction of the visual prominence of the portion of user interface 704 shown in FIG. 7E. In some embodiments, the visual prominence of the second portion of the first virtual content is reduced by a second amount that is greater than the first amount, such as 30%, 50%, 70%, 90%, or 100%. Thus, in some embodiments, portions of the first virtual content that are closer to boundaries of the first virtual content are reduced in visual prominence more than portions of the first virtual content that are further from the boundaries of the first virtual content. In some embodiments, the location of the first physical object relative to the first virtual content results in different levels of breakthrough for the first physical object. For example, if the first physical object is located behind a center region of the first virtual content and triggers breakthrough, the computer system reduces the visual prominence of the center region by a first amount (e.g., corresponding to a user-defined setting that defines the magnitude of breakthrough), but if the first physical object is located behind a right region of the first virtual content and triggers breakthrough, the computer system reduces the visual prominence of the right region by a second amount, greater than the first amount (e.g., not corresponding to and/or greater than what is defined by the user-defined setting). Feathering breakthrough in from the edges of the first virtual content reduces interruption of the primary portion of the first virtual content (e.g., the center region) while still allowing the user to interact with the first physical object, which reduces the need for additional inputs to return to display of the first virtual content, reducing power usage and improving battery life for battery powered devices.

In some embodiments, in response to detecting the first physical object in the first portion of the physical environment, and in accordance with a determination that the current value of the first user-defined setting is set to not allow breakthrough for physical objects that satisfy the one or more first criteria (846*a*), in accordance with a determination that the first physical object (e.g., 708) at the first location satisfies one or more second criteria, wherein the one or more second criteria are safety related, the visual prominence of the first virtual content (e.g., 704) is reduced relative to the three-dimensional environment (e.g., 702) (846*b*). For instance, if the current value of the first user-defined setting is set to not allow breakthrough for physical objects that satisfy the one or more first criteria, and if person 708 satisfies one or more second criteria that are safety related, the visual prominence of user interface 704 is reduced relative to three-dimensional environment—such as shown in FIGS. 7C-7E—even though person 708 would not otherwise cause breakthrough. In some embodiments, the computer system defines one or more second criteria that are safety related, such as criteria that are satisfied if conditions in the physical environment of the user pose a potential safety risk to the user if the user is unable to see them. For example, the one or more second criteria are optionally satisfied if a person or animal runs towards the user of the computer system, an alarm goes off in the user's physical environment, and/or the first physical object is very close to the user of the computer system (e.g., within 0.1, 0.3, 0.5, 1, 3, 5, or 10 meters). In such a case, regardless of whether the current value of the first user-defined setting is set to prevent breakthrough and/or whether the one or more first criteria are met, the computer system will optionally reduce the visual prominence of first virtual content relative to the three-dimensional environment to allow the user to see the potentially unsafe conditions in the physical environment of the user. Allowing breakthrough for safety reasons protects the user of the computer system from potential safety-related issues, and protects the device from potential hazards.

In some embodiments, the computer system (e.g., 101) generates an audio output (e.g., audio effect in FIG. 7A) associated with the three-dimensional environment (e.g., 702) when the first physical object (e.g., 708) is in the first portion of the physical environment (848*a*) (e.g., the audio is associated with the first virtual content and/or an environmental effect being displayed by the computer system, such as audio effects corresponding to a virtual environment such as an ocean environment). In some embodiments, in response to detecting the first physical object (e.g., 708) in the first portion of the physical environment (848*b*), in accordance with the determination that the first physical object (e.g., 708) at the first location satisfies one or more first criteria, and that the current value of the first user-defined setting is set to allow breakthrough for physical objects that satisfy the one or more first criteria, a magnitude of the audio output associated with the three-dimensional environment (e.g., 702) is reduced (848*c*)(e.g., reduction of audio effect in FIG. 7C). In some embodiments, the breakthrough includes reducing a magnitude of audio output associated with the three-dimensional environment, such as reducing the magnitude by 1%, 10%, 20%, 40%, 60%, 80%, or 100%. In some embodiments, this magnitude is determined by the user or by the computer system. In some embodiments, this magnitude is based on the reduction in visual prominence of the first virtual content. For instance, if the visual prominence of the first virtual content is reduced by 40%, the magnitude will also be reduced by 40% or another amount that is the same as the amount by which the visual prominence of the first virtual content is reduced. Alternatively, this magnitude is independent of the reduction in visual prominence of the first virtual content. For instance, if the visual prominence of the first virtual content is reduced by 40%, the magnitude is optionally reduced by 10% or another amount different than the amount by which the visual prominence of the first virtual content is reduced.

Reducing the magnitude of the audio output associated with the three-dimensional environment limits distraction from the audio output associated with the three-dimensional environment, which reduces the need for additional inputs to reduce the magnitude of audio output associated with the three-dimensional environment, reducing power usage and improving battery life for battery powered devices.

In some embodiments, the visual prominence of the first virtual content (e.g., user interface 704) is reduced relative to the three-dimensional environment (e.g., 702). In some embodiments the reducing includes one or more of dimming, blurring, or ceasing display of one or more portions of the first virtual content (e.g., user interface 704) (850). For instance, in some embodiments, the visual prominence of first virtual content is reduced relative to three-dimensional environment 702 as shown in FIG. 7C by dimming, blurring, or ceasing display of one or more portions of user interface 704. In some embodiments, the first virtual content is optionally dimmed within the three-dimensional environment to reveal a portion of the first physical object. For instance, the first virtual content is optionally reduced to shine less clearly. Additionally or alternatively, the first virtual content is optionally blurred within the three-dimensional environment to reveal a portion of the first physical object. For instance, the first virtual content is optionally displayed less distinct or made to become unclear. Additionally or alternatively, the first virtual content is optionally hidden within the three-dimensional environment to reveal a portion of the first physical object. Performing the breakthrough of the first virtual content in various ways ensures the effectiveness of the breakthrough is high, which reduces the need for additional inputs to increase the effectiveness of breakthrough, reducing power usage and improving the battery life for battery powered devices.

In some embodiments, the one or more first criteria include a criterion that is not satisfied when the first virtual content is system virtual content (852), for instance, user interface 706 is not broken through in FIG. 7C even though person 710 satisfies the criterion. In some embodiments, the first virtual content is system virtual content such as a user interface that displays or presents one or more controls that enable the user to control one or more functionalities of the computer system (e.g., system volume, and/or system Wi-Fi). For instance, the system virtual content optionally includes a play button, a rewind button, a fast forward button, a stop button, an end button, or the like to control playback of corresponding content (e.g., video or audio). In some embodiments, the computer system does not break through system virtual content, even if the first physical object has characteristics that would otherwise cause the first physical object to break through non-system virtual content. In some embodiments, the system virtual content is a system virtual environment (e.g., a simulated three-dimensional environment) that is displayable in the three-dimensional environment in response to input provided by a user to display such a simulated environment. In some embodiments, the simulated environment includes a scene that at least partially veils at least a part of the three-dimensional environment such that it appears as if the user is located in the scene (e.g., and optionally no longer located in the three-dimensional environment). In some embodiments, the simulated environment is an atmospheric transformation that modifies one or more visual characteristics of the three-dimensional environment such that it appears as if the three-dimensional environment is located at a different time, place, and/or condition (e.g., morning lighting instead of afternoon lighting, sunny instead of overcast, etc.). In some embodiments, the three-dimensional environment is a hybrid environment that includes the simulated environment and (a representation of) the physical environment. In some embodiments, the boundary between the simulated environment and the representation of the physical environment is based on distance. For example, portions of the three-dimensional environment that include the simulated environment are optionally farther away from the viewpoint of the user than portions of the three-dimensional environment that include representations of the physical environment. Not breaking through system virtual content ensures uninterrupted ability to interact with the system virtual content, which reduces the need to additional inputs to return to display of the system virtual content, reducing power usage and improving battery life for battery powered devices.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9E illustrate examples of a computer system displaying an indication of a physical object in association with virtual content in a three-dimensional environment in accordance with some embodiments.

Figure 9A:
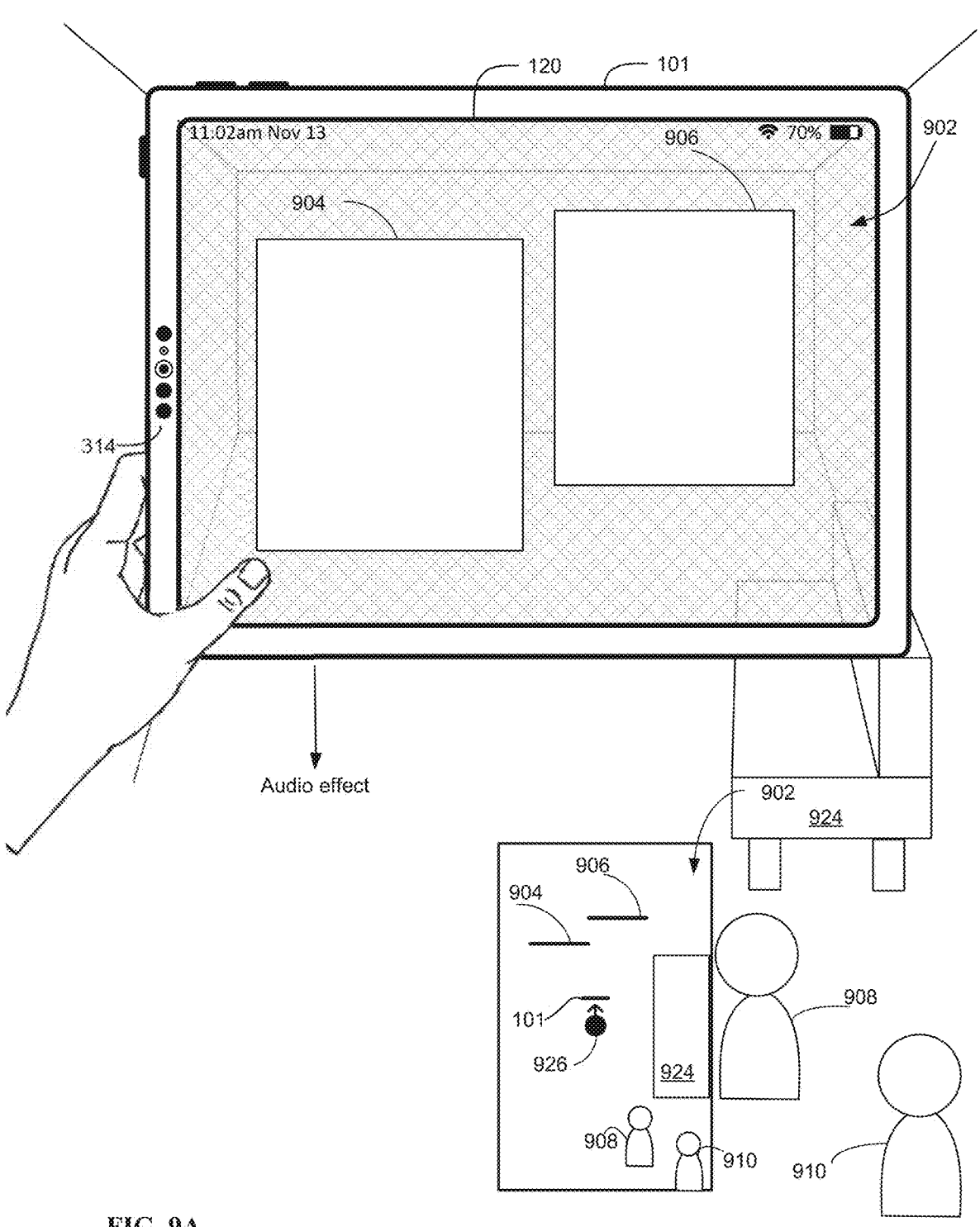
FIGS. 9A-9E illustrate examples of a computer system displaying an indication of a physical object in a three-dimensional environment in accordance with some embodiments.

FIG. 9A illustrates a three-dimensional environment 902 visible via a display generation component (e.g., display generation component 120 of FIG. 1) of a computer system 101, three-dimensional environment 902 visible from a viewpoint 926 of a user illustrated in the overhead view (e.g., facing the back wall of the physical environment in which computer system 101 is located). As described above with reference to FIGS. 1-6, the computer system 101 optionally includes a display generation component (e.g., a touch screen, a HMD or other wearable computing device, a display, a projector, etc.) and a plurality of image sensors (e.g., image sensors 314 of FIG. 3). Image sensors optionally include one or more of a visible light camera, an infrared camera, a depth sensor, or any other sensor computer system 101 would be able to use to capture one or more images of a user or a part of the user (e.g., one or more hands of the user) while the user interacts with computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 9A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 902 and/or the physical environment is visible in three-dimensional environment 902 via display generation component 120. For example, three-dimensional environment 902 visible via display generation component 120 includes representations of the physical floor and back and side walls of the room in which computer system 101 is located. For example, and as shown in FIG. 9A, the physical environment around computer system 101 includes sofa 924 (shown in the overhead view), which is visible via display generation component 120 from viewpoint 926 of the user in FIG. 9A.

In FIG. 9A, three-dimensional environment 902 includes user interface 904 and user interface 906. In FIG. 9A, user interface 904 and user interface 906 are two-dimensional objects. It is understood that the examples of the disclosure optionally apply equally to three-dimensional objects. User interfaces 904 and 906 are optionally one or more of user interfaces of applications (e.g., messaging user interfaces, and/or content browsing user interfaces), three-dimensional objects (e.g., virtual clocks, virtual balls, and/or virtual cars) or any other element displayed by computer system 101 that is not included in the physical environment of computer system 101. In FIGS. 9A-9E, user interface 904 is a content playback user interface (e.g., a user interface in which computer system 101 displays video and/or via which presents audio content), and user interface 906 is also a content playback user interface. One or more details of user interfaces 904 and 906 are provided with reference to method 1000.

In FIG. 9A, computer system 101 is also presenting three-dimensional environment 902 with a visual environmental effect, such as a dimming, desaturation, or otherwise reduced visual prominence of one or more portions of the physical environment visible via the display generation component 120. In some embodiments, computer system 101 additionally or alternatively presents audio environmental effect that at least partially obscure one or more portions of physical audio that would otherwise be audible from the physical environment. Additional details of visual and/or audio environmental effects are described with reference to methods 800 and/or 1000.

In some embodiments, computer system 101 presents three-dimensional environment 902 in a manner that occludes or otherwise reduces the visibility of one or more portions of the physical environment around computer system 101. For example, user interface 904 in FIG. 9A is occluding and/or obscuring a portion of the back wall and floor in the physical environment, and user interface 906 in FIG. 9A is occluding and/or obscuring a portion of the back wall and floor in the physical environment. As another example, in FIG. 9A, the audio and/or visual environmental effects presented by computer system 101 are also occluding and/or obscuring a portion of sofa 924 and/or audio components of the physical environment.

In some embodiments, and as discussed in greater detail hereinafter, computer system 101 reduces the visual prominence of one or more virtual portions of three-dimensional environment 902 based on one or more characteristics of objects in the physical environment to allow those physical objects to become more visible in three-dimensional environment 902. In some embodiments, and as discussed in greater detail hereinafter, computer system 101 presents an indication in three-dimensional environment 902 that represents a corresponding object in the physical environment.

In FIG. 9A, person 908 and person 910 (two people other than the user of computer system 101) are present within the physical environment around of computer system 101. As shown in FIG. 9A, person 908 and person 910 are located outside of the field of view of three-dimensional environment 902 visible via display generation component 120 and are not visible in three-dimensional environment 902.

Figure 9B:
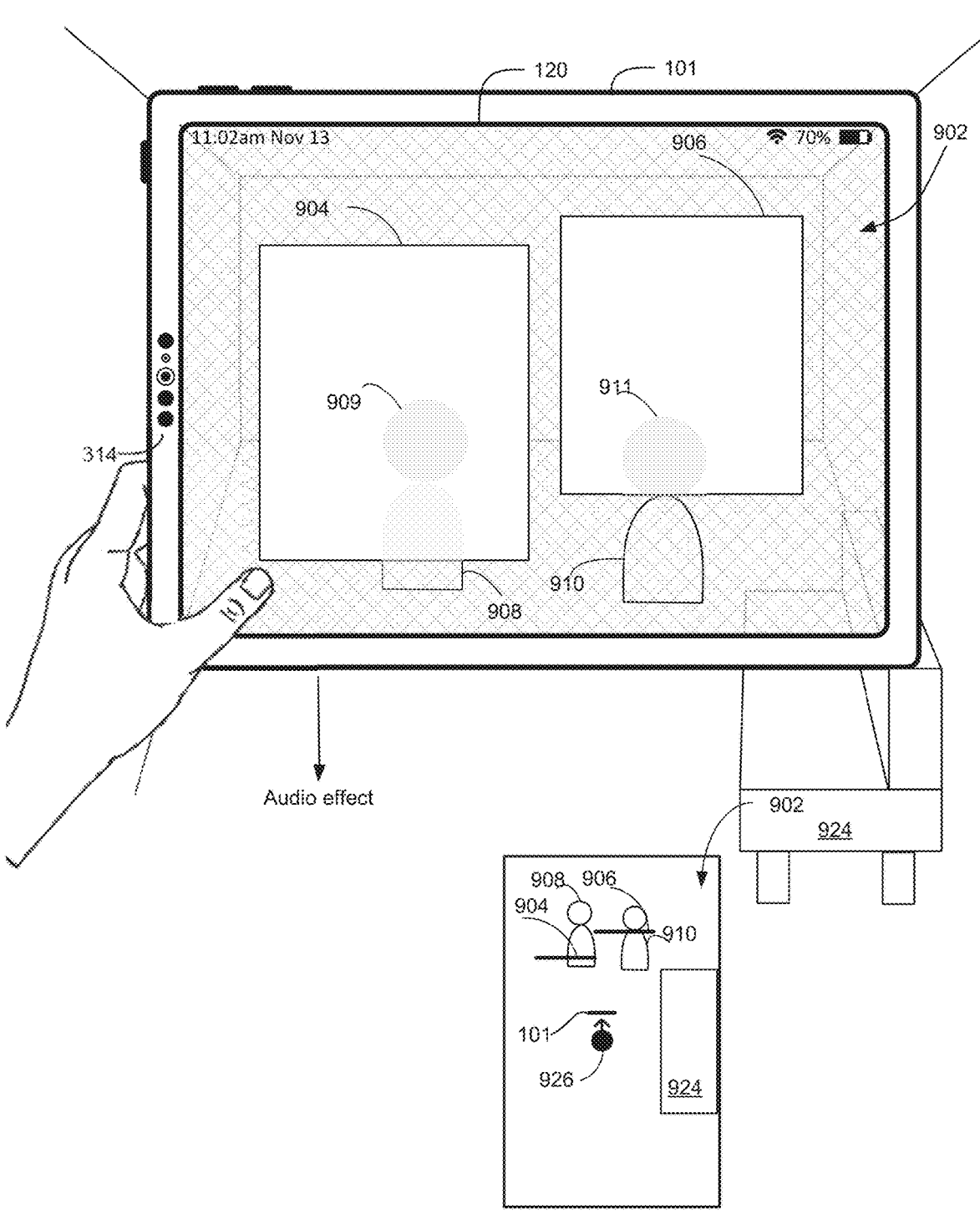

From FIG. 9A to 9B, person 908 and person 910 have moved within the physical environment around computer system 101 and are now partially positioned behind user interfaces 904 and 906, respectively. As shown in FIG. 9B, user interface 904 at least partially obscures a portion of person 908, and computer system 101 presents an indication 909 of that obscured portion of person 908 in user interface 904 as an indication 909 (e.g., as a shadow overlaid on user interface 904). Additionally, and as shown in FIG. 9B, user interface 906 at least partially obscures a portion of person 910, and computer system 101 presents an indication 911 of that obscured portion of person 910 in user interface 906 as an indication 911 (e.g., as a shadow overlaid on user interface 906). This obscuring and subsequent presentation of indications 909, 911—rather than breaking through user interfaces 904 and/or 906—is optionally due to person 908 and person 910 not exhibiting one or more characteristics that corresponds to computer system 101 designating person 908 and person 910 as engaging in salient social interactions with the user of computer system 101, such as described with reference to method 800 and as will be described in more detail later. As shown in FIG. 9B, the sizes of indications 909 and 911 correspond to the size of the representative portions of person 908 and 910, respectively. Furthermore, and as shown in FIG. 9B, the shape of indications 909 and 911 correspond to the size of the representative portions of person 908 and person 910, respectively. In some embodiments, the indications, such as indications 909 and 911, have shapes and/or sizes different from the representative objects (e.g., ovals, rectangles, and/or squares). However, it should be noted that generally the indications optionally correspond to the shape and/or size of the representative objects. In some embodiments, displaying a representative indication (e.g., 909 and 911) of the corresponding physical objects allows the user to see and/or determine where the physical objects are within the physical environments, without interrupting and/or distracting the user from the display of the virtual content (e.g., 904 and 906). Additionally, and because person 908 and person 910 are not designated as engaging in salient social interactions, and as shown in FIG. 9B, the audio and/or visual environmental effects of three-dimensional environment 902 are the same in FIG. 9B as in FIG. 9A. As shown in FIG. 9B, the portion of person 908 that is not obscured by user interface 904 (e.g., the feet of person 908) and the portion of person 910 that is not obscured by user interface 906 (e.g., the feet or person 910) are visible in three-dimensional environment 902 with the visual environmental effects (e.g., dimming) applied thereto.

Figure 9C:
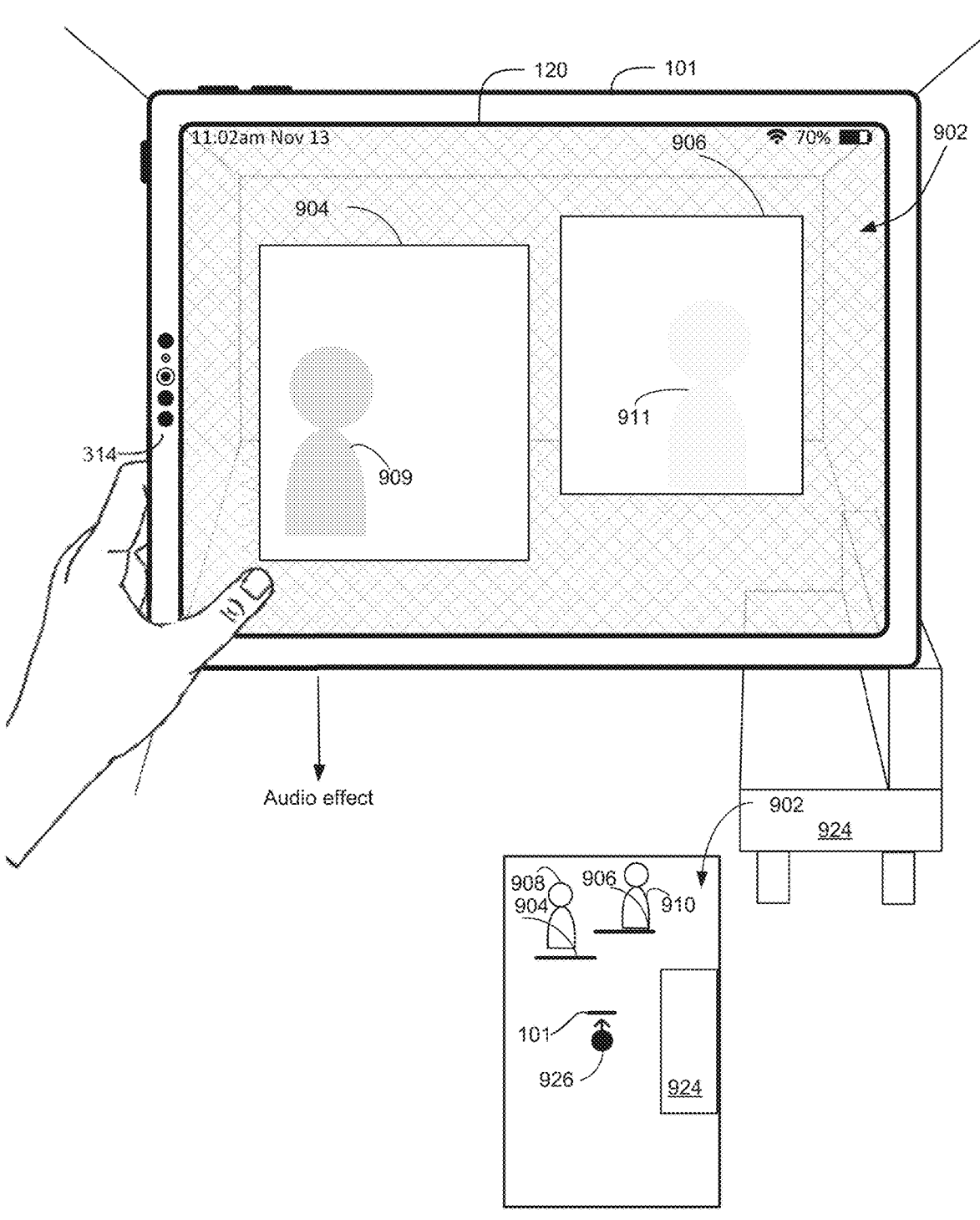

In some embodiments, the indications that represent objects within the physical environment lighten or darken based on movements of the represented objects. For instance, the indication for an object is optionally darkened as an object moves more quickly than the object had been moving, and an indication for an object is optionally lightened as the object moves more slowly than the object made been moving. From FIG. 9B to 9C, person 908 moves more quickly within the physical environment around computer system 101 and behind user interface 904, and person 910 moves more slowly within the physical environment around computer system 101 and behind user interface 906. Accordingly, and as shown in FIG. 9C, indication 909 of person 908 is darkened to indicate a quicker movement of person 908, and indication 911 of person 910 is lightened to indicate a slower movement of person 910.

In some embodiments, the indications that represent objects within the physical environment cease being displayed if the objects stop moving. From FIG. 9C to FIG. 9D, person 908 moves more slowly within the physical environment, and person 910 stops moving. Accordingly, and as shown in FIG. 9D, indication 909 of person 908 is lightened to indicate a slower movement while indication 911 of person 910 has disappeared (e.g., is no longer displayed by computer system 101) because person 910 has stopped moving.

In some embodiments, and as noted above, if computer system 101 designates action from an object within the physical environment as exhibiting characteristics of a salient social interaction, the corresponding object will break-through the three-dimensional environment in one or more manners described with reference to methods 800 and/or 1000 and as will be described below. Additionally, if an object is positioned in front of a user interface (e.g., user interface 904 or user interface 906) within three-dimensional environment 902, computer system 101 optionally alters one or more visual characteristics of the portion of the object that is obscuring the user interface (e.g., blurs and/or fades that portion of the object).

Figure 9D:
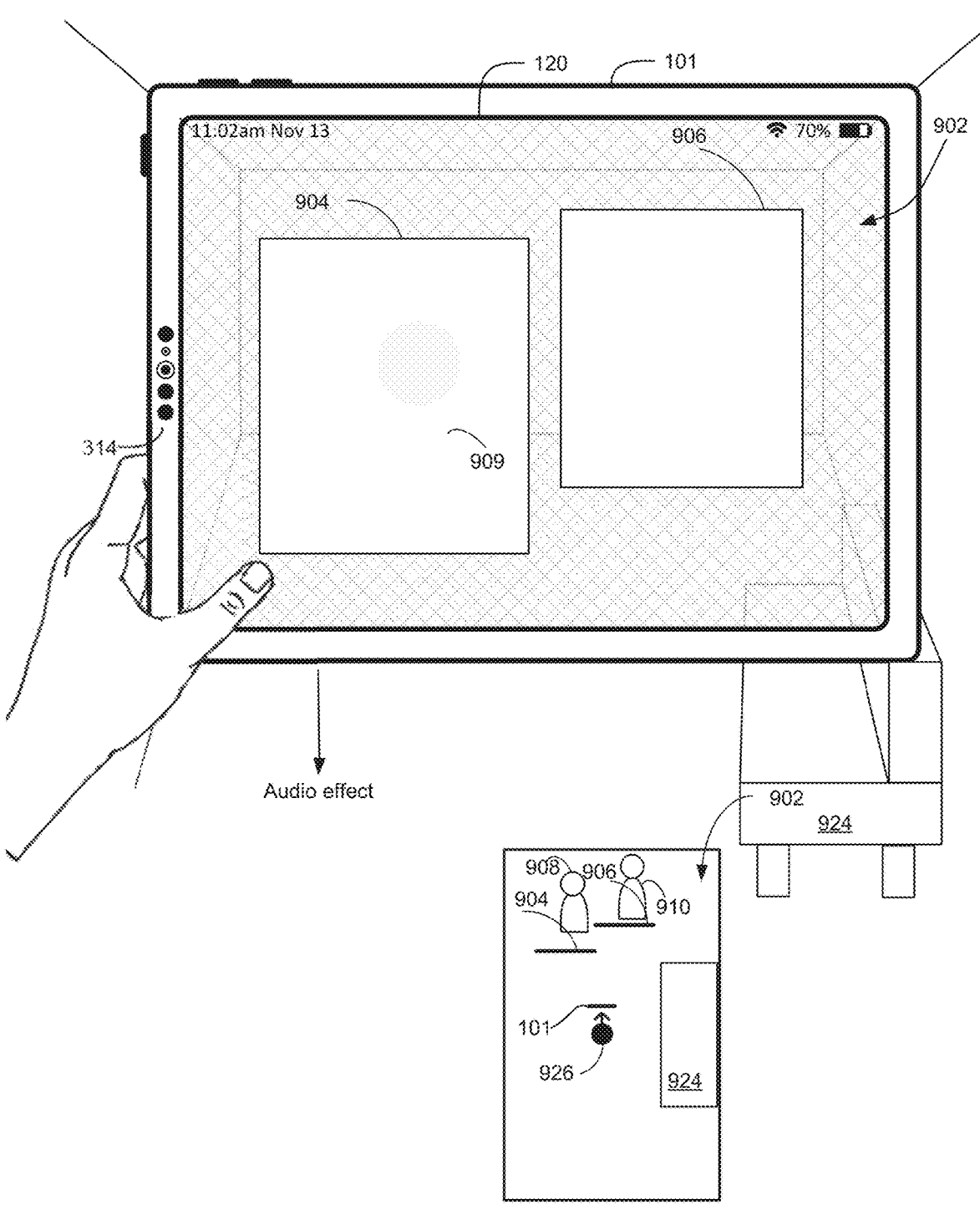
Figure 9E:
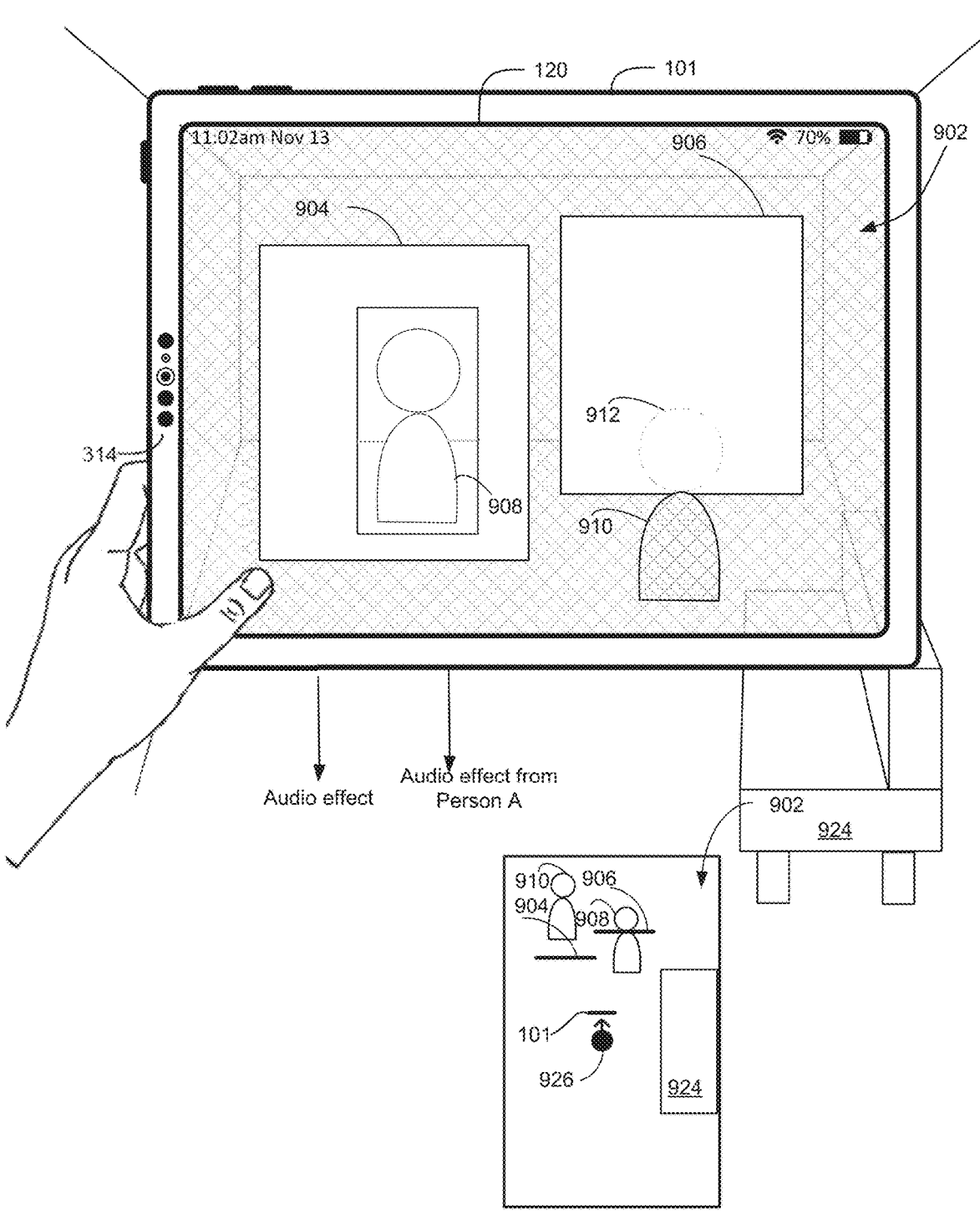
Figure 10B:
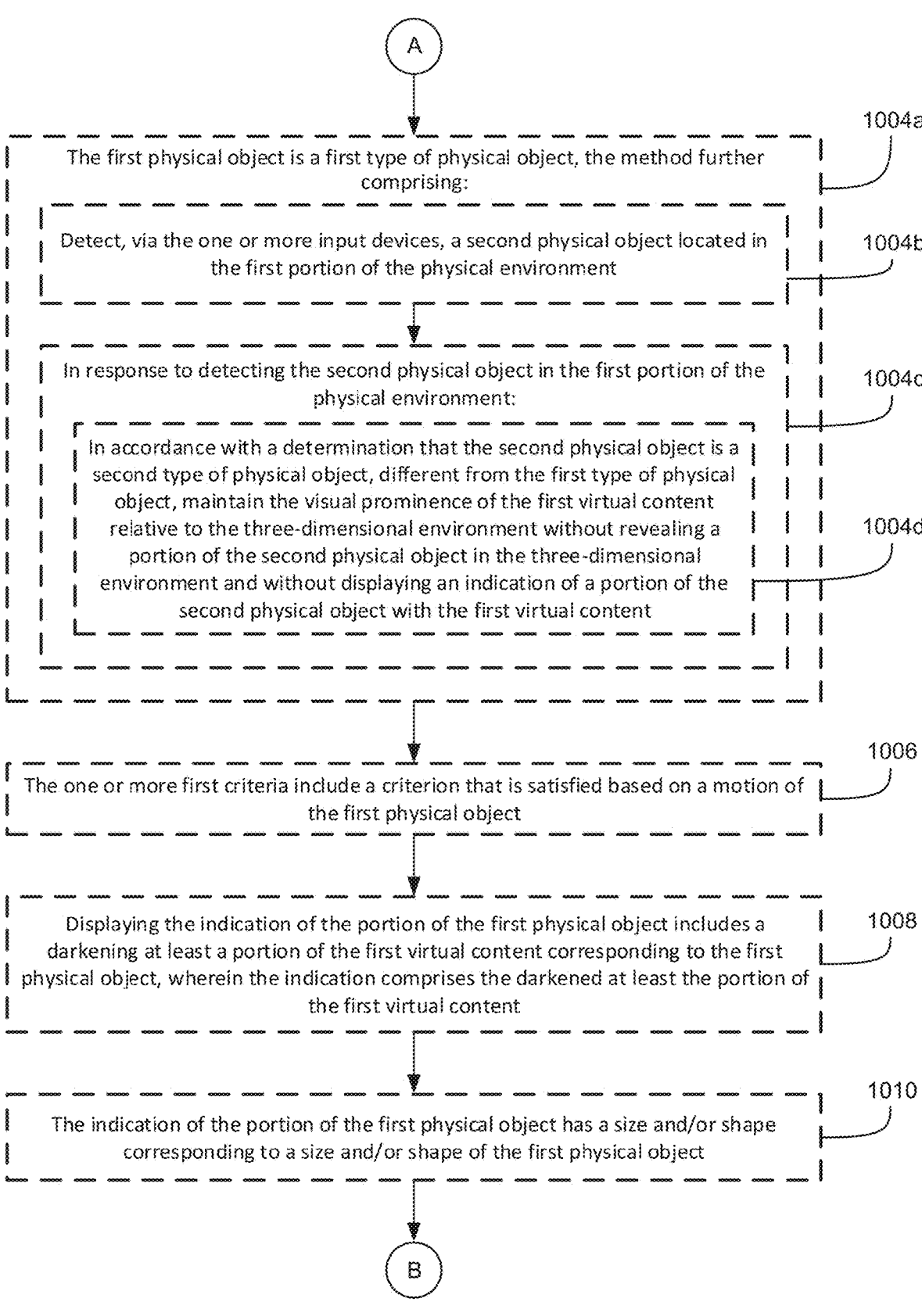
Figure 10C:
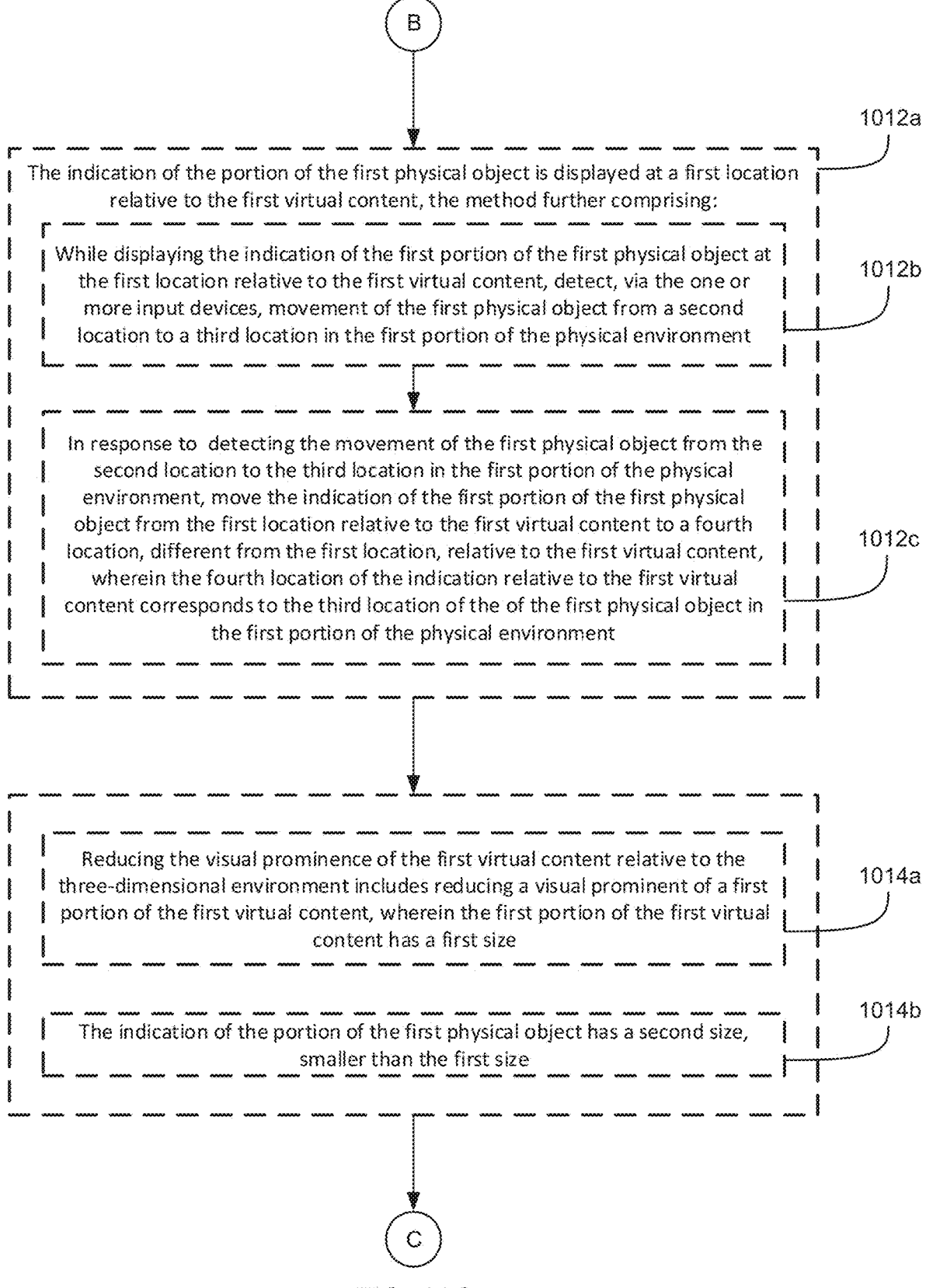
Figure 10D:
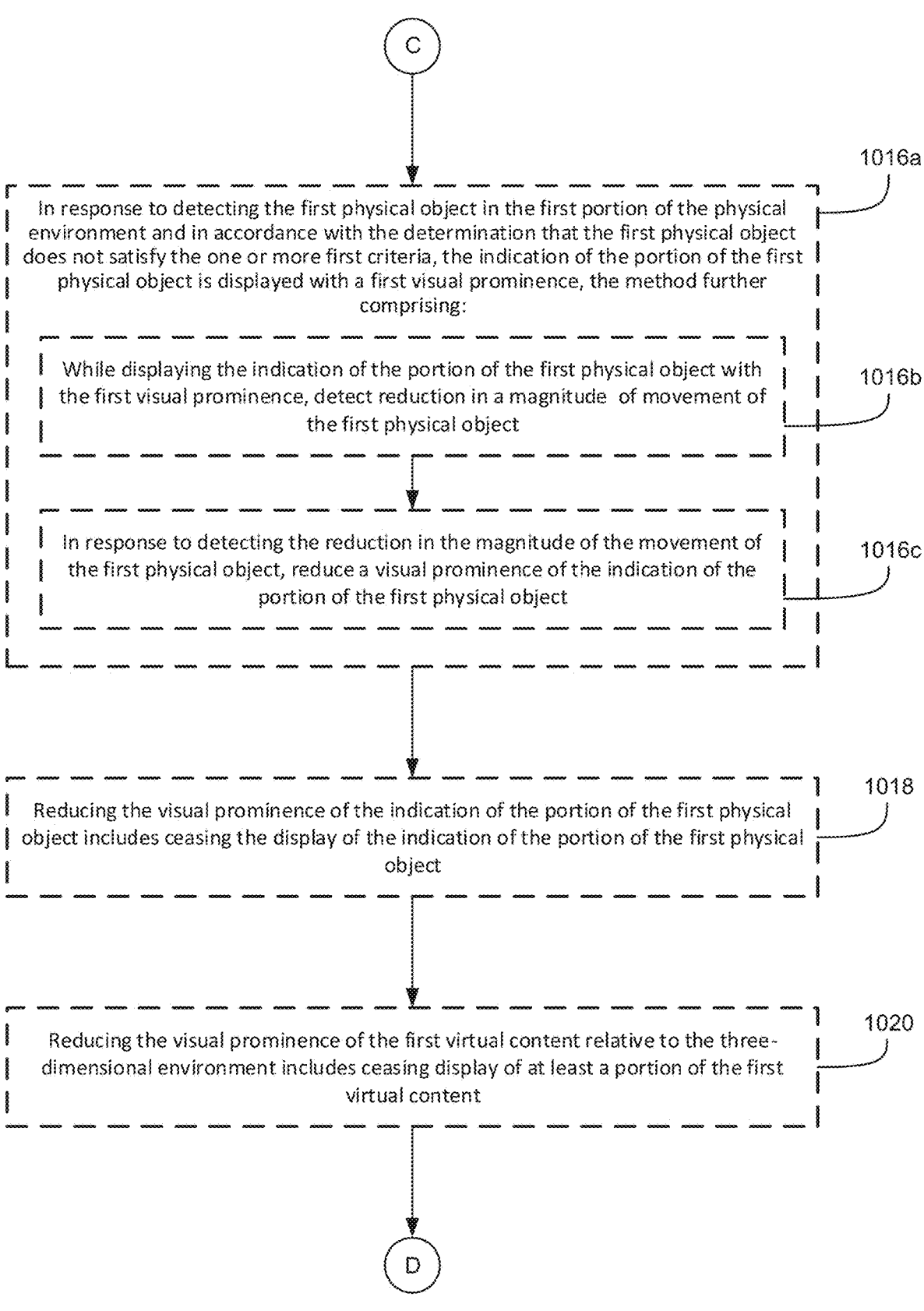
Figure 10E:
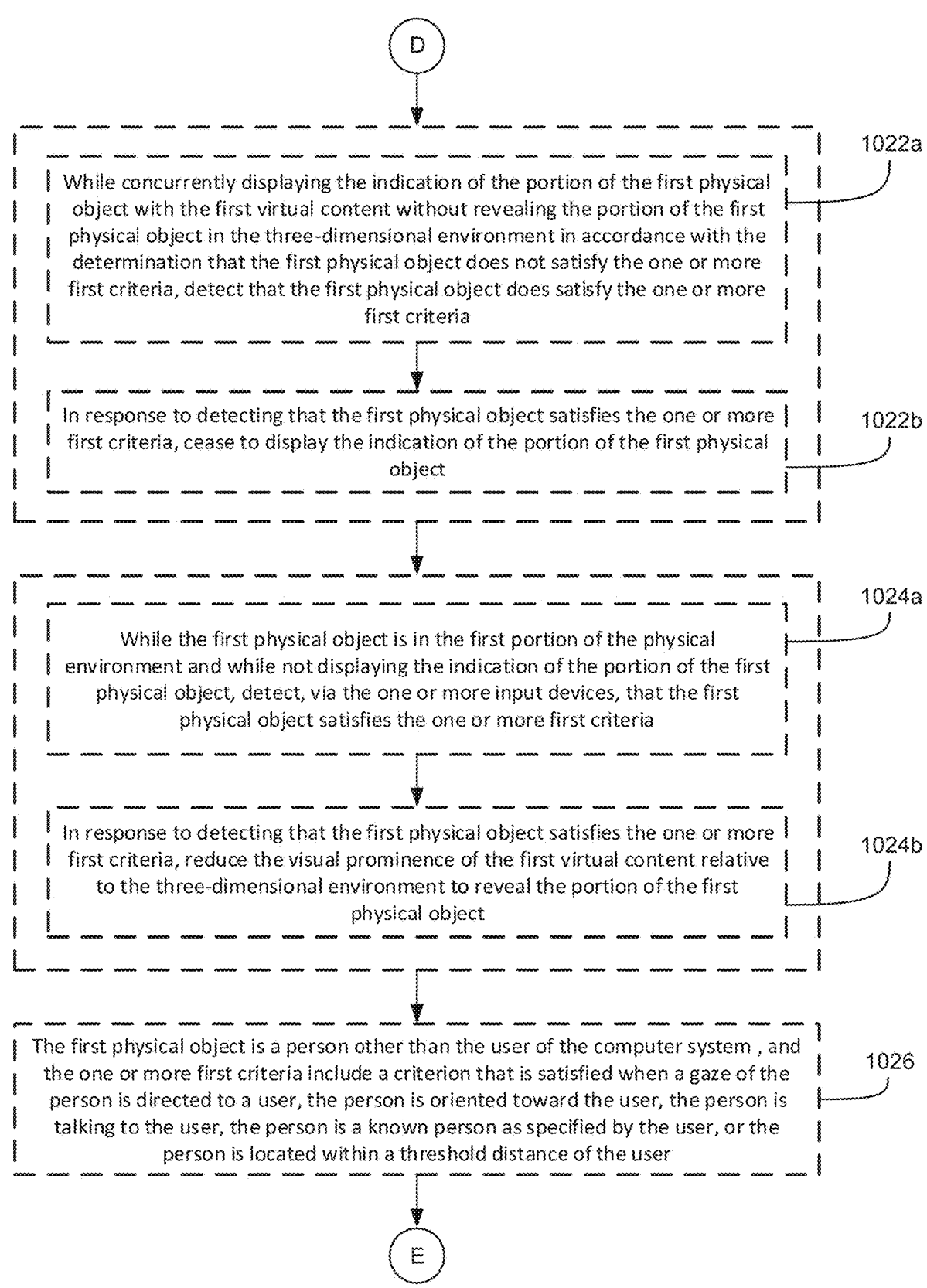

From FIG. 9D to FIG. 9E, person 908 exhibits one or more characteristics that correspond to computer system 101 designating person 908 as engaging in a salient social interaction with the user of computer system 101, and person 910 moves in front of user interface 906. Details about the various criteria used by computer system 101 for designating such salient social interactions are provided with reference to methods 800 and/or 1000. For example, in FIG. 9E, person 908 has turned to and/or is talking to user of computer system 101. As a result, person 908 is eligible to break through user interface 904, as shown in FIG. 9E. As such, and as shown in FIG. 9E, person 908 breaks through user interface 904. As mentioned previously, the break-through of person 908 through user interface 904 and/or three-dimensional environment 902 optionally has one or more of the characteristics of break through described with reference to method 800. Therefore, as shown from FIG. 9D to 9E, computer system 101 optionally transitions from displaying an indication of person 908 in association with user interface 904 to breaking through user interface 904 in accordance with a determination that person 908 satisfies breakthrough criteria.

Furthermore, and as shown in FIG. 9E, the head 912 of person 910 is obscuring user interface 906 while the body of person 910 is below user interface 906 (e.g., is not obscuring user interface 906) within three-dimensional environment 902. In some embodiments, and as shown in FIG. 9E, in response to such obstruction, computer system 101 modifies one or more visual characteristics of the head of person 910 to present a representation of the head 912 of person 910 in a blurred, faded, less saturated, and/or more transparent manner and/or otherwise in a manner with reduced visual prominence relative to three-dimensional environment 902. As a result, the obstruction of user interface 906 is optionally reduced and the portion of user interface 906 that is otherwise obscured by the representation of the head 912 of person 910 is more visible in three-dimensional environment 902. Additionally, and as shown in FIG. 9E, computer system 101 does not modify the visual characteristics of the body of person 910, and as such the body of person 910 is visible in three-dimensional environment 902 with visual environmental effects (e.g., dimming) applied thereto. It should be noted that the portions of user interface 906 that are not occluded by the head of person 910 maintain their visual prominence such that the user can still view those portions of user interface 906. Additionally, and as shown in FIG. 9E, areas and/or volumes outside of person 910 (e.g., three-dimensional environment 902 including non-occluded portions of user interface 906) do not have their visual appearances altered.

FIGS. 10A-10F is a flowchart illustrating a method 1000 of displaying an indication of a physical object in a three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., controller 110 in FIG. 1A). Some operations in method 1000 are, optionally, combined and/or the order of some operations is, optionally, changed.

In some embodiments, method 1000 is performed at computer system (e.g., computer system 101) in communication with a display generation component (e.g., 120) and one or more input devices (e.g., 314). In some embodiments, the computer system has one or more characteristics of the computer system of method 800. In some embodiments, the display generation component has one or more characteristics of the display generation component of method 800. In some embodiments, the one or more input devices have one or more of the characteristics of the one or more input devices of method 800.

In some embodiments, while a three-dimensional environment (e.g., 902) is visible via the display generation component (e.g., 120) (e.g., the three-dimensional environment has one or more of the characteristics of the three-dimensional environment of method 800), and the three-dimensional environment (e.g., 902) includes first virtual content (e.g., for example, the first virtual content has one or more of the characteristics of the first virtual content of method 800) that is obscuring a first portion of a physical environment (1002a), the computer system (e.g., 101) detects a first physical object (e.g., 908) (e.g., a person other than the user, an animal such as a pet, or any other physical object that is capable of movement) located in the first portion of the physical environment (1002b). In some embodiments, the first portion of the physical environment is obscured in a way similar to that described with respect to method 800. In some embodiments, the first physical object is detected via the one or more input devices in a way similar to that described with respect to method 800. In some embodiments, in response to detecting the first physical object (e.g., 908) in the first portion of the physical environment, in accordance with a determination that the first physical object (e.g., 908) satisfies one or more first criteria (e.g., the satisfaction of the one or more first criteria corresponds to a salient social interaction, and the one or more criteria are discussed in greater detail hereinafter and/or with reference to method 800), the computer system (e.g., 101) reduces a visual prominence of the first virtual content relative to the three-dimensional environment (e.g., 902) to reveal a portion of the first physical object (e.g., 908) (1002c), for instance, the visual prominence of user interface 904 is reduced relative to three-dimensional environment 902 to reveal a portion of person 908 (e.g., including increasing a visibility of the first portion of the physical environment through the first virtual content). In some embodiments, the visual prominence of the first virtual content (or a portion of the first virtual content) is reduced to reveal a portion of the first physical object in a way similar to that described with respect to method 800. In some embodiments, the opacity, brightness, color saturation, and/or other visual characteristic of the first virtual content is optionally reduced or changed by a first amount to increase the visibility of the first physical object through the first virtual content (e.g., increase from 0% visible to 20%, 40%, 60% or 80% visible, or increase from 5% visible to 20%, 40%, 60% or 80% visible).

In some embodiments, in accordance with a determination that the first physical object (e.g., 908) does not satisfy the one or more first criteria, the computer system (e.g., 101) displays an indication (e.g., 909) of the portion of the first physical object (e.g., 908) concurrently with the first virtual content (e.g., 904) without revealing the portion of the first physical object in the three-dimensional environment (e.g., 902) (1002*d*), for instance, in FIG. 9B, indication 909 of person 908 is concurrently displayed with user interface 904 without revealing the portion of person 908 in three-dimensional environment 902 (e.g., without increasing a visibility of the first portion of the physical environment through the first virtual content). In some embodiments, the computer system displays an indication of the first physical object at a location within the three-dimensional environment and/or first virtual content that corresponds to its location within the physical environment. For example, the computer system does not reduce or change the opacity, brightness, color saturation, and/or other visual characteristic of the first virtual content to increase the visibility of the first physical object through the first virtual content, but optionally displays a shadow of the first physical object overlaid on and/or through the portion of the first virtual content that is positioned between the viewpoint of the user and the portion of the first physical object in the three-dimensional environment. This indication of the first physical object is optionally displayed in various ways, discussed in greater detail hereinafter such as with reference to steps 1016 to 1020. In some embodiments, the computer system reduces or changes the opacity, brightness, color saturation, and/or other visual characteristic of the first virtual content by a second amount that is less than the first amount (e.g., the first amount is a 100%, 75%, 50%, 40% or 30% reduction in visual prominence, and the second amount is a 50%, 40%, 20%, 10% or 5% reduction in visual prominence) to cause an indication of a the portion of the first physical object to be visible through the first virtual content. In some embodiments, the brightness of the first virtual content (optionally only at the location(s) corresponding to the portion of the first physical object) is reduced (optionally without reducing the opacity) as the indication of the portion of the first physical object. Selectively reducing the visual prominence of virtual content or enabling the display of an indication when breakthrough criteria are not met allows a user to interact with the physical environment when needed while maintaining display of the virtual content in a manner that still allows the user to otherwise be aware of the physical environment, and reducing distraction for the user, which reduces input errors and makes interaction with the device more efficient, reducing power usage and improving battery life for battery powered devices.

In some embodiments, the first physical object (e.g., 908) is a first type of physical object (1004*a*), (e.g., the first physical object is an animate object, such as a person or animal) and a second physical object (e.g., 924) located in the first portion of the physical environment is detected via the one or more input devices (1004*b*). In some embodiments, in response to detecting the second physical object (e.g., 924) in the first portion of the physical environment (1004*c*), in accordance with a determination that the second physical object (e.g., 924) is a second type of physical object, different from the first type of physical object, (e.g., the second physical object is an inanimate object such as a couch, chair, and/or table) the computer system (e.g., 101) maintains a visual prominence of the first virtual content relative to the three-dimensional environment (e.g., 902) without revealing a portion of the second physical object (e.g., 924) in the three-dimensional environment and without displaying an indication of a portion of the second physical object with the first virtual content (1004*d*), for instance, if in FIG. 9B person 908 were a different object of the second type and the computer system did not display indication 909. In some embodiments, and upon the determination that the second physical object is an inanimate object located in the first portion of the physical environment, the visual prominence of the first virtual content is maintained relative to the three-dimensional environment; further, the indication of the second physical object is optionally not displayed. By not allowing breakthrough or indications for inanimate objects, the user of the computer system is able to interact with the three-dimensional environment with fewer distractions, which reduces input errors and makes interactions with the device more efficient, reducing power usage and improving battery life for battery powered devices.

In some embodiments, the one or more first criteria include a criterion that is satisfied based on a motion of the first physical object (e.g., 908) (1006). For instance, if person is moving within the physical environment, the criterion is satisfied and an indication (e.g., 909) is displayed, such as shown in FIG. 9B. In some embodiments, if the person or animal moves, this action satisfies the criterion. In some embodiments, the movement must be detected for a predetermined period of time (e.g., 0.5, 1, 3, 5, 10, 20, or 60 seconds) before satisfying the criterion. This period of time is optionally set by the user or determined by the computer system. In some embodiments, the criterion is not satisfied if the person or animal is not moving. In some embodiments, the movement must be greater than a threshold distance (e.g., 0.05, 0.1, 0.3, 0.5, 1, 3, 5, 10 or 20 meters), have greater than a threshold velocity (e.g., 0.1, 0.3, 0.5, 1, 3, 5 or 10 meters/second) and/or have greater than a threshold acceleration (e.g., 0.01, 0.05, 0.1, 0.3, 0.5, 1, 3, 5 or 10 meters/second2) for the criterion to be satisfied. Requiring object motion to satisfy the criterion reduces the likelihood that objects not of interest (e.g., stationary, inanimate objects) do not interrupt user interaction with the first virtual content, which reduces inputs needed to redisplay the first virtual content and makes interactions with the device more efficient, reducing power usage and improving batter life for battery powered devices.

In some embodiments, displaying the indication (e.g., 909) of the portion of the first physical object (e.g., 908) includes darkening at least a portion of the first virtual content (e.g., 904) corresponding to the first physical object (e.g., 908), wherein the indication (e.g., 909) comprises the darkened at least the portion of the first virtual content (e.g., 904) (1008), such as indication 909 as shown in FIGS. 9B, 9C, and 9D. In some embodiments, the indication is displayed as a darkened portion of at least the portion of the first virtual content. The darkness of the indication is optionally variable based on various factors, discussed in more detail hereinafter, such as with reference to steps 1016 to 1020. Darkening a portion of the content enables the user to view the first virtual content with limited distraction and still be apprised of the physical object in the physical environment, which reduces input errors and makes interactions with the device more efficient, reducing power usage and improving battery life for battery powered devices.

In some embodiments, the indication (e.g., 909) of the portion of the first physical object (e.g., 908) has a size and/or shape corresponding to a size and/or shape of the first physical object (e.g., 908) (1010), such as indication 909 shown in FIGS. 9B, 9C, and 9D. In some embodiments, the indication is generally shaped like the first physical object. For instance, if the first physical object is a tall person the indication will be generally shaped as a tall person and the indication will darken a greater portion of the first virtual content. Alternatively, if the first physical object is a small dog, the indication will be generally shaped as a small dog and the indication will darken only a small portion of the first virtual content. In some embodiments, the indication has the same shape as the first physical object. In some embodiments, the shape of the indication corresponds to the shape of the first physical object in the same or similar manner as does the shape of a shadow correspond to the object casting the shadow. In some embodiments, the indication has a shape that is an approximation of the shape of the physical object (e.g., an oval or irregular blob the size of the person or dog). Displaying the indication that has the general shape of the object enables the user of the computer system to more easily determine what physical object the indication represents, which reduces input errors and makes interactions with the device more efficient, reducing power usage and improving batter life for battery powered devices.

In some embodiments, the indication (e.g., 909) of the portion of the first physical object (e.g., 908) is displayed at a first location relative to the first virtual content (e.g., 904) (1012a) (e.g., the indication is displayed at a first location within and/or overlaid on the first virtual content, such as in a right-hand portion of the first virtual content, because the first physical object is located behind the right-hand portion of the first virtual content). In some embodiments, while displaying the indication (e.g., 909) of the first portion of the first physical object (e.g., 908) at the first location relative to the first virtual content (e.g., 904), movement of the first physical object (e.g., 904) is detected via the one or more input devices (e.g., 314) from a second location to a third location in the first portion of the physical environment (e.g., movement of the first physical object from behind the right-hand portion of the first virtual content to behind the left-hand portion of the first virtual content). In some embodiments, in response to (and/or while) detecting the movement of the first physical object (e.g., 908) from the second location to the third location in the first portion of the physical environment, the computer system moves (1012c) the indication (e.g., 909) of the first portion of the first physical object (e.g., 908) from the first location relative to the first virtual content to a fourth location, different from the first location, relative to the first virtual content (e.g., 904) (e.g., the indication is displayed at a second location within and/or overlaid on the first virtual content, such as in a left-hand portion of the first virtual content, because the first physical object is located behind the left-hand portion of the first virtual content). In some embodiments, the fourth location of the indication relative to the first virtual content corresponds to the third location of the first physical object in the first portion of the physical environment (1012c). For instance, as shown in FIGS. 9B, 9C, and 9D, the indication 909 of person 908 moves within three-dimensional environment 902 in a way that mirrors the movement of person 908 within the physical environment as shown in the overhead view. In some embodiments, the indication moves within the three-dimensional environment and/or within the first virtual content in a way that mirrors the movement of the first physical object within the physical environment. For instance, if the first physical object moves within the physical environment from a second location to a third location, the corresponding indication within the three-dimensional environment will likewise move from the corresponding second location within the three-dimensional environment to the corresponding third location within the three-dimensional environment. In some embodiments, the properties of the indication optionally change based on the movement of the first physical object, discussed in greater detail hereinafter with reference to steps 1016 to 1018. Moving the indication within the three-dimensional environment based on movement of the corresponding first physical object within the physical environment gives feedback to the user of the computer system about where and how fast the first physical object is moving, which reduces input errors and makes interactions with the device more efficient, reducing power usage and improving batter life for battery powered devices.

In some embodiments, the computer system (e.g., 101) reduces the visual prominence of the first virtual content relative to the three-dimensional environment (e.g., 902), which includes reducing a visual prominence of a first portion of the first virtual content (e.g. 904), where the first portion of the first virtual content has a first size (1014a). In some embodiments, rather than displaying an indication of the first physical object, the visual prominence of the first portion of the first virtual content is reduced (e.g., broken through), and the portion of the first virtual content that is broken through has the first size. In some embodiments, the indication (e.g., 909) of the portion of the first physical object has a second size, smaller than the first size (1014b). For instance, indication 909 optionally has a smaller size/ representation in three-dimensional environment 902 than the area of breakthrough if person 908 breaks through user interface 904, as shown in FIG. 9E. In some embodiments, and in the event that an indication of the portion of the first physical object is displayed within the three-dimensional environment, the indication has a smaller size than the size of the breakthrough. For instance, if the first physical object meets the breakthrough criteria and is visible in the three-dimensional environment, the portion of the first virtual content that is broken through (e.g., such as described in more detail with reference to method 800) is larger than the indication of the first physical object that is displayed if the first physical object does not meet the breakthrough criteria but meets the indication criteria. In some embodiments, the (general) shape of the portion of the first virtual content that is broken through is the same as the (general) shape of the indication of the first physical object that is displayed, which optionally corresponds to the shape and/or size of the first physical object, as described above. In some embodiments, the (general) shape of the portion of the first virtual content that is broken through is not the same as the (general) shape of the indication of the first physical object that is display (e.g., is rectangular rather than having a shape that mirrors the shape of the first physical object); rather, the size of the portion of the first virtual content that is broken through optionally corresponds to the size of the first physical object, but the shape of the portion of the first virtual content that is broken through optionally does not correspond to the shape of the first physical object. Making the breakthrough size of a first physical object to be larger than the size of an indication that represents the first physical object makes the user more likely to be made aware of a breakthrough than an indication of the physical object, which reduces input errors and makes interactions with the device more efficient, reducing power usage and improving batter life for battery powered devices.

In some embodiments, in response to detecting the first physical object (e.g., 908) in the first portion of the physical environment and in accordance with the determination that the first physical object (e.g., 908) does not satisfy the one or more first criteria, the computer system (e.g., 101) displays the indication (e.g., 909) of the portion of the first physical object (e.g., 908) with a first visual prominence (1016a)(e.g., a first brightness, a first opacity, a first saturation and/or a first contrast level with respect to the remainder of the first virtual content). In some embodiments, while displaying the indication (e.g., 909) of the portion of the first physical object (e.g., 908) with the first visual prominence, a reduction in a magnitude (e.g., distance, velocity and/or acceleration) of movement of the first physical object (e.g., 908) is detected (1016b). In some embodiments, in order for the reduction in magnitude to be noticed by the computer system, the movement of the first physical object must be reduced by at least a predetermined magnitude, as described in more detail below. This magnitude is optionally set by the user of the computer system or determined by the computer system. In some embodiments, in response to detecting the reduction in the magnitude of the movement of the first physical object (e.g., 908), a visual prominence of the indication of the portion of the first physical object (e.g., 908) is reduced (1016c)(e.g., to a second brightness greater than the first brightness, a second opacity less than the first opacity, a second saturation less than the first saturation and/or a second contrast level, less than the first contrast level, with respect to the remainder of the first virtual content). For instance, and as shown in FIG. 9C, the indication 909 of person 908 is darkened as person 908 moves quickly while the indication 911 of person 910 is lightened as person 910 moves slowly. In some embodiments, and in response to a detection that the magnitude of the movement of the first physical object is reduced by the predetermined magnitude (5%, 10%, 20%, 40%, 50%, 70%, or 90%), the visual prominence of the indication of the portion of the first physical object is reduced. For instance, if the first physical object slows down then the indication will optionally lighten. Alternatively, if the first physical object speeds up, the indication will optionally darken. In some embodiments, if the object does not reduce in movement by the predetermined magnitude, the visual prominence of the indication is maintained. Lightening the indication of the first physical object in response to a reduction in the magnitude of the movement of the first physical object gives the user an indication of the speed at which the first physical object is moving and interruption of the interaction with the first virtual content is reduced, as well as reducing interruption from a stationary object which is less likely to be of interest to the user, which reduces inputs needed to display the first virtual content and makes interactions with the device more efficient, reducing power usage and improving batter life for battery powered devices.

In some embodiments, reducing the visual prominence of the indication (e.g., 911) of the portion of the first physical object (e.g., 910) includes ceasing the display of the indication (e.g., 911) of the portion of the first physical object (e.g. 910) (1018), for instance if person 910 stops moving, as shown in FIG. 9D, the indication 911 of person 910 will optionally cease to be displayed (e.g., optionally without breaking through the first virtual content if the first physical object does not satisfy the breakthrough criteria). In some embodiments, and in response to a detection that the magnitude of the movement of the first physical object is reduced by 100% (e.g., the first physical object stops moving), the indication of the portion of the first physical object ceases to be displayed. In some embodiments, if the indication of the portion of the first physical object ceases to be displayed, the first virtual content is displayed in the same manner (e.g., same visual prominence and/or other visual characteristics) as if no physical object exists in the first portion of the physical environment. Ceasing to display the indication of the first physical object in response to cessation of the movement of the first physical object gives the user an indication that the first physical object has stopped moving and interruption of the interaction with the first virtual content is further reduced, which reduces inputs needed to display the first virtual content and makes interactions with the device more efficient, reducing power usage and improving batter life for battery powered devices.

In some embodiments, reducing the visual prominence of the first virtual content (e.g., 904) relative to the three-dimensional environment includes ceasing display of at least a portion of the first virtual content (e.g., 904) (1020), for instance, the reduction of visual prominence of user interface 904 in FIG. 9E (e.g., breaking through the first virtual content, such as described in more detail with reference to method 800). In some embodiments, breakthrough of the first virtual content is partial or full based on one or more factors, as described in more detail with reference to method 800. For instance, if the first physical object is a person who gazes at the user of the computer system for a required time, the person will optionally breakthrough the first virtual content. Allowing breakthrough of the first physical object enables the user to interact with the first physical object, which reduces the need for additional inputs to breakthrough the first physical object, reducing power usage and improving battery life for battery powered devices.

In some embodiments, while concurrently displaying the indication (e.g., 909) of the portion of the first physical object (e.g., 908) with the first virtual content (e.g., 904) without revealing the portion of the first physical object (e.g., 908) in the three-dimensional environment (e.g., 902) in accordance with the determination that the first physical object (e.g., 908) does not satisfy the one or more first criteria, it is detected that the first physical object (e.g., 908) does satisfy the one or more first criteria (1022a). In some embodiments, in response to detecting that the first physical object (e.g., 908) satisfies the one or more first criteria, the computer system ceases to display the indication (e.g., 909) of the portion of the first physical object (e.g., 908) (1022b), for instance person 908 breaking through user interface 904 in FIG. 9E and computer system 101 no longer displaying indication 909 (and optionally additionally breaking through the first virtual content, as described above and in method 800). For instance, the first physical object is optionally a person that is walking around the physical environment but not talking directly to the user of the computer system and thus, an indication of the person is displayed within the three-dimensional environment (e.g., on or in the first virtual content), but the first virtual content is not broken through. However, if the person optionally turns to and begins talking directly to the user of the computer system, the one or more first criteria are satisfied and the indication ceases display and/or the person breaks through the first virtual content. Alternatively, if the one or more first criteria remain not satisfied, the display of the indication is optionally maintained. Ceasing display of the indication if breakthrough criteria are met reduces resources needed to unnecessarily display the indication in the environment, reducing power usage and improving battery life for battery powered devices.

In some embodiments, while the first physical object (e.g., 908) is in the first portion of the physical environment and while not displaying the indication (e.g., 909) of the portion of the first physical object (e.g., 908) (e.g., because the first physical object is not moving), it is detected, via the one or more input devices (e.g., 314), that the first physical object (e.g., 908) satisfies the one or more first criteria (1024*a*). In some embodiments, in response to detecting that the first physical object (e.g., 908) satisfies the one or more first criteria, the computer system (e.g., 101) reduces the visual prominence of the first virtual content (e.g., 904) relative to the three-dimensional environment (e.g., 902) to reveal the portion of the first physical object (e.g., 908) (1024*b*). For instance, even if an indication (e.g., 909) is not displayed for person 908 and person 908 satisfies the one or more first criteria, person 908 breaks through as shown in FIG. 9E. In some embodiments, even if an indication is not displayed for the first physical object but it is detected that the first physical object satisfies the one or more first criteria, the visual prominence of the first virtual content is reduced relative to the three-dimensional environment to reveal the portion of the first physical object. For instance, if the first physical object is optionally a person who is sitting on a couch (and thus no indication is displayed representing the person) and the person turns to the user of the computer system and begins talking directly to the user of the computer system, the person will optionally breakthrough the first virtual content. Revealing the portion of the first physical object if the first physical object meets the breakthrough criteria even if the indication is not displayed enables the user to view and interact with the first physical object in a timely manner, which reduces the need for additional inputs to breakthrough the first physical object, reducing power usage and improving battery life for battery powered devices.

In some embodiments, the first physical object (e.g., 908) is a person other than the user of the computer system (e.g., 101) (e.g., the user's spouse, partner, child, friend, or simply another person in the environment), and the one or more first criteria include a criterion that is satisfied when a gaze of the person is directed to a user (e.g., of the computer system), the person (e.g., 908) is oriented toward the user, the person (e.g., 908) is talking to the user, the person (e.g., 908) is a known person as specified by the user, or the person (e.g., 908) is located within a threshold distance of the user (1026). For instance, if person 908 gazes at the user of computer system 101, is oriented toward the user of computer system 101, is talking to the user of computer system 101, is a known person of the user of computer system 101, and/or is located within a threshold distance of the user of computer system 101, person 908 will optionally breakthrough as shown in FIG. 9E. Details of such criteria are optionally as described with reference to method 800. Allowing breakthrough based on a person's gaze directed to the user of the computer system, a person's orientation relative to the user of the computer system, a person talking to the user of the computer system, based on identification of the person by the computer system, and/or based on a location of the person relative to the user of the computer system reduces the number of inputs needed for the user to interact with the person, reducing power usage and improving battery life for battery powered devices.

In some embodiments, while displaying the first virtual content (e.g., 904) with the reduced visual prominence, and in accordance with the determination that the first physical object (e.g., 908) satisfied the one or more first criteria, it is detected that the first physical object (e.g., 908) no longer satisfies the one or more first criteria (1028*a*). In some embodiments, the first physical object is optionally a person that satisfies the one or more first criteria by talking directly to the user of the computer system to enable breakthrough. In some embodiments, the person stops talking directly to the user of the computer system, thus no longer satisfying the one or more first criteria. In some embodiments, in response to detecting that the first physical object (e.g., 908) no longer satisfies the one or more first criteria (1028*b*), the visual prominence of the first virtual content (e.g., 904) is increased relative to the three-dimensional environment (1028*c*). For instance, if person 908 is broken through as shown in FIG. 9E, and then no longer satisfies the one or more first criteria, the visual prominence of user interface 904 is increased, as shown in FIG. 9A. In some embodiments, and in response to the person no longer satisfying the one or more first criteria, the computer system reduces the breakthrough for the person such that the user of the computer system can better view the first virtual content. For example, the visual prominence of the first virtual content is increased back to its visual prominence prior to breakthrough. In some embodiments, the indication (e.g., 909) of the portion of the first physical object (e.g., 908) is concurrently displayed with the first virtual content (e.g., 904) without revealing the portion of the first physical object (e.g., 908) in the three-dimensional environment (e.g., 902) (1028*d*). For instance, the indication 909 of person 908 is concurrently displayed with user interface 904 without revealing person 908 in three-dimensional environment 902 as shown in FIG. 9B. In some embodiments, the indication is displayed within the three-dimensional environment to represent the person that no longer meets the breakthrough criteria. Ceasing breakthrough and displaying an indication if the physical object no longer meets the breakthrough criteria reduces distraction for the user of the computer system, which reduces the need for additional inputs to return to display of the indication, reducing power usage and improving battery life for battery powered devices.

In some embodiments, in response to detecting the first physical object (e.g., 910) in the first portion of the physical environment (1030*a*), in accordance with a determination that the first physical object (e.g. 910) is located in front of the first virtual content (e.g., 906) and that the portion of the physical object (e.g., 910) is obscuring at least a portion of the first virtual content (e.g., 906) (e.g., in some embodiments, the first physical object is optionally located in front of the first virtual content from the perspective of the viewpoint of the user. For instance, the first physical object is optionally a person that walks in front of at least a portion of the first virtual content.) a visual appearance of the portion of the first physical object (e.g., 910) that is obscuring the at the least the portion of the first virtual content (e.g., 906) is modified (1030*b*), such as the modification of the head 912 of person 910 in FIG. 9E. For example, the computer system performs one or more of the following to change the appearance of the portion of the first physical object that is obscuring the first virtual content from the viewpoint of the user: 1) increase a transparency of the portion of the first physical object such that the first virtual content is at least partially visible through the portion of the first physical object; 2) increase a blurriness of the portion of the first physical object; 3) decrease a color saturation of the portion of the first physical object; 4) decrease a brightness of the portion of the first physical object. Modifying the appearance of a portion of an object that is occluding the virtual content indicates to the user that the virtual content is being obscured and reduces the effect of such obstruction to the user, which reduces the need for additional inputs to reduce the obstruction, reducing power usage and improving battery life for battery powered devices.

It should be understood that the particular order in which the operations in method 1000 have been described is merely exemplary and is not intended to indicate that the described order is the only order in which the operations could be performed. One of ordinary skill in the art would recognize various ways to reorder the operations described herein. In some embodiments, aspects/operations of methods 800 and/or 1000 may be interchanged, substituted, and/or added between these methods. For example, the three-dimensional environments of methods 800 and/or 1000, the indications of objects of methods 800 and/or 1000, the environmental effects of methods 800 and/or 1000, the breakthrough criteria of methods 800 and/or 1000, and/or characteristics of physical objects of methods 800 and/or 1000 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with a display generation component and one or more input devices:

while a three-dimensional environment is visible via the display generation component, wherein the three-dimensional environment includes first virtual content that is obscuring a first portion of a physical environment, detecting, via the one or more input devices, a first physical object located at a first location in the first portion of the physical environment; and in response to detecting the first physical object in the first portion of the physical environment:

in accordance with a determination that the first physical object at the first location satisfies one or more first criteria, and that a current value of a first user-defined setting is set to allow breakthrough for physical objects that satisfy the one or more first criteria based on one or more properties associated with the one or more physical objects, reducing a visual prominence of the first virtual content relative to the three-dimensional environment; and in accordance with a determination that the first physical object at the first location satisfies the one or more first criteria and that the current value of the first user-defined setting is set to prevent breakthrough for physical objects that satisfy the one or more first criteria based on one or more properties associated with the one or more physical objects, maintaining the visual prominence of the first virtual content relative to the three-dimensional environment.

2. The method of claim 1, the method further comprising:

in response to detecting the first physical object in the first portion of the physical environment:

in accordance with a determination that the first physical object at the first location does not satisfy the one or more first criteria, maintaining the visual prominence of the first virtual content relative to the three-dimensional environment.

3. The method of claim 1, wherein the current value of the first user-defined setting is set to prevent breakthrough for physical objects that satisfy the one or more first criteria when the current value of the first user-defined setting corresponds to a do not disturb mode of the computer system during which generation of one or more notifications in response to detecting one or more notification events is suppressed.

4. The method of claim 1, the method further comprising:

in response to detecting the first physical object in the first portion of the physical environment:

in accordance with a determination that the current value of the first user-defined setting corresponds to a dynamic setting for the first user-defined setting and that the one or more first criteria are satisfied, wherein satisfaction of the one or more first criteria is based on one or more characteristics of the first physical object, reducing the visual prominence of the first virtual content relative to the three-dimensional environment; and in accordance with a determination that the current value of the first user-defined setting corresponds to a dynamic setting for the first user-defined setting and that the one or more first criteria are not satisfied, maintaining the visual prominence of the first virtual content relative to the three-dimensional environment.

5. The method of claim 4, wherein the first physical object is a person other than a user of the computer system, and the one or more first criteria include a criterion that is satisfied when a gaze of the person is directed to the user of the computer system.

6. The method of claim 4, wherein the first physical object is a person other than a user of the computer system, and the one or more first criteria include a criterion that is satisfied when the person is oriented toward the user of the computer system.

7. The method of claim 4, wherein the first physical object is a person other than a user of the computer system, and the one or more first criteria include a criterion that is satisfied when the person is talking to the user of the computer system.

8. The method of claim 4, wherein the first physical object is a person other than a user of the computer system, and the one or more first criteria include a criterion that is satisfied when the person is a known person as specified by the user of the computer system.

9. The method of claim 4, wherein the first physical object is a person other than a user of the computer system, and the one or more first criteria include a criterion that is satisfied when the person is located within a threshold distance of the user of the computer system.

10. The method of claim 1, wherein the three-dimensional environment includes the first virtual content and is displayed with an environmental effect, the method further comprising:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing a visual prominence of the environmental effect in the three-dimensional environment.

11. The method of claim 10, wherein the environmental effect is displayed in a first portion of the three-dimensional environment that is within a threshold distance of a projection of the first physical object relative to a viewpoint of a user of the computer system, and the environmental effect is displayed in a second portion of the three-dimensional environment that is outside of the threshold distance of the projection of the first physical object relative to the viewpoint of the user, the method further comprising:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content and a visual prominence of the environmental effect in the first portion of the three-dimensional environment relative to the three-dimensional environment while maintaining a visual prominence of the environmental effect in the second portion of the three-dimensional environment.

12. The method of claim 1, wherein a first portion of the first virtual content is displayed in a first portion of the three-dimensional environment that is within a threshold distance of a projection of the first physical object relative to a viewpoint of a user of the computer system, and a second portion of the first virtual content is displayed in a second portion of the three-dimensional environment that is outside of the threshold distance of the projection of the first physical object relative to the viewpoint of the user, the method further comprising:

in response to detecting the first physical object in the first portion of the physical environment:
in accordance with the determination that the first physical object at the first location satisfies the one or more first criteria, and that the current value of the first user-defined setting is set to allow breakthrough for physical objects that satisfy the one or more first criteria, reducing the visual prominence of the first portion of the first virtual content in the first portion of the three-dimensional environment relative to the three-dimensional environment while maintaining a visual prominence of the second portion of the first virtual content in the second portion of the three-dimensional environment.

13. The method of claim 1, wherein the three-dimensional environment further includes second virtual content, wherein the first physical object is located between the first virtual content and the second virtual content relative to a viewpoint of a user of the computer system, and the second virtual content is further from the viewpoint of the user than the first virtual content, the method further comprising:

in response to detecting the first physical object in the first portion of the physical environment:
in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content relative to the three-dimensional environment while maintaining a visual prominence of the second virtual content relative to the three-dimensional environment.

14. The method of claim 1, wherein the three-dimensional environment further includes second virtual content, wherein the first physical object is located between the first virtual content and the second virtual content relative to a viewpoint of a user of the computer system, and the second virtual content is further from the viewpoint of the user than the first virtual content, the method further comprising:

in response to detecting the first physical object in the first portion of the physical environment:
in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content relative to the three-dimensional environment and reducing a visual prominence of the second virtual content relative to the three-dimensional environment.

15. The method of claim 1, the method further comprising:

in response to detecting the first physical object in the first portion of the physical environment:
in accordance with a determination that the current value of the first user-defined setting is set to a first value, and in accordance with a determination that one or more second criteria are satisfied, reducing the visual prominence of the first virtual content by a first amount relative to the three-dimensional environment; and
in accordance with a determination that the current value of the first user-defined setting is set to a second value, different from the first value, and in accordance with a determination that one or more third criteria are satisfied, reducing the visual prominence of the first virtual content by a second amount relative to the three-dimensional environment.

16. The method of claim 15, wherein the one or more second criteria are different from the one or more third criteria.

17. The method of claim 15, wherein the second amount is different from the first amount.

18. The method of claim 15, the method further comprising:

detecting, via the one or more input devices, a user input corresponding to a request to set the current value of the first user-defined setting to the first value, wherein the user input is detected while the current value of the first user-defined setting corresponds to a dynamic setting for the first user-defined setting;

in response to detecting the user input, setting the current value of the first user-defined setting to be the first value; and after setting the current value of the first user-defined setting to be the first value, in accordance with a determination that a period of time has elapsed since receiving the user input, automatically adjusting the current value of the first user-defined setting to correspond to the dynamic setting.

19. The method of claim 18, wherein the user input corresponds to a request to toggle between a first mode in which the current value of the first user-defined setting is user-defined and a second mode in which the current value of the first user-defined setting is dynamic.

20. The method of claim 1, wherein the one or more first criteria include a criterion that is satisfied when the first physical object is user-designated as allowed to breakthrough.

21. The method of claim 1, wherein the one or more first criteria include a criterion that is not satisfied when the first physical object is user-designated as not allowed to breakthrough.

22. The method of claim 1, wherein the first virtual content includes a boundary, a first portion of the first virtual content, and a second portion of the first virtual content that is closer to the boundary than the first portion of the first virtual content, and reducing the visual prominence of the first virtual content relative to the three-dimensional environment includes:

reducing a visual prominence of the first portion of the first virtual content by a first amount relative to the three-dimensional environment; and reducing a visual prominence of the second portion of the first virtual content by a second amount, greater than the first amount, relative to the three-dimensional environment.

23. The method of claim 1, the method further comprising:

in response to detecting the first physical object in the first portion of the physical environment, and in accordance with a determination that the current value of the first user-defined setting is set to not allow breakthrough for physical objects that satisfy the one or more first criteria:

in accordance with a determination that the first physical object at the first location satisfies one or more second criteria, wherein the one or more second criteria are safety related, reducing the visual prominence of the first virtual content relative to the three-dimensional environment.

24. The method of claim 1, wherein the computer system is generating an audio output associated with the three-dimensional environment when the first physical object is in the first portion of the physical environment, the method further comprising:

in response to detecting the first physical object in the first portion of the physical environment:

in accordance with the determination that the first physical object at the first location satisfies one or more first criteria, and that the current value of the first user-defined setting is set to allow breakthrough for physical objects that satisfy the one or more first criteria, reducing a magnitude of the audio output associated with the three-dimensional environment.

25. The method of claim 1, wherein reducing the visual prominence of the first virtual content relative to the three-dimensional environment includes one or more of dimming, blurring, or ceasing display of one or more portions of the first virtual content.

26. The method of claim 1, wherein the one or more first criteria include a criterion that is not satisfied when the first virtual content is system virtual content.

27. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

while a three-dimensional environment is visible via the display generation component, wherein the three-dimensional environment includes first virtual content that is obscuring a first portion of a physical environment, detecting, via the one or more input devices, a first physical object located at a first location in the first portion of the physical environment; and in response to detecting the first physical object in the first portion of the physical environment:

in accordance with a determination that the first physical object at the first location satisfies one or more first criteria, and that a current value of a first user-defined setting is set to allow breakthrough for physical objects that satisfy the one or more first criteria based on one or more properties associated with the one or more physical objects, reducing a visual prominence of the first virtual content relative to the three-dimensional environment; and in accordance with a determination that the first physical object at the first location satisfies the one or more first criteria and that the current value of the first user-defined setting is set to prevent breakthrough for physical objects that satisfy the one or more first criteria based on one or more properties associated with the one or more physical objects, maintaining the visual prominence of the first virtual content relative to the three-dimensional environment.

28. The computer system of claim 27, the one or more programs further including instructions for:

in response to detecting the first physical object in the first portion of the physical environment:

in accordance with a determination that the first physical object at the first location does not satisfy the one or more first criteria, maintaining the visual prominence of the first virtual content relative to the three-dimensional environment.

29. The computer system of claim 27, the one or more programs further including instructions for:

in response to detecting the first physical object in the first portion of the physical environment:

in accordance with a determination that the current value of the first user-defined setting corresponds to a dynamic setting for the first user-defined setting and that the one or more first criteria are satisfied, wherein satisfaction of the one or more first criteria is based on one or more characteristics of the first physical object, reducing the visual prominence of the first virtual content relative to the three-dimensional environment; and in accordance with a determination that the current value of the first user-defined setting corresponds to a dynamic setting for the first user-defined setting and that the one or more first criteria are not satisfied, maintaining the visual prominence of the first virtual content relative to the three-dimensional environment.

30. The computer system of claim 27, wherein the three-dimensional environment includes the first virtual content and is displayed with an environmental effect, the one or more programs further including instructions for:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing a visual prominence of the environmental effect in the three-dimensional environment.

31. The computer system of claim 30, wherein the environmental effect is displayed in a first portion of the three-dimensional environment that is within a threshold distance of a projection of the first physical object relative to a viewpoint of a user of the computer system, and the environmental effect is displayed in a second portion of the three-dimensional environment that is outside of the threshold distance of the projection of the first physical object relative to the viewpoint of the user, the one or more programs further including instructions for:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content and a visual prominence of the environmental effect in the first portion of the three-dimensional environment relative to the three-dimensional environment while maintaining a visual prominence of the environmental effect in the second portion of the three-dimensional environment.

32. The computer system of claim 27, wherein a first portion of the first virtual content is displayed in a first portion of the three-dimensional environment that is within a threshold distance of a projection of the first physical object relative to a viewpoint of a user of the computer system, and a second portion of the first virtual content is displayed in a second portion of the three-dimensional environment that is outside of the threshold distance of the projection of the first physical object relative to the viewpoint of the user, the one or more programs further including instructions for:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first portion of the first virtual content in the first portion of the three-dimensional environment relative to the three-dimensional environment while maintaining a visual prominence of the second portion of the first virtual content in the second portion of the three-dimensional environment.

33. The computer system of claim 27, wherein the three-dimensional environment further includes second virtual content, wherein the first physical object is located between the first virtual content and the second virtual content relative to a viewpoint of a user of the computer system, and the second virtual content is further from the viewpoint of the user than the first virtual content, the one or more programs further including instructions for:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content relative to the three-dimensional environment while maintaining a visual prominence of the second virtual content relative to the three-dimensional environment.

34. The computer system of claim 27, wherein the three-dimensional environment further includes second virtual content, wherein the first physical object is located between the first virtual content and the second virtual content relative to a viewpoint of a user of the computer system, and the second virtual content is further from the viewpoint of the user than the first virtual content, the one or more programs further including instructions for:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content relative to the three-dimensional environment and reducing a visual prominence of the second virtual content relative to the three-dimensional environment.

35. The computer system of claim 27, the one or more programs further including instructions for:

in response to detecting the first physical object in the first portion of the physical environment:

in accordance with a determination that the current value of the first user-defined setting is set to a first value, and in accordance with a determination that one or more second criteria are satisfied, reducing the visual prominence of the first virtual content by a first amount relative to the three-dimensional environment; and in accordance with a determination that the current value of the first user-defined setting is set to a second value, different from the first value, and in accordance with a determination that one or more third criteria are satisfied, reducing the visual prominence of the first virtual content by a second amount relative to the three-dimensional environment.

36. The computer system of claim 27, the one or more programs further including instructions for:

in response to detecting the first physical object in the first portion of the physical environment, and in accordance with a determination that the current value of the first user-defined setting is set to not allow breakthrough for physical objects that satisfy the one or more first criteria:

in accordance with a determination that the first physical object at the first location satisfies one or more second criteria, wherein the one or more second criteria are safety related, reducing the visual prominence of the first virtual content relative to the three-dimensional environment.

37. The computer system of claim 27, wherein the computer system is generating an audio output associated with the three-dimensional environment when the first physical object is in the first portion of the physical environment, the one or more programs further including instructions for:

in response to detecting the first physical object in the first portion of the physical environment:

in accordance with the determination that the first physical object at the first location satisfies one or more first criteria, and that the current value of the first user-defined setting is set to allow breakthrough for physical objects that satisfy the one or more first criteria, reducing a magnitude of the audio output associated with the three-dimensional environment.

38. A non-transitory computer readable storage medium storing one or more programs, the one or more programs comprising instructions, which when executed by one or more processors of a computer system that is in communication with a display generation component and one or more input devices, cause the computer system to perform a method comprising:

while a three-dimensional environment is visible via the display generation component, wherein the three-dimensional environment includes first virtual content that is obscuring a first portion of a physical environment, detecting, via the one or more input devices, a first physical object located at a first location in the first portion of the physical environment; and in response to detecting the first physical object in the first portion of the physical environment:

in accordance with a determination that the first physical object at the first location satisfies one or more first criteria, and that a current value of a first user-defined setting is set to allow breakthrough for physical objects that satisfy the one or more first criteria based on one or more properties associated with the one or more physical objects, reducing a visual prominence of the first virtual content relative to the three-dimensional environment; and in accordance with a determination that the first physical object at the first location satisfies the one or more first criteria and that the current value of the first user-defined setting is set to prevent breakthrough for physical objects that satisfy the one or more first criteria based on one or more properties associated with the one or more physical objects, maintaining the visual prominence of the first virtual content relative to the three-dimensional environment.

39. The non-transitory computer readable storage medium of claim 38, the method further comprising:

in response to detecting the first physical object in the first portion of the physical environment:

in accordance with a determination that the first physical object at the first location does not satisfy the one or more first criteria, maintaining the visual prominence of the first virtual content relative to the three-dimensional environment.

40. The non-transitory computer readable storage medium of claim 38, the method further comprising:

in response to detecting the first physical object in the first portion of the physical environment:

in accordance with a determination that the current value of the first user-defined setting corresponds to a dynamic setting for the first user-defined setting and that the one or more first criteria are satisfied, wherein satisfaction of the one or more first criteria is based on one or more characteristics of the first physical object, reducing the visual prominence of the first virtual content relative to the three-dimensional environment; and in accordance with a determination that the current value of the first user-defined setting corresponds to a dynamic setting for the first user-defined setting and that the one or more first criteria are not satisfied, maintaining the visual prominence of the first virtual content relative to the three-dimensional environment.

41. The non-transitory computer readable storage medium of claim 38, wherein the three-dimensional environment includes the first virtual content and is displayed with an environmental effect, the method further comprising:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing a visual prominence of the environmental effect in the three-dimensional environment.

42. The non-transitory computer readable storage medium of claim 41, wherein the environmental effect is displayed in a first portion of the three-dimensional environment that is within a threshold distance of a projection of the first physical object relative to a viewpoint of a user of the computer system, and the environmental effect is displayed in a second portion of the three-dimensional environment that is outside of the threshold distance of the projection of the first physical object relative to the viewpoint of the user, the method further comprising:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content and a visual prominence of the environmental effect in the first portion of the three-dimensional environment relative to the three-dimensional environment while maintaining a visual prominence of the environmental effect in the second portion of the three-dimensional environment.

43. The non-transitory computer readable storage medium of claim 38, wherein a first portion of the first virtual content is displayed in a first portion of the three-dimensional environment that is within a threshold distance of a projection of the first physical object relative to a viewpoint of a user of the computer system, and a second portion of the first virtual content is displayed in a second portion of the three-dimensional environment that is outside of the threshold distance of the projection of the first physical object relative to the viewpoint of the user, the method further comprising:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first portion of the first virtual content in the first portion of the three-dimensional environment relative to the three-dimensional environment while maintaining a visual prominence of the second portion of the first virtual content in the second portion of the three-dimensional environment.

44. The non-transitory computer readable storage medium of claim 38, wherein the three-dimensional environment further includes second virtual content, wherein the first physical object is located between the first virtual content and the second virtual content relative to a viewpoint of a user of the computer system, and the second virtual content is further from the viewpoint of the user than the first virtual content, the method further comprising:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content relative to the three-dimensional environment while maintaining a visual prominence of the second virtual content relative to the three-dimensional environment.

45. The non-transitory computer readable storage medium of claim 38, wherein the three-dimensional environment further includes second virtual content, wherein the first physical object is located between the first virtual content and the second virtual content relative to a viewpoint of a user of the computer system, and the second virtual content is further from the viewpoint of the user than the first virtual content, the method further comprising:

in response to detecting the first physical object in the first portion of the physical environment:

in accordance with the determination that the first physical object at the first location satisfies the one or more first criteria, and that the current value of the first user-defined setting is set to allow breakthrough for physical objects that satisfy the one or more first criteria, reducing the visual prominence of the first virtual content relative to the three-dimensional environment and reducing a visual prominence of the second virtual content relative to the three-dimensional environment.

46. The non-transitory computer readable storage medium of claim 38, the method further comprising:

in response to detecting the first physical object in the first portion of the physical environment:

in accordance with a determination that the current value of the first user-defined setting is set to a first value, and in accordance with a determination that one or more second criteria are satisfied, reducing the visual prominence of the first virtual content by a first amount relative to the three-dimensional environment; and in accordance with a determination that the current value of the first user-defined setting is set to a second value, different from the first value, and in accordance with a determination that one or more third criteria are satisfied, reducing the visual prominence of the first virtual content by a second amount relative to the three-dimensional environment.

47. The non-transitory computer readable storage medium of claim 38, the method further comprising:

in response to detecting the first physical object in the first portion of the physical environment, and in accordance with a determination that the current value of the first user-defined setting is set to not allow breakthrough for physical objects that satisfy the one or more first criteria:

in accordance with a determination that the first physical object at the first location satisfies one or more second criteria, wherein the one or more second criteria are safety related, reducing the visual prominence of the first virtual content relative to the three-dimensional environment.

48. The non-transitory computer readable storage medium of claim 38, wherein the computer system is generating an audio output associated with the three-dimensional environment when the first physical object is in the first portion of the physical environment, the method further comprising:

in response to detecting the first physical object in the first portion of the physical environment:

in accordance with the determination that the first physical object at the first location satisfies one or more first criteria, and that the current value of the first user-defined setting is set to allow breakthrough for physical objects that satisfy the one or more first criteria, reducing a magnitude of the audio output associated with the three-dimensional environment.

*    *    *    *    *